US007680620B2

(12) United States Patent
Umeda

(10) Patent No.: US 7,680,620 B2
(45) Date of Patent: Mar. 16, 2010

(54) DYNAMIC MATRIX SENSITIVITY MEASURING INSTRUMENT FOR INERTIAL SENSORS, AND MEASURING METHOD THEREFOR

(75) Inventor: Akira Umeda, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 626 days.

(21) Appl. No.: 10/554,620

(22) PCT Filed: Apr. 28, 2004

(86) PCT No.: PCT/JP2004/006148

§ 371 (c)(1),
(2), (4) Date: Oct. 12, 2006

(87) PCT Pub. No.: WO2004/097433

PCT Pub. Date: Nov. 11, 2004

(65) Prior Publication Data

US 2007/0073502 A1    Mar. 29, 2007

(30) Foreign Application Priority Data

Apr. 28, 2003   (JP)   ............................ 2003-123417
Oct. 21, 2003   (JP)   ............................ 2003-360287

(51) Int. Cl.
*G01P 21/00*    (2006.01)
*G06F 17/16*    (2006.01)
(52) U.S. Cl. ........................... 702/116; 702/96; 702/104
(58) Field of Classification Search .................. 73/1.38; 702/96, 104, 116
See application file for complete search history.

(56) References Cited

U.S. PATENT DOCUMENTS 5,686,665 A * 11/1997 Hara et al. ..................... 73/495

(Continued)

FOREIGN PATENT DOCUMENTS

JP        8-233846        9/1996

(Continued)

OTHER PUBLICATIONS

Akira Umeda, et al., "Evaluation of three axes accelerometers using three dimensional shaker and three axes laser intervferometer", The Japan Society of Mechanical Engineers, No. 99-27, pp. 51-53 1999 (with English abstract).

(Continued)

*Primary Examiner*—Thomas P Noland
(74) *Attorney, Agent, or Firm*—Oblon, Spivak, McClelland, Maier & Neustadt, L.L.P.

(57) ABSTRACT

A device for measuring the dynamic matrix sensitivity of an inertia sensor is provided with a motion generating machine or a vibrating table for inducing a translational or rotary motion, an acceleration measuring unit, an angular velocity measuring unit or angular acceleration measuring unit, an output device for fetching an output from the unit, one or, pre light reflectors, a displacement measuring device for seizing a multidimensional motion by using a laser interferometer radiating light from a plurality of directions to the light reflectors, a data processing unit for processing a data indicating the state of motion and obtained from the displacement measuring unit, and a displaying device to display or a transmitting device to transmit the output of the data processing unit and the output of the acceleration measuring unit, angular velocity measuring unit or angular acceleration measuring unit. Since the accelerometer is exposed to acceleration in every conceivable direction and possibly fails to find a correct value of acceleration as encountered by the conventional one-dimensional calibration, it is actually calibrated by applying acceleration from all possible directions thereto.

18 Claims, 9 Drawing Sheets

U.S. PATENT DOCUMENTS 7,318,337 B2    1/2008    Umeda

FOREIGN PATENT DOCUMENTS

| JP | 8-304448 | 11/1996 |
| JP | 10-2914 | 1/1998 |
| JP | 11-2643 | 1/1999 |
| JP | 2000-338128 | 12/2000 |
| JP | 2002-162413 | 6/2002 |

OTHER PUBLICATIONS

Hiroshi Iioka, et al., "Characterization of mechanical sensor dynamic performance using precision three dimensional shaker ($2^{nd}$ report: operation under the pulse mode)", The Japan Society of Mechanical Engineers, pp. 1210-1214 2000 (with English abstract).

Akira Umeda, et al., "Calibration of a three-axis accelerometer as a three-dimensional accelerometer using laser interferometers and a three-dimensional vibration generator", Shindo Onkyo Shingijutsu Symposium Koen Ronbunshu, No. 03-2, pp. 67-70 Jun. 4, 2003 (with English abstract).

Complied by Osamu Taniguchi, "Determination of vibration", Vibration Engineering Handbook, chapter 13, pp. 624-636 (with partial English translation, 5 pages) 1976.

ISO (the International Organization for Standardization) 16063-11: 1999 (E), pp. 1-27.

Hans-Juergen von Martens, et al., Final Report on Key Comparison CCAUV.V-K1, pp. 2-141 Oct. 1, 2002.

ISO 5347 -11:1993 (E), Methods for the calibration of vibration and shock pick-ups—Part 11: Testing of transverse vibration sensitivity, pp. 296-297.

ISO 5347-12: 1993 (E), Methods for the calibration of vibration and shock pick-ups—Part 12, Testing of transverse shock sensitivity, pp. 298-299.

ISO/TC 108/SC 3 N, ISO/DIS 8041, Human response to vibration—Measuring instrumentation, pp. 1-95 Jul. 4, 2004.

ISO 2631-1, Mechanical vibration and shock—evaluation of human exposure to whole-body vibration—Part 1: General requirements, pp. 1-31 1997.

ISO 5349-1, Mechanical vibration—measurement and evaluation of human exposure to hand-transmitted vibration—Part 1: General requirements, pp. 1-24 May 1, 2001.

Takahiro Kunitomo et al., "Precise Calibration of Seismograph by means of Three-Dimensional Shaker (Preliminary Report)", Proceedings of Autumn Conference in 2000 of Seismological Society of Japan, C81, Nov. 9, 2000.

* cited by examiner

F I G. 4
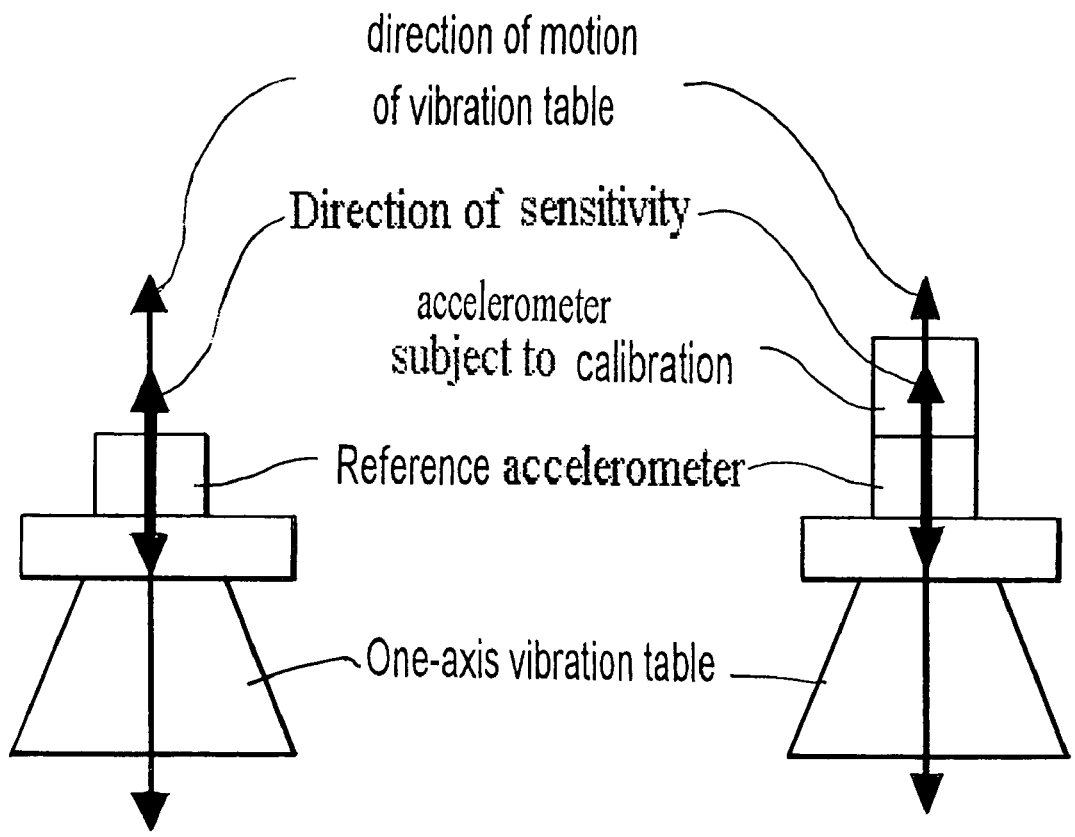
(a)  (b)
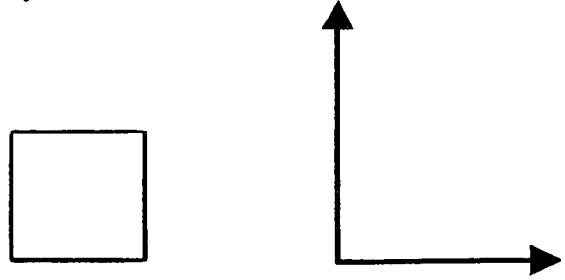
(c)

FIG. 5

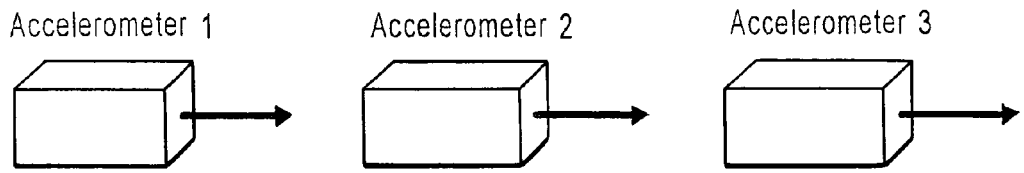

| Accelerometer | Angle with gravitational acceleration | Matrix sensitivity |
|---|---|---|
| Accelerometer 1 | Vertical | $(S_{x,x,90.1}, S_{x,y,90.1}, S_{x,z,90.1})$ |
| | Horizontal | $(S_{x,x,0.1}, S_{x,y,0.1}, S_{x,z,0.1})$ |
| Accelerometer 2 | Vertical | $(S_{x,x,90.2}, S_{x,y,90.2}, S_{x,z,90.2})$ |
| | Horizontal | $(S_{x,x,0.2}, S_{x,y,0.2}, S_{x,z,0.2})$ |
| Accelerometer 3 | Vertical | $(S_{x,x,90.3}, S_{x,y,90.3}, S_{x,z,90.3})$ |
| | Horizontal | $(S_{x,x,0.3}, S_{x,y,0.3}, S_{x,z,0.3})$ |

This accelerometer when assembled, manifests the following matrix sensitivity.

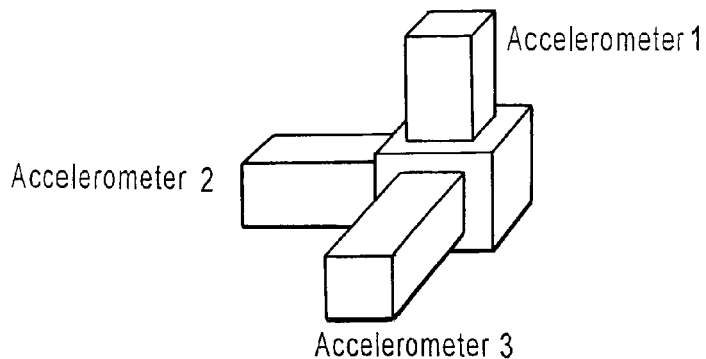

The matrix sensitivities of the assembled accelerometers shown above are as follows:

$$\begin{pmatrix} S_{x,x,90.1} & S_{x,y,90.1} & S_{x,z,90.1} \\ S_{x,x,0.2} & S_{x,y,0.2} & S_{x,z,0.2} \\ S_{x,x,0.3} & S_{x,y,0.3} & S_{x,z,0.3} \end{pmatrix}$$

DYNAMIC MATRIX SENSITIVITY MEASURING INSTRUMENT FOR INERTIAL SENSORS, AND MEASURING METHOD THEREFOR

TECHNICAL FIELD

This invention relates to a device for measuring the dynamic matrix sensitivity of an inertia sensor and a method for the measurement. Particularly the invention relates to a device for the measurement of the dynamic matrix sensitivity of an inertia sensor for a varying use such as, for example, an inertia sensor relating to inertial navigation devices to be mounted on automobiles, submarines, missiles, and airplanes, an inertia sensor to be used for motion control of robots, an inertia sensor to be used for measuring the motion of a human body, the vibration exerted on a human body, and the motion of an animal, and an inertia sensor to be used for preventing image devices and screen images from blurring and a method for effecting the measurement.

BACKGROUND ART

As one example of the inertia sensor, the accelerometer which is well known may be cited. It is generally a one-axis accelerometer which is furnished with one sensitive axis. When this one-axis accelerometer is calibrated, the calibration is effected by causing the direction of motion generated by a motion generating machine to coincide with the axis of sensitivity. The degree of freedom of motion to be used for calibrating accelerometers, therefore, is a single degree of freedom. The primary calibration using a laser interferometer which is reputed to have the highest precision also uses this technique.

However, since the device which calibrates the one-axis accelerometer mentioned above generally entails a three-dimensional motion, it is rare that the device will be limited to a one-dimensional motion. The fact that the calibration is carried out by causing the direction of motion generated by the motion generating machine to coincide with the axis of sensitivity as described above occurs in the calibration which resorts to the measurement of the amplitude of the acceleration when the direction of motion is known in advance.

The "motion generating machine" used herein is a machine normally called a vibration table that generates translational motion with one degree of freedom. But, here in this application motion generating machine is a machine that generates motion with more than one degree of freedom including both translational and rotational motions.

As concrete examples of the conventional one-axis accelerometer, a piezoelectric type accelerometer, an electromagnetic type servo accelerometer, an interference type optical fiber accelerometer and a strain gauge type accelerometer have been known. Owing to their structures and the natures of their materials, accelerometers are influenced by the acceleration components not parallel to the sensitivity axis when the directions of application of acceleration to the acceleration sensors fail to coincide with the direction of sensitivity axis.

It is, therefore, apparent that concerning practical motions, the calibration technique alone in the present state of affairs has not fully satisfactorily established a method for evaluating the performance of an acceleration sensor or perfected a measurement standard for the determination of acceleration.

It is derived that in terms of vector space with three-dimensional transverse motion, even the cross or transverse sensitivities of one-axis accelerometers are expressed by two parameters as will be subsequently explained. The practice of denoting the two kinds of transverse sensitivity by $S_{z,x}$ and $S_{z,y}$ and designating $S_{z,x}$ as a magnitude of not more than 5% and $S_{z,y}$ as a magnitude of not more than 3% has never been in vogue heretofore.

It is natural that the one-axis accelerometer generally emits an output signal in response to an input component in the direction of the sensitivity axis thereof. It is also characterized by emitting output signals in response to input acceleration components from two directions perpendicular to the sensitivity axis thereof. The reason for this property is that the piezoelectric accelerometer, the electromagnetic servo accelerometer, the interferometer type optical fiber accelerometer, or the strain gauge type accelerometer mentioned above is provided with a mass capable of also moving, though slightly, in a direction other than the direction of sensitivity axis or something equivalent thereto and, therefore, is so configured as to detect the relative motion of this mass or detect a voltage or an electric current necessary for preventing this relative motion.

Heretofore, the accelerometer is set on the one-axis motion generating machine and the sensitivity axis of the accelerometer is caused to coincide with the direction of the motion generated by a vibration table (motion generating machine) as illustrated in FIG. 3. The concept of enabling the accelerometer to be calibrated most accurately by measuring a motion with a laser interferometer under such set conditions as mentioned above and consequently establishing a standard for measurement of acceleration is officially approved by the Treaty of the Meter as well. Generally, the reference accelerometer is calibrated in accordance with the method embodying this concept.

Then, in industries, it is supposed to calibrate a given accelerometer based on a reference accelerometer mentioned above by joining in series connection the reference accelerometer which has undergone measurement by the method of FIG. 3 and the given accelerometer as illustrated in FIG. 4(b), causing the sensitivity axis to coincide with the direction of motion generated by a motion generating machine, and comparing the output signals from the two accelerometers.

The conventional method of calibration which resides in determining the transverse sensitivity from the output signal due to a motion only in one direction perpendicular to the sensitivity axis as illustrated in FIG. 4(a) and FIG. 4(b), however, is essentially in error in the elementary sense. In the sense that this method is an expedient and is capable of determining only one transverse-sensitivity, the thought directed toward the decomposition and the synthesis of vector supports a judgment that this method views the phenomenon only in a two-dimensional space.

The transverse sensitivity is determined by imparting vibration only in one direction perpendicular to the sensitivity axis as illustrated in FIG. 4(c).

For the sake of surveying the transverse sensitivity more specifically, the behavior of the piezoelectric type accelerometer using a piezoelectric material, for example, will be explained below. The piezoelectric type accelerometer possesses transverse sensitivity because the piezoelectric constant comprises a shear component. That is, the piezoelectric substance generates an electric charge which transmits a signal via an electrode even to slippage. Generally, in the region in which the voltage (or electric current) generated in response to an input signal (acceleration) possesses linearity, the sensor sensitivity is defined by the ratio of their magnitudes. Thus, the following formula is established.

The sensitivity axis output voltage $(a_{ox}(\omega)\exp(j\omega t))$ of accelerometer = normal sensitivity × input component of acceleration in normal sensitivity direction + cross (transverse) sensitivity 1 × input component of acceleration in direction 1 perpendicular to normal + cross (transverse) sensitivity 2 × input component of acceleration in direction 2 perpendicular to main axis $= S_{x,x}(\omega)a_{ix}\exp(j\omega t) + S_{x,y}a_{iy}\exp(j\omega t) + S_{x,z}a_{iz}\exp(j\omega t)$ When this formula is rewritten in the matrix form, the formula 1 is obtained. Here, the amplitude of the vector acceleration exerted on the accelerometer is denoted by ($a_{ix}$, $a_{iy}$, $a_{iz}$) and the time change component by $\exp(j\omega t)$.

$$a_{ox}(\omega)\exp(j\omega t) = \quad \text{(Mathematical 1)}$$
$$(S_{x,x}(\omega), S_{x,y}(\omega), S_{x,z}(\omega))\begin{pmatrix} a_{ix}\exp(j\omega t) \\ a_{iy}\exp(j\omega t) \\ a_{iz}\exp(j\omega t) \end{pmatrix}$$

The drawing of the acceleration vector A applied to the accelerometer and the decomposition of the vector in X, Y and Z axes is shown in FIG. 2.

It is well known that the acceleration is a vector which is expressed by amplitude and direction. Further, in order that the accelerometer may correctly measure the acceleration, the accelerometer must be calibrated with the acceleration as a vector. The conventional method of calibration, however, effects the calibration with the magnitude of amplitude because the direction of the exerted acceleration is determined at the stage of setup.

When the accelerometer is put to actual services, there are times when the direction of motion can be forecast and there are times when the forecast cannot be attained because of the possibility of the accelerator being exposed to application of acceleration in every direction.

In the case of an earthquake or accidental collision of cars, it is not possible to know in advance the direction of motion. When the calibration is made only in amplitude (one-dimensionally) as practiced conventionally, there are times when no correct magnitude of acceleration can be obtained. Thus, the desirability of calibrating the accelerometer by applying acceleration to the accelerometer in all actually conceivable directions has been finding general recognition.

The technical background of this invention has been described heretofore. As concrete examples of the prior art of this invention, the following documents have been known.

[Non-Patent Document 1] Vibration Engineering Handbook, complied by Osamu Taniguchi, published in 1976 by Youkendo, Chapter 13 "Determination of Vibration," 13.3.2 "Calibration of vibration measuring device" (in Japanese)

[Non-Patent Document 2] ISO (the International Organization for Standardization) 16063-11: 1999 (E) Methods for the calibration of vibration and shock transducers Part 11: Primary vibration calibration by laser interferometer

[Non-Patent Document 3] FINAL REPORT ON KEY COMPARISON CCAUV. V-K1 Hans-Jurgen von Martens, Clemens Elster, Alfred Link, Angelika Taubner, Wolfgang Wabinski, PTB-1.22 Braunschweig, Oct. 1, 2002

[Non-Patent Document 4] ISO 5347 Methods for the calibration of vibration and shock pick-ups: part 11 Testing of transverse vibration sensitivity

[Non-Patent Document 5] ISO 5347 Methods for the calibration of vibration and shock pick-ups: part 12 Testing of transverse shock sensitivity

[Non-Patent Document 6] ISO 8041 Human response to vibration—Measuring instrumentation

[Non-Patent Document 7] ISO 2631-1, 1997 Evaluation of human exposure to whole-body vibration Part 1: General requirement

[Non-Patent Document 8] ISO 5349-1, 2001 Measurement and evaluation of human exposure to hand-transmitted vibration—Part 1: General guidelines

DISCLOSURE OF THE INVENTION

This invention relates to a device for measuring dynamic matrix sensitivity of an inertia sensor and serving to enable an inertia sensor to be calibrated by application thereto of a vibration possessing an acceleration component along the degree of not less than two degrees of freedom selected from among the degrees of six degrees of freedom of motion and a method for the measurement. The first aspect of this invention is characterized by being provided with a motion generating machine capable of inducing a translational motion or a rotary motion, an acceleration measuring device which as a device subject to calibration is at least temporarily fixed on the motion generating machine, an angular velocity measuring device or an angular acceleration measuring device, an output means for fetching an output from the device subject to calibration, a single or a plurality of light reflecting materials, a displacement measuring means capable of seizing a multi-dimensional motion by the use of a laser interferometer formed by radiating laser beams from a plurality of directions to the single or plurality of light reflecting materials, a data processing device for processing the data indicating a multi-dimensional state of motion obtained from the displacement measuring means and converting the resultant multidimensional translational motion or multidimensional rotary motion into magnitudes fit for a predetermined coordinate system, and a display means for displaying or a conveying means for conveying the output of the data processing device and the output of an acceleration measuring device, an angular velocity measuring device, or an angular acceleration measuring device which is the device subject to calibration.

The second aspect of this invention is characterized by the fact that the motion generating machine mentioned above generates a periodic motion. The term "periodic" as used herein means that the vibration produced in each cycle by the motion generating machine mentioned above is periodic within the period in which no influence is exerted on the measurement using the vibration of the next cycle.

The third aspect of the invention is characterized by the fact that the motion generating machine mentioned above generates a motion of the nature of the function of pulse. Here, the motion of the nature of the function of pulse may be a periodic motion in the general sense of the word. In this case, it is provided that the motion of the nature of the function of pulse produced in each cycle generated by the motion generating machine occurs within the period of such an extent as avoids exerting an influence on the measurement using the motion of the nature of the function of pulse produced in the next cycle. The aforementioned motion of the nature of the function of pulse may be followed by a motion for eliminating the displacement produced by the motion.

The fourth aspect of the invention, besides the third aspect of the invention, is characterized by being provided with a first converting means for determining the Fourier component on the frequency axis of the motion of the nature of the function of pulse mentioned above and a second converting means for determining the Fourier component on the frequency axis of the output of an acceleration measuring device, an angular velocity measuring device, or an angular acceleration measuring device which is a device subject to calibration mentioned above and further provided with a means to display or a means to transmit the frequency characteristic of the correction of an acceleration measuring device, an angular velocity measuring device, or an angular acceleration measuring device which is a device subject to calibration obtained from the outputs of the first and second converting means.

The fifth aspect of the invention is characterized by the fact that the motion generating machine mentioned above is a motion generating machine which produces a random motion. The term "random motion" as used herein means that the motion can be handled as a white noise within the range of frequency band subject to calibration.

The sixth aspect of the invention, besides the fourth aspect of the invention, is characterized by being provided with a first converting means for determining the Fourier component on the frequency axis of the random motion mentioned above and a second converting means for determining the Fourier component on the frequency axis of the output of an acceleration measuring device, an angular velocity measuring device, or an angular acceleration measuring device which is a device subject to calibration mentioned above and further provided with a means to display or a means to transmit the frequency characteristic of an acceleration measuring device, an angular velocity measuring device, or an angular acceleration measuring device which is a device subject to calibration obtained from the outputs of the first and second converting means.

Before the measurement by the use of a laser interferometer is started, the control to the extent aimed at is possibly blocked as by the parasitic vibration of the motion generating machine. In this case, by feeding back the information showing the state of motion of the motion generating machine, it is made possible to attain the control as aimed at and cope with the trouble so as to repress the influence of the variation with time of the device. The seventh aspect of this invention, therefore, is characterized by the fact that the motion generating machine mentioned above is provided with an accelerometer for controlling a motion and a feedback circuit or a controlling device for controlling the drive device mentioned above so that the signal from the accelerometer may agree with a predetermined value.

The eighth aspect of the invention is characterized by having as one object thereof the performance of the surveillance mentioned above with high precision and possessing a structure for imparting dynamic matrix sensitivity to the aforementioned accelerometer for controlling a motion and, in the control of the feedback or in the control of a calculating machine, estimating the motion of the sample mounting table of the motion generating machine from the output vector of the accelerometer for controlling the motion by using the dynamic matrix sensitivity mentioned above, and controlling the motion.

The ninth aspect of the invention is aimed at evaluating an error and is characterized by being provided with a means to display for determining an error from the output of the data processing device mentioned above and the output of an acceleration measuring device, an angular velocity measuring device, or an angular acceleration measuring device which is a device subject to calibration and displaying the value of this error or a means to convey for transmitting this value.

Where the laser interferometer cannot be used easily, an alternate of high precision is used instead. This alternate at times abhors an appreciable degradation of measuring precision. The $10^{th}$ aspect of the invention is directed toward coping with this situation and is characterized by being provided with a motion generating machine capable of inducing a translational motion or a rotary motion, an acceleration measuring device, an angular velocity measuring device, or an angular acceleration measuring device which is a device subject to calibration and is at least temporarily fixed on the motion generating machine, an output means for taking out the output from the device subject to calibration, an inertia sensor capable of seizing a multidimensional motion calibrated in advance by using a dynamic matrix sensitivity measuring device of the inertia sensor recited in claim 1, a data processing device for processing the data showing the state of multidimensional motion obtained from the inertia sensor and converting a multidimensional translational motion or a multidimensional rotary motion to the value fit for the predetermined coordinate system, and a means to display or a means to convey the output of the data processing device and the output of the acceleration measuring device, the angular velocity measuring device, or the angular acceleration measuring device which is a device subject to calibration.

When an acceleration measuring device, an angular velocity measuring device, or an angular acceleration measuring device is calibrated on the ground, since the calibration is carried out in the presence of gravitational acceleration, it is preferred to be capable of excluding the influence thereof from the measured value. The $11^{th}$ aspect of the invention, therefore, is characterized by being provided with a means of adjusting the direction of mounting an acceleration measuring device, an angular velocity measuring device, or an angular acceleration measuring device which is a device subject to calibration so that the direction may be varied relative to the direction of gravity and a means for obtaining an output from the aforementioned device subject to calibration temporarily fixed as set in a plurality of directions relative to the direction of gravity, finding dynamic matrix sensitivity for each of the plurality of directions mentioned above, and estimating the dynamic matrix sensitivity liberated from the influence of gravity from the plurality of dynamic matrix sensitivities mentioned above.

Particularly the aforementioned device subject to calibration which characterizes the $12^{th}$ aspect of this invention is an acceleration measuring device, an angular velocity measuring device, or an angular acceleration measuring device which possesses the output thereof only in a specific direction. The motion generating machine which induces the aforementioned translational motion or rotary motion may be capable of producing a motion with a plurality of degrees of freedom.

The $13^{th}$ aspect of the invention is characterized by the whole of a device for measuring the dynamic matrix sensitivity of an inertia sensor being particularly installed in a room capable of intercepting noise or vibration from the exterior, the device for measuring acceleration which is a device subject to calibration being a seismograph, and the motion generating machine being a motion generating machine which generates a motion of the nature of the function of pulse or the function of cycle and imparts small vibration in a vibration frequency band or in a seismic zone detectable by the seismograph (strong motion seismograph). The seismic wave is known in two kinds, a longitudinal wave and a transverse wave. Specifically, it is inherently a multidimensional motion which possibly occurs simultaneously in the vertical direction and the horizontal direction, which possibly occurs later in the horizontal direction, or which occurs in the form of a rotation of the ground and it is characterized by the fact that the direction of motion is an unknown factor. The motion mentioned above preferably conforms to this situation.

The $14^{th}$ aspect of the invention is characterized by the aforementioned motion generating machine being particularly a motion generating machine which generates random motion and imparts vibration in an vibration frequency band detectable by the inertia sensor used for constant detection of vibration of a vibro-isolating bed, and the motion generating machine or the vibro-isolating bed being provided with a cooling device or a thermostat. Here, the vibration of the floor surface for mounting the vibro-isolating bed comprises a horizontal motion and a vertical motion and is characterized by the fact that the direction of motion cannot be known in advance. Thus, the aforementioned motion-generating machine is preferred to be adapted to generate a motion conforming to this situation.

The $15^{th}$ aspect of this invention is characterized by the aforementioned motion generating machine being particularly a motion generating machine which gives a vibration in a vibration frequency band detectable by an accelerometer used for controlling an automobile suspension or for controlling an automobile passenger protecting airbag, and the acceleration measuring device which is a device subject to calibration being an accelerometer used for controlling the automobile suspension or for controlling the automobile passenger protecting airbag and being provided with a temperature controlling device for controlling the temperature environment of the acceleration measuring device which is a device subject to calibration. Since the vibration of the automobile suspension is characterized by simultaneously producing a translational motion in the direction of a spring and a rotary motion around the rotational axis of the link of the suspension mechanism, the aforementioned motion generating machine is preferred to be enabled to generate a motion conforming to this situation. Further, the accelerometer to be used for controlling the automobile passenger protecting airbag has an important requirement of possessing the following characteristic features and the aforementioned motion generating machine is preferred to be capable of generating a motion conforming to this situation. First, the evaluation of safety laid out in the specification is stipulated to give results of calculation of the absolute values of acceleration in head-on collision and lateral collision below specified levels. The actual collision of cars does not always occur in the form of head-on collision. That is, the accelerometer which is used in the system for ensuring safety in collision must always detect correct acceleration without relying on the direction of acceleration The calibration, therefore, must be effected in terms of vector.

The $16^{th}$ aspect of this invention is characterized by the aforementioned motion generating machine being particularly a motion generating machine which simultaneously generates a motion of the nature of the function of pulse or the nature of the function of cycle and comprising a translational motion and a rotary motion and imparts a motion in a vibration frequency band detectable by an inertia sensor used for controlling the motion of a robot and the aforementioned acceleration measuring device which is a device subject to calibration being an inertia sensor to be used for controlling the motion of the robot mentioned above. Since the motion of the robot is characterized by being capable of simultaneously generating a translational motion and a rotary motion with high accuracy, the motion mentioned above is preferred to conform to this situation.

The $17^{th}$ aspect of this invention is characterized by the aforementioned motion generating machine being particularly a motion generating machine which gives a vibration in a vibration frequency band detectable by an inertia sensor to be used for measuring a human body motion, a vibration exerted on a human body, or an animal behavior monitor and the aforementioned acceleration measuring device which is a device subject to calibration being an inertia sensor, i.e. distributed accelerometers, to be used for measuring a human body motion, a vibration exerted on a human body, or an animal behavior monitor and being provided with a multi-channel signal output terminal for emitting a signal for the distributed accelerometers. Since the vibration exerted on the inertia sensor to be used for measuring a human body motion, a vibration exerted on a human body, or an animal behavior monitor is characterized as indicated herein below, the aforementioned motion generating machine is preferred to be enabled to generate a motion conforming to this situation.

1) The specification laid down by ISO regarding the measurement of vibration exerted on a human body (Non-Patent Document 6, Non-Patent Document 7 and Non-Patent Document 8) defines use of a three-axis accelerometer for vibrations in hands and arms and use of a six-axis accelerometer for whole body vibrations. To be specific, since the process of judgment embraces an operation of exerting a weight on the X component, Y component, and Z component of given acceleration, squaring the respective responses, totaling the produced squares, and reducing the total to a square root (raising to the ½ nd power), the specification evidently expects the measurement of the acceleration in terms of vector. The value of weight differs between whole body vibration and vibration of hands and arms. Meanwhile, the method for calibrating an accelerometer concerns the calibration of the amplitude of a one-axis vibration. Evidently, the human body possesses an ability to discern a direction of vibration. The fact that the accelerometer which is used for investigating the influence of the vibration on a human body is calibrated exclusively with the amplitude of acceleration is irrational.

2) The measurement of the motion of a human body yields a valuable basic data for the sports engineering and for the control of a humanoid robot. It is evidently irrational, however, to assume that the direction of a motion of a human body is constantly fixed. The fact that the accelerometer which is used for investigating the motion of a human body is calibrated exclusively with the amplitude of acceleration is irrational.

3) The animal inhabits a real space and the translational motion occurs three-dimensionally. When the rotational motion is also taken into account, it is logical to conclude that the animal inhabits a six-dimensional space. The fact that the inertia sensor for monitoring a behavior is not calibrated in six-dimensional space may well be judged senseless.

4) In the measurement of the motion of a human body and the analysis of a human body motion in the sport engineering, while inertia sensors are attached to joints, arms, and feet, the calibration must be made based on the motion of six degrees of freedom because the motion simultaneously induces a vertical and a horizontal motion and entails a rotary motion produced in a joint.

The 18th aspect of the invention, besides the 10th aspect of the invention, is characterized by particularly the motion generating machine which induces the aforementioned translational motion or rotary motion generating a motion along one axis, the acceleration measuring device, the angular velocity measuring device, or the angular acceleration measuring device which is a temporarily fixed device subject to calibration being furnished with a one-axis output, and the output from the device subject to calibration being furnished with a multi-axis output.

With the exception of the case in which the aforementioned device subject to calibration is one-axis, the accelerometer is expected to be calibrated with a greater degree of freedom than the degree of freedom possessed by the motion generating machine. The number of axes which can be handled is possibly smaller than the number of output axes of the accelerometer expected to be used for calibration. The 19th aspect of the invention, which concerns a method to be applied in such a case to the device for measuring the dynamic matrix sensitivity of the inertia sensor possessing the aforementioned characteristics, is characterized, on the assumption that the aforementioned displacement measuring means produces outputs of different N axes, the degree of freedom of the motion of the aforementioned motion generating machine is a natural number M of not more than 6, and the relation M×N=1 is not satisfied, by dividing the M degrees of freedom into a plurality of groups allowed duplication, 1) obtaining input vectors and corresponding output vectors for each of the groups mentioned above by measurement, 2) subjecting the input vectors and the output vectors to conversion and integration into input vectors possessing M degrees of freedom and corresponding output vectors, and subsequently 3) deriving a dynamic matrix sensitivity from the correspondence of the integrated output vectors to the integrated input vectors.

According to the 20th aspect of the invention, the accuracy of the measurement of acceleration is enhanced. By enabling the filter to have a real-time processing function, when the motion of a structure must be suppressed through the control using the signal from the accelerometers, or when the structure possesses an aim to generate a motion using the signals from accelerometers, the accuracy of control through accelerometers is considerably enhanced. Neither the real-time processing performance is required nor a request for the processing time is strong, so the measurement accuracy can be enhanced through processing of the acquired data using the filtering based on the inverse sensitivity matrix concept.

As other characteristics of the invention, particularly the aforementioned motion generating machine is a motion generating machine which gives vibration in a vibration frequency band detectable by an inertia sensor to be used in an inertial navigation system mounted on an automobile, a submarine, a torpedo, a missile, an airplane, or a guiding device therefor and the aforementioned acceleration measuring device which is a device subject to calibration is an inertia sensor to be used in an inertial navigation system mounted on an automobile, a submarine, a torpedo, a missile, an airplane, or a guiding device therefor. Since the vibration which is exerted on the inertia sensor to be used in an inertial navigation system mounted on an automobile, a submarine, a torpedo, a missile, an airplane, or a guiding device therefor is characterized by simultaneously giving rise to a horizontal motion, a vertical motion, and a rotary motion, the aforementioned motion generating machine is preferred to be enabled to generate a motion conforming to these characteristics.

As other characteristics of the invention, the aforementioned motion generating machine is particularly a motion generating machine which gives vibration in a vibration frequency band detectable by an inertia sensor to be used for preventing the image of an image pickup device or a motion picture device from blurring and the aforementioned acceleration measuring device which is a device subject to calibration is an inertia sensor to be used for preventing the image of an image pickup device or a motion picture device from blurring. Here, since the prevention of the image of an image pickup device or a motion picture device from blurring has an important requirement of fulfilling simultaneous detection of a horizontal motion, a vertical motion, and a rotary motion, the aforementioned motion generating machine is preferred to generate a motion conforming to this situation.

As other characteristics of the invention, the aforementioned motion generating machine is particularly a motion generating machine which gives vibration in a vibration frequency band detectable by an accelerometer to be used for controlling an automobile passenger protecting airbag and the aforementioned acceleration measuring device which is a device subject to calibration is an accelerometer to be used for controlling the automobile passenger protecting airbag. Here, since the accelerometer to be used for controlling the automobile passenger protecting airbag has important characteristic features of fulfilling the following requirement, the aforementioned motion generating device is preferred to be enabled to generate a motion conforming to this situation.

First, though the results of calculation of the absolute values of acceleration in the head-on collision and the lateral collision obtained in the evaluation of safety stipulated by the specification are expected to be below a prescribed level, the actual collisions of cars do not always occur in the form of head-on collision or lateral collision. The accelerometer to be used in the collision safety system, therefore, must always detect the acceleration correctly without relying on the direction of exertion of the acceleration. That is, the calibration must be made in terms of vector.

On the assumption that the inertia sensor possesses K axes, the output vector possibly form a K-dimensional space, and the motion generating machine possesses M degrees of freedom, the K×M-dimensional matrix can be derived for the inertia sensor as a sensitivity matrix. The act of solving all the components of the sensitivity matrix as the function of frequency or as the function of the frequency and the environmental parameters such as the temperature of the inertia sensor and the posture relative to the gravitational acceleration shall be regarded as the calibration.

Since all the components of this matrix are unknown and since the motion generating machine having the inertia sensor mounted thereon is capable of generating a motion of M degrees of freedom, by inducing generation of M independent vector motions and measuring the produced output signals from the K axes, it is made possible to formulate simultaneous linear equations concerning all the components of the K×M-dimensional sensitivity matrix. The solution of the simultaneous linear equations results in deriving a sensitivity matrix composed of the normal sensitivities and the cross sensitivities in a given angular frequency (o.

Even by using a one-axis motion generating machine (actuator), it is theoretically possible to form linearly independent excitation vectors as viewed from the inertia sensor which is subject to calibration. This formation, however, necessitates a variation in the attachment of the multi-axis inertia sensor. The care should be taken to the fact that the detecting mechanisms involved in a plurality of detecting axes do not necessarily function simultaneously while they constantly maintain the influence of gravitational acceleration uniformly without being affected by the attachment with jigs.

BRIEF DESCRIPTION OF THE DRAWINGS

FIG. 4 is a side view illustrating a conventional reference accelerometer and an accelerometer subject to calibration, which are joined in series connection with the sensitivity axis aligned with the direction of motion generated by a motion generating machine.

FIG. 5 is a diagram showing an assembly of one-axis inertia sensors and the relation between the matrix sensitivity of the assembled inertia sensors and the matrix sensitivity of each of the inertia sensors.

Figure 1:
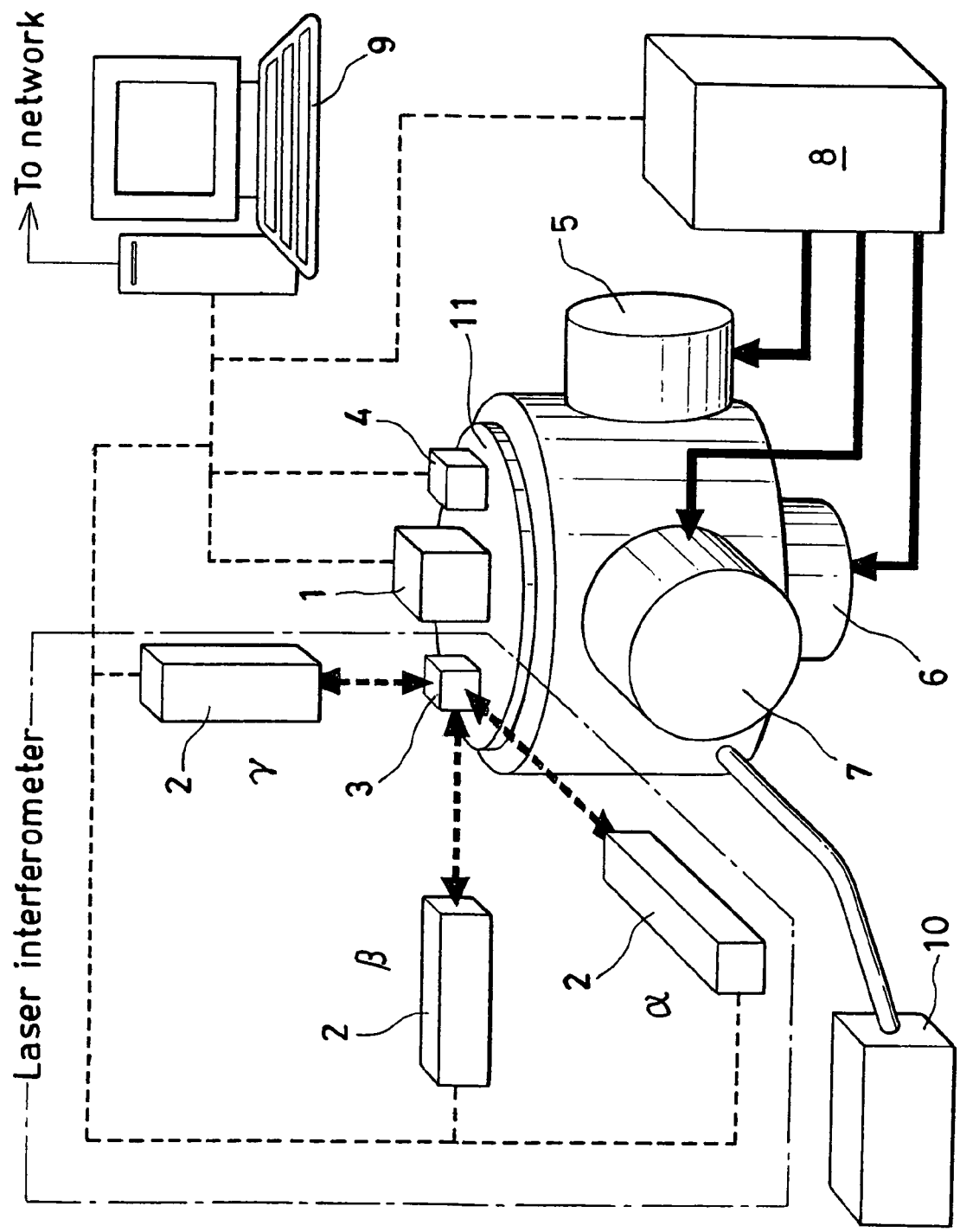
FIG. 1 is a type section showing the configuration for embodying this invention.
Figure 2:
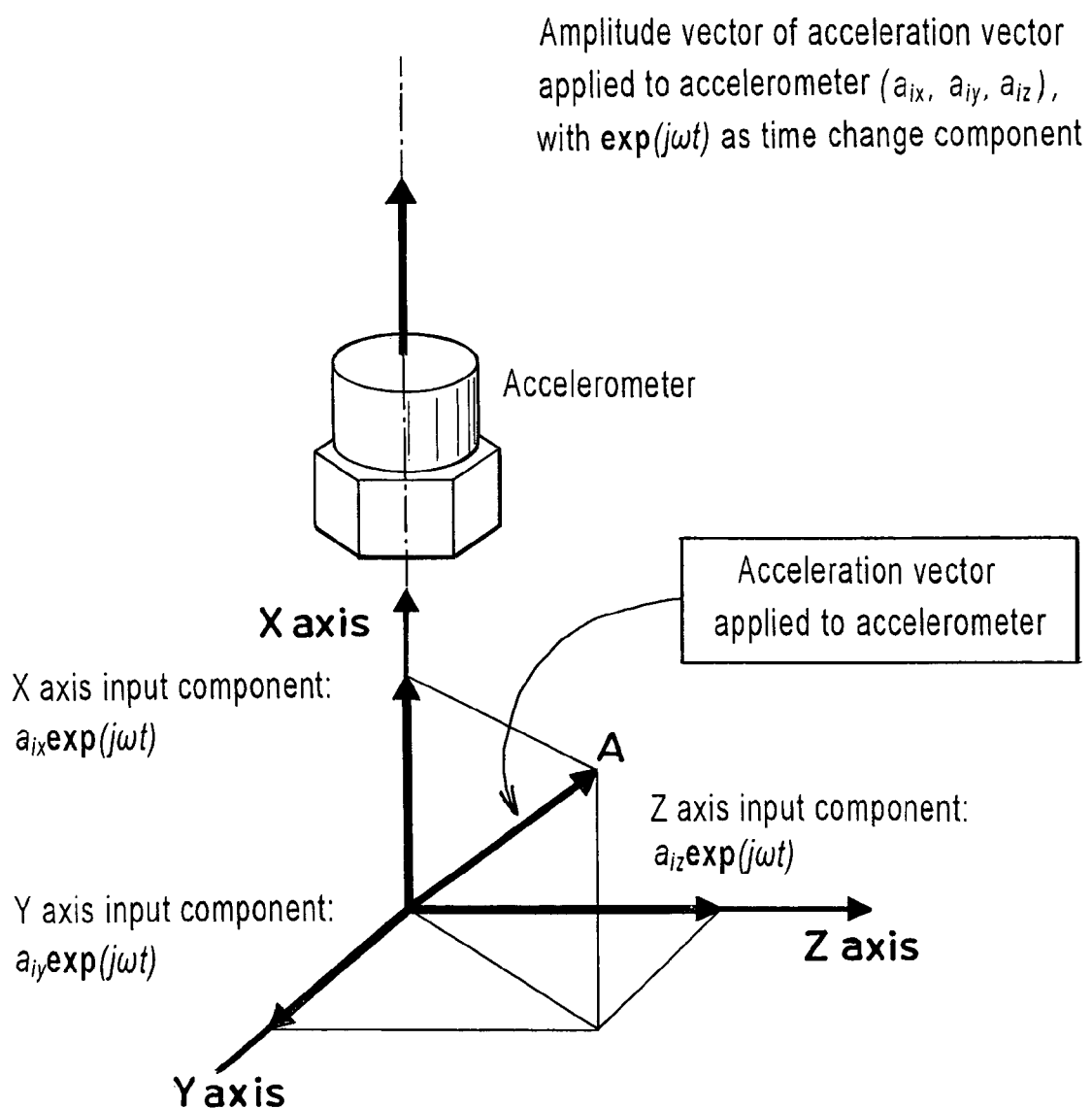
FIG. 2 is a diagram showing the acceleration exerted on the conventional accelerometer and the resolution of the vector thereof.
Figure 3:
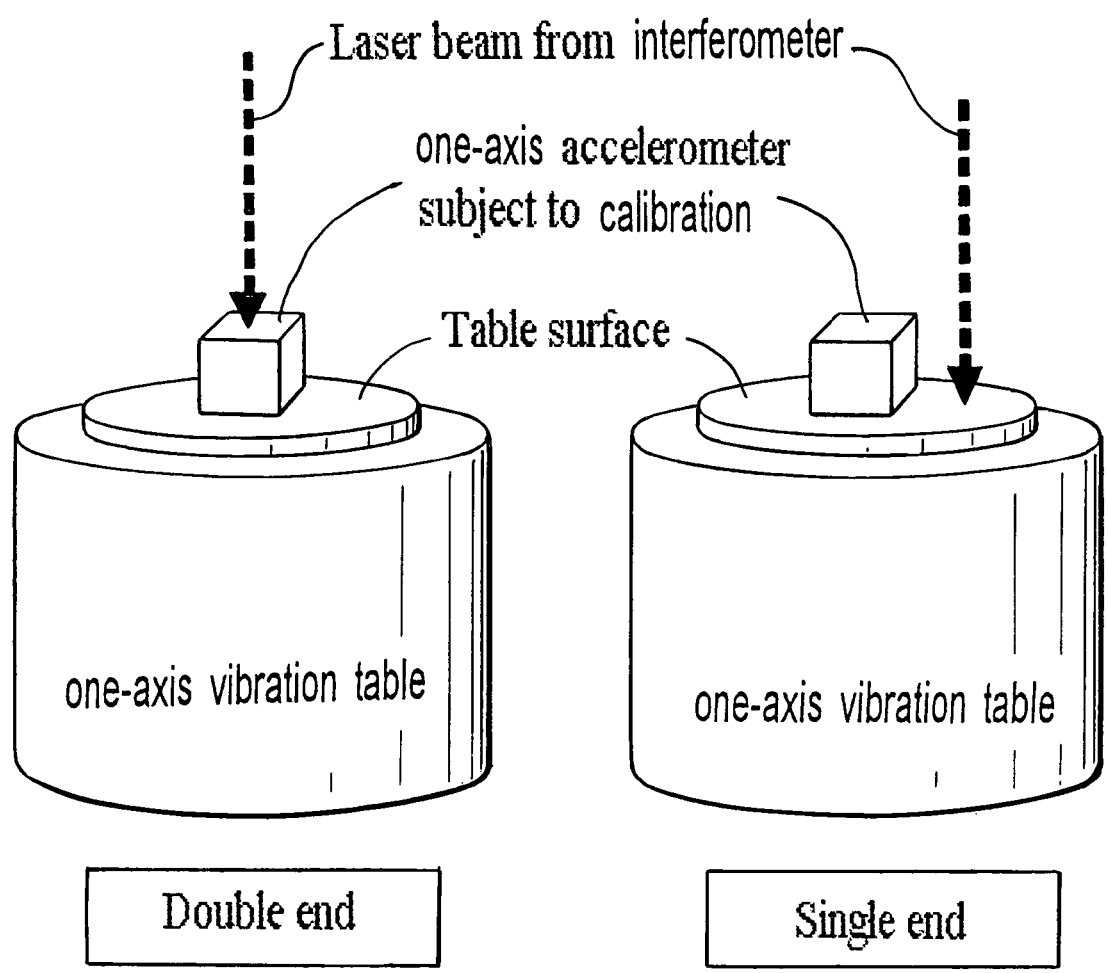
FIG. 3 is a side view illustrating an accelerometer set on the conventional one-axis motion generating machine.

The reference numerals in the diagrams denote the following components.

| | |
|---|---|
| 1 | Accelerometer subject to calibration |
| 2 | Controlling or measuring real time laser interferometer (laser) |
| 3 | Controlling or measuring real time laser interferometer (corner cube) |
| 4 | Controlling inertia sensor having the matrix sensitivity defined |
| 5 | Horizontal translational motion actuator and rotary motion generating actuator |
| 6 | Vertical translational motion actuator and rotary motion generating actuator |
| 7 | Horizontal translational motion actuator and rotary motion generating actuator |
| 8 | Power amplifier |
| 9 | Processor (CPU) |
| 10 | Cooling water piping system |
| 11 | Table |

BEST MODE FOR CARRYING OUT THE INVENTION

This invention will be described more specifically below based on working examples thereof with reference to the accompanying drawings.

Generally, on the assumption that an inertia sensor possesses K sensitivity axes and an output vector space possibly possesses K dimensions and that a motion generating machine as a source of vibration possesses M degrees of freedom, a K×M-dimensional matrix can be derived as the sensitivity matrix of the inertia sensor. The act of solving all the components of the sensitivity matrix as the function of frequency or as the function of the frequency and the environmental parameters such as the posture and the temperature of the inertia sensor relative to the gravitational acceleration is regarded as calibration.

Since all the components of this matrix are unknown and since the motion generating machine having the inertia sensor mounted thereon is capable of generating a motion of M degrees of freedom, by inducing generation of M independent vector motions and measuring the produced output signals from the K axes, it is made possible to formulate simultaneous linear equations concerning all the components of the K×M-dimensional matrix. The solution of the simultaneous linear equations results in deriving a sensitivity matrix composed of the normal sensitivities and the cross sensitivities in a given angular frequency $\omega$.

Now, the components of one example of the configuration for embodying this invention will be explained below with reference to FIG. 1.

FIG. 1 illustrates an accelerometer 1 as a device subject to calibration, a laser 2 for a controlling or measuring real time laser interferometer, a corner cube 3 for the controlling or measuring real time laser interferometer, an inertia sensor 4 for controlling a motion generated by a motion generating machine, a horizontal translational motion actuator and a rotational motion generating actuator 5 and 7 as sources of vibration, a vertical translational motion actuator and rotary motion generating actuator 6 as a source of vibration, a power amplifier 8, a processor 9 concurrently serving as a data processing device, a cooling water piping system 10, and a table 11 as the base for attachment of an inertia sensor subject to calibration.

Here, the laser 2 of the controlling or measuring real time laser interferometer and the corner cube 3 which constantly returns the laser beam from the laser 2 in parallel with the incident light integrally form a controlling or measuring real time laser interferometer and the inertia sensor 4 for controlling a motion generated by a motion generating machine has a matrix sensitivity defined therein. As the device subject to calibration, an angular velocity measuring device or an angular acceleration measuring device may be selected besides the aforementioned accelerometer as an acceleration measuring device.

Further, this device subject to calibration does not need to be a simple acceleration measuring device, angular velocity measuring device, or angular acceleration measuring device but may be a composite body formed by combining such devices. For example, the composite body may be formed by having one-axis accelerometers disposed severally along the X, Y and Z axes of the cubic coordinates or the R, Θ and φ axes of the spherical coordinates. FIG. 5 illustrates an example of the accelerometer having one-axis accelerometers disposed severally along the X, Y and Z axes.

The configuration of FIG. 1 uses a laser interferometer. The fact that a reference accelerometer calibrated with a laser interferometer can be used to calibrate other accelerometers in place of the laser interferometer is evident from the layout and configuration of FIG. 1.

Now, the best mode of embodiment of this invention will be explained below based on working examples.

EXAMPLE 1

First, as Example 1, the case of adopting a one-axis accelerometer as the accelerometer 1 subject to calibration and using a three-dimensional motion generating machine will be explained.

The operating part of the processor 9 is manipulated to transmit control signals to the individual actuators 5, 6 and 7 which are sources of vibration so that the tables of these motion generating machines may generate respectively prescribed motions. At this time, the inertia sensor 4 for controlling the motion generating machine makes measurement through the table 11 to judge whether or not the individual actuators 5, 6 and 7 are operating with prescribed vibrations and the processor 9 generates a control signal based on the difference between the waveform of the target motion of the table and the actually measured waveform and transmits control signals to the individual actuators 5, 6 and 7 so that the actuators 5, 6 and 7 may produce prescribed vibrations.

Thus, the prescribed vibrations are imparted to the actuators 5, 6 and 7 and the output signal from the accelerometer 1 as an inertia sensor is input to the processor 9 by using one of the sensitivity axes of the accelerometer 1 as the X axis. Here, for the sake of brevity, the signals produced by carrying out Laplace transform to the output signals will be used in the following explanation. The output signals which have undergone the Laplace transform will be denoted by $(a_{ox}(j\omega), 0, 0)$. The letter $\omega$ denotes the angular frequency. The Y axis component and the Z axis component are both zero as a matter of course.

The controlling or measuring real time laser interferometers 2 and 3, which are means for measuring the input to the accelerometer 1, measure the input acceleration to the accelerometer 1 through the table 11. The measured input acceleration which has undergone the Laplace transform are denoted by $(a_{ix}(j\omega), a_{iy}(j\omega), a_{iz}(j\omega))$. It is not stipulated that the input acceleration falls on the sensitivity axis of the accelerometer 1. When this stipulation is accepted, it does not result in supporting a conclusion that the input acceleration is regarded as a vector.

Incidentally, the Laplace transform of the input acceleration is used here for the purpose of specifically indicating the response to the input in accordance with the definition of transfer function.

Thus, the actuators 5, 6 and 7 are exposed to the respective prescribed vibrations and the output signals from the accelerometer 1 are input to the processor 9 by using one of the sensitivity axes of the accelerometer 1 as an inertia sensor as the X axis. Here, the output signals which have undergone the Laplace transform according to the definition of transfer function will be used in the explanation. The output signals which have undergone the Laplace transform will be denoted by $(a_{ox}(j\omega), 0, 0)$. The letter $\omega$ denotes the angular frequencies. The Y axis component and the Z axis component are both zero as a matter of course.

The controlling or measuring real time laser interferometers 2 and 3 that are means for measuring the input to the accelerometer 1, measure the input acceleration to the accelerometer 1 through the table 11. The measured input acceleration which has undergone the Laplace transform are denoted by $(a_{ix}(j\omega), a_{iy}(j\omega), a_{iz}(j\omega))$. It is not stipulated that the input acceleration falls on the sensitivity axis of the accelerometer 1. When this stipulation is accepted, it does not result in supporting a conclusion that the input acceleration is regarded as a vector.

Incidentally, the Laplace transform of the input acceleration is used here for the purpose of specifically indicating the response to the input in accordance with the definition of transfer function. The method for numerically processing the acquired data is known in various kinds and the software for this processing is easily procurable. Thus, the numerical data aimed at may be determined based on the condition of the data and the target precision of processing.

In this case, the matrix sensitivity is expressed by the matrix of 1×3 $(S_{x,x}, S_{x,y}, S_{x,z})$. $S_{x,x}$, $S_{x,y}$ and $S_{x,z}$ denote respectively the normal sensitivity expressing the relation of the X axis output signal to the X axis input component of the accelerometer 1, the cross sensitivity expressing the relation of the X axis output signal to the Y axis input component of the acceleration, and the cross sensitivity expressing the relation of the X axis output signal to the Z axis input component of the acceleration. At this time, the relation between the output signal and the input signal is expressed by the aforementioned Mathematical 1.

The three-dimensional motion generating machine is capable of forming three independent vector motion accelerations in a three-dimensional space. These vector motion accelerations are denoted respectively by $(a_{ix1}, a_{iy1}, a_{iz1})\exp(j\omega t)$, $(a_{ix2}, a_{iy2}, a_{iz2})\exp(j\omega t)$ and $(a_{ix3}, a_{iy3}, a_{iz3})\exp(j\omega t)$. By substituting these accelerations in the Mathematical 1, the following relation is established. The terms $a_{ox1}$, $a_{oy1}$, and $a_{oz1}$ denote complex numbers as the functions of $\omega$ taking into account the initial phase relative to $\exp(j\omega t)$ and the gain.

$$a_{ox1}(\omega)=S_{x,x}(\omega)a_{ix1}+S_{x,y}(\omega)a_{iy1}+S_{x,z}(\omega)a_{iz1}$$

$$a_{ox2}(\omega)=S_{x,x}(\omega)a_{ix2}+S_{x,y}(\omega)a_{iy2}+S_{x,z}(\omega)a_{iz2}$$

$$a_{ox3}(\omega)=S_{x,x}(\omega)a_{ix3}+S_{x,y}(\omega)a_{iy3}+S_{x,z}(\omega)a_{iz3} \qquad \text{(Mathematical 2)}$$

Mathematical 2 represents simultaneous linear equations which concern $(S_{x,x}, S_{x,y}, S_{x,z})$ in each of the numbers of angular frequency $\omega$ and the coefficient matrix has a solution with respect to $(S_{x,x}, S_{x,y}, S_{x,z})$ because $(a_{ixk}, a_{iyk}, a_{izk})$ (k=1, 2, 3) are independent and, consequently, the determinant is not zero.

The consequence is that the normal sensitivity $S_{x,x}$, and cross sensitivities $S_{x,y}$ and $S_{x,z}$ are determinable. By acquiring an experimental data with various numbers of angular frequencies and solving the simultaneous linear equations of Mathematical 2 obtained with the various angular frequencies, it is made possible to measure the normal sensitivity and the lateral sensitivity as the functions of the angular frequencies.

EXAMPLE 2

Example 2 represents the case of adopting a two-axis accelerometer as the accelerometer 1 subject to calibration and using a three-dimensional motion generating machine. The output signals of the accelerometer 1 are input to the processor 9 by using the two sensitivity axes of the accelerometer 1 as X axis and Y axis. The processor 9 subjects the output signals to Laplace transform and consequently obtains $(a_{ox}(j\omega), a_{oy}(j\omega), 0)$. The letter $\omega$ denotes the angular frequencies. The Z axis component is zero of course. Similarly, the laser interferometer 2 measures the input acceleration of the accelerometer 1 and the processor 9 subjects the input acceleration to Laplace transform and consequently obtains $(a_{ix}(j\omega), a_{iy}(j\omega), a_{iz}(j\omega))$. It is not stipulated that the input acceleration falls on a plane (sensitivity plane) determined by the two sensitivity axes of the accelerometer 1. When this stipulation is accepted, it does not result in supporting a conclusion that the input acceleration is regarded as a vector. At this time, the matrix sensitivity is expressed by the matrix of 2×3 shown by the following Mathematical 3.

$$\begin{pmatrix} S_{x,x}, S_{x,y}, S_{x,z} \\ S_{y,x}, S_{y,y}, S_{y,z} \end{pmatrix} \quad \text{(Mathematical 3)}$$

$S_{x,x}$, $S_{x,y}$ and $S_{x,z}$ denote respectively the normal sensitivity expressing the relation of the X axis output signal to the X axis input component of the accelerometer 1, the cross sensitivity expressing the relation of the X axis output signal to the Y axis input component of the acceleration, and the cross sensitivity expressing the relation of the X axis output signal to the Z axis input component of the acceleration. Each of $S_{y,x}$, $S_{y,y}$ and $S_{y,z}$ expresses the relation of the input signal to the Y axis output of the accelerometer 1. $S_{y,x}$ represents the cross sensitivity expressing the relation of the Y axis output signal to the X axis input component of the acceleration, $S_{y,y}$ represents the normal sensitivity expressing the relation of the Y axis output signal to the Y axis input component of the acceleration, and $S_{y,z}$ represents the cross sensitivity expressing the relation of the Y axis output signal to the Z axis input component of the acceleration. In this case, the relation between the input vector and the output vector is expressed by Mathematical 4.

$$\begin{pmatrix} a_{ox}(\omega)\exp(j\omega t) \\ a_{oy}(\omega)\exp(j\omega t) \end{pmatrix} = \quad \text{(Mathematical 4)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \end{pmatrix} \begin{pmatrix} a_{ix}\exp(j\omega t) \\ a_{iy}\exp(j\omega t) \\ a_{iz}\exp(j\omega t) \end{pmatrix}$$

The three-dimensional motion generating machine is capable of forming three independent vector vibration accelerations in a three-dimensional space. These accelerations will be expressed as follows:

$(a_{ix1}, a_{iy1}, a_{iz1})\exp(j\omega t)$, $(a_{ix2}, a_{iy2}, a_{iz2})\exp(j\omega t)$ and $(a_{ix3}, a_{iy3}, a_{iz3})\exp(j\omega t)$.

By substituting these accelerations in Mathematical 1, the following relation is established. The terms $a_{ox1}$ and $a_{oy1}$ (i=1, 2, 3) are complex numbers as the functions of ω which take into account the initial phase relative to exp(jωt) and the gain. When these complex numbers are substituted in Mathematical 4, the following three formulas, i.e. Mathematical 5, Mathematical 6 and Mathematical 7, are established. When these formulas are unified as simultaneous linear equations concerning all the components of the sensitivity matrix, Mathematical 8 is derived.

$$\begin{pmatrix} a_{ox1}(\omega)\exp(j\omega t) \\ a_{oy1}(\omega)\exp(j\omega t) \end{pmatrix} = \quad \text{(Mathematical 5)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \end{pmatrix} \begin{pmatrix} a_{ix1}\exp(j\omega t) \\ a_{iy1}\exp(j\omega t) \\ a_{iz1}\exp(j\omega t) \end{pmatrix}$$

-continued $$\begin{pmatrix} a_{ox2}(\omega)\exp(j\omega t) \\ a_{oy2}(\omega)\exp(j\omega t) \end{pmatrix} = \quad \text{(Mathematical 6)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \end{pmatrix} \begin{pmatrix} a_{ix2}\exp(j\omega t) \\ a_{iy2}\exp(j\omega t) \\ a_{iz2}\exp(j\omega t) \end{pmatrix}$$

$$\begin{pmatrix} a_{ox3}(\omega)\exp(j\omega t) \\ a_{oy3}(\omega)\exp(j\omega t) \end{pmatrix} = \quad \text{(Mathematical 7)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \end{pmatrix} \begin{pmatrix} a_{ix3}\exp(j\omega t) \\ a_{iy3}\exp(j\omega t) \\ a_{iz3}\exp(j\omega t) \end{pmatrix}$$

$$\begin{pmatrix} a_{ix1} & a_{iy1} & a_{iz1} & 0 & 0 & 0 \\ 0 & 0 & 0 & a_{ix1} & a_{iy1} & a_{iz1} \\ a_{ix2} & a_{iy2} & a_{iz2} & 0 & 0 & 0 \\ 0 & 0 & 0 & a_{ix2} & a_{iy2} & a_{iz2} \\ a_{ix3} & a_{iy3} & a_{iz3} & 0 & 0 & 0 \\ 0 & 0 & 0 & a_{ix3} & a_{iy3} & a_{iz3} \end{pmatrix} \begin{pmatrix} S_{x,x} \\ S_{x,y} \\ S_{x,z} \\ S_{y,x} \\ S_{y,y} \\ S_{y,z} \end{pmatrix} = \begin{pmatrix} a_{ox1} \\ a_{oy1} \\ a_{ox2} \\ a_{oy2} \\ a_{ox3} \\ a_{oy3} \end{pmatrix} \quad \text{(Mathematical 8)}$$

Since the three vectors ($a_{ixk}$, $a_{iyk}$, $a_{izk}$) (k=1, 2, 3) in Mathematical 8 are linearly independent, it is only plain that the six vectors shown below:

($a_{ixk}$, $a_{iyk}$, $a_{izk}$, 0, 0, 0) (k=1, 2, 3) and (0, 0, 0, $a_{ixk}$, $a_{iyk}$, $a_{izk}$) (k=1, 2, 3)

are linearly independent. Since the determinant of the simultaneous linear equations is not zero, it is only logical to conclude that they are capable of being solved without fail. The sensitivity $S_{i,j}$ (i=x, y, j=x, y, z) is a normal sensitivity when the suffixes are equal or a cross sensitivity when the suffices are not equal. The processor 9 is enabled, by acquiring an experimental data with a varying angular frequencies and solving eight sets of simultaneous linear equations obtained individually with the varying numbers of angular frequencies, to measure the normal sensitivities and the cross sensitivities as functions of the angular frequencies.

EXAMPLE 3

Example 3 represents the case of adopting a three-axis accelerometer as the accelerometer 1 (inertia sensor) subject to calibration and using a three-dimensional motion generating machine. The output signals of the accelerometer 1 are input to the processor 9 by using the three sensitivity axes of the accelerometer 1 as the inertia sensor, i.e. X axis, Y axis and Z axis. The processor 9 subjects the output signals to Laplace transform and consequently obtains ($a_{ox}(j\omega)$, $a_{oy}(j\omega)$, $a_{oz}(j\omega)$). The letter to denotes the angular frequencies.

Similarly, the laser interferometer 2 measures the input acceleration of the accelerometer 1 and the processor 9 subjects the input acceleration to Laplace transform and consequently obtains ($a_{ix}(j\omega)$, $a_{iy}(j\omega)$, $a_{iz}(j\omega)$). It is not stipulated generally that the input acceleration falls on a vector space (sensitivity space) determined by the three sensitivity axes of the accelerometer. When this stipulation is accepted, it does not result in supporting a conclusion that the input acceleration is regarded as a vector. The accelerometer 1 projects the input acceleration space on a sensitivity vector space. At this time, the matrix sensitivity is expressed by the matrix of 3×3 shown below.

$$\begin{pmatrix} S_{x,x}, S_{x,y}, S_{x,z} \\ S_{y,x}, S_{y,y}, S_{y,z} \\ S_{z,x}, S_{z,y}, S_{z,z} \end{pmatrix} \quad \text{(Mathematical 9)}$$

Each of $S_{x,x}$, $S_{x,y}$ and $S_{x,z}$ expresses the relation of the input signal to the accelerometer 1 to the X axis output of the accelerometer 1. $S_{x,x}$ denotes the normal sensitivity expressing the relation of the X axis output to the X axis input component, $S_{x,y}$ denotes the cross sensitivity expressing the relation of the X axis output signal to the Y axis input component of the acceleration, and $S_{x,z}$ denotes the cross sensitivity expressing the relation of the X axis output signal to the Z axis input component of the acceleration. Each of $S_{y,x}$, $S_{y,y}$ and $S_{y,z}$ expresses the relation of the input signal to the Y axis output of the accelerometer 1. $S_{y,x}$ denotes the cross sensitivity expressing the relation of the Y axis output signal to the X axis input component of the acceleration, $S_{y,y}$ denotes the normal sensitivity expressing the relation of the Y axis output signal to the Y axis input component of the acceleration, and $S_{y,z}$ denotes the cross sensitivity expressing the relation of the Y axis output signal to the Z axis input component of the acceleration. Each of $S_{z,x}$, $S_{z,y}$ and $S_{z,z}$ expresses the relation of the input-output signal to the Z axis output of the accelerometer 1.

$S_{z,x}$ denotes the cross sensitivity expressing the relation of the Z axis output signal to the X axis input component of the accelerometer 1, $S_{z,y}$ denotes the cross sensitivity expressing the relation of the Z axis output signal to the Y axis input component of the accelerometer 1, and $S_{z,z}$ denotes the normal sensitivity expressing the relation of the Z axis output signal to the Z axis input component of the accelerometer 1. At this time, the relation between the input vector and the output vector is expressed by the following Mathematical 10.

$$\begin{pmatrix} a_{ox}(\omega)\exp(j\omega t) \\ a_{oy}(\omega)\exp(j\omega t) \\ a_{oz}(\omega)\exp(j\omega t) \end{pmatrix} = \quad \text{(Mathematical 10)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} a_{ix}\exp(j\omega t) \\ a_{iy}\exp(j\omega t) \\ a_{iz}\exp(j\omega t) \end{pmatrix}$$

The three-dimensional motion generating machine is capable of forming three independent vector vibration accelerations in a three-dimensional space. These accelerations will be expressed as $(a_{ix1}, a_{iy1}, a_{iz1})\exp(j\omega t)$, $(a_{ix2}, a_{iy2}, a_{iz2})\exp(j\omega t)$, and $(a_{ix3}, a_{iy3}, a_{iz3})\exp(j\omega t)$.

By substituting these accelerations, in Mathematical 10, the following three equations, Mathematical 11, Mathematical 12 and Mathematical 13 are established. The terms $a_{oxi}$, $a_{oyi}$ and $a_{ozi}$ ($i=1, 2, 3$) are complex numbers as the functions of $\omega$ which take into account the initial phase relative to $\exp(j\omega t)$ and the gain. When these formulas are unified as simultaneous linear equations concerning all the components of the sensitivity matrix, Mathematical 14 is derived.

$$\begin{pmatrix} a_{ox1}(\omega)\exp(j\omega t) \\ a_{oy1}(\omega)\exp(j\omega t) \\ a_{oz1}(\omega)\exp(j\omega t) \end{pmatrix} = \quad \text{(Mathematical 11)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} a_{ix1}\exp(j\omega t) \\ a_{iy1}\exp(j\omega t) \\ a_{iz1}\exp(j\omega t) \end{pmatrix}$$

$$\begin{pmatrix} a_{ox2}(\omega)\exp(j\omega t) \\ a_{oy2}(\omega)\exp(j\omega t) \\ a_{oz2}(\omega)\exp(j\omega t) \end{pmatrix} = \quad \text{(Mathematical 12)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} a_{ix2}\exp(j\omega t) \\ a_{iy2}\exp(j\omega t) \\ a_{iz2}\exp(j\omega t) \end{pmatrix}$$

$$\begin{pmatrix} a_{ox3}(\omega)\exp(j\omega t) \\ a_{oy3}(\omega)\exp(j\omega t) \\ a_{oz3}(\omega)\exp(j\omega t) \end{pmatrix} = \quad \text{(Mathematical 13)}$$

$$\begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} a_{ix3}\exp(j\omega t) \\ a_{iy3}\exp(j\omega t) \\ a_{iz3}\exp(j\omega t) \end{pmatrix}$$

$$\begin{pmatrix} a_{ix1} & a_{iy1} & a_{iz1} & 0 & 0 & 0 & 0 & 0 & 0 \\ 0 & 0 & 0 & a_{ix1} & a_{iy1} & a_{iz1} & 0 & 0 & 0 \\ 0 & 0 & 0 & 0 & 0 & 0 & a_{ix1} & a_{iy1} & a_{iz1} \\ a_{ix2} & a_{iy2} & a_{iz2} & 0 & 0 & 0 & 0 & 0 & 0 \\ 0 & 0 & 0 & a_{ix2} & a_{iy2} & a_{iz2} & 0 & 0 & 0 \\ 0 & 0 & 0 & 0 & 0 & 0 & a_{ix2} & a_{iy2} & a_{iz2} \\ a_{ix3} & a_{iy3} & a_{iz3} & 0 & 0 & 0 & 0 & 0 & 0 \\ 0 & 0 & 0 & a_{ix3} & a_{iy3} & a_{iz3} & 0 & 0 & 0 \\ 0 & 0 & 0 & 0 & 0 & 0 & a_{ix3} & a_{iy3} & a_{iz3} \end{pmatrix} \quad \text{(Mathematical 14)}$$

$$\begin{pmatrix} S_{xx} \\ S_{xy} \\ S_{xz} \\ S_{yx} \\ S_{yy} \\ S_{yz} \\ S_{zx} \\ S_{zy} \\ S_{zz} \end{pmatrix} = \begin{pmatrix} a_{ox1} \\ a_{oy1} \\ a_{oz1} \\ a_{ox2} \\ a_{oy2} \\ a_{oz2} \\ a_{ox3} \\ a_{oy3} \\ a_{oz3} \end{pmatrix}$$

Since the three vectors $(a_{ixk}, a_{iyk}, a_{izk})$ ($k=1, 2, 3$) in Mathematical 14 are linearly independent, it is only plain that the 9 vectors shown in the coefficient determinant $(a_{ixk}, a_{iyk}, a_{izk}, 0, 0, 0, 0, 0, 0)$ ($k=1, 2, 3$)
$(0, 0, 0, a_{ixk}, a_{iyk}, a_{izk}, 0, 0, 0)$ ($k=1, 2, 3$) and
$(0, 0, 0, 0, 0, 0, a_{ixk}, a_{iyk}, a_{izk})$ ($k=1, 2, 3$)

are linearly independent. Since the coefficient determinant of Mathematical 14 is not zero, it is only logical to conclude that they are capable of being solved without fail. The sensitivity $S_{i,j}$ ($i=x, y, z, j=x, y, z$) is a normal sensitivity when the suffixes are equal or a cross sensitivity when the suffices are not equal. The processor 9 is enabled, by acquiring an experimental data with a varying angular frequencies and solving the simultaneous linear equations of Mathematical 14 obtained individually with the varying angular frequencies, to measure the normal sensitivities and the cross sensitivities as functions of the angular frequencies.

EXAMPLE 4

Example 4 represents the case of adopting a three-axis accelerometer+an angular accelerometer of one degree of freedom as an accelerometer 1 (inertia sensor) subject to calibration and using a four-dimensional motion generating machine (translational motion of 3 degrees of freedom and angular acceleration of one degree of freedom). The sensitivity axes of the three translational motions of the accelerometer 1 as an inertia sensor are denoted by X axis, Y axis and Z axis and the input axis and the output axis of the angular acceleration around the X axis are denoted by a axis.

The output signals of the accelerometer 1 are input to the processor 9 and the processor 9 subjects the output signals to Laplace transform and consequently obtains ($a_{ox}(j\omega)$, $a_{oy}(j\omega)$, $a_{oz}(j\omega)$ and $a_{o\alpha}(j\omega)$). The letter $\omega$ denotes the angular frequencies. Similarly, the laser interferometer 2 measures the input acceleration of the accelerometer 1 and the processor 9 subjects the input acceleration to Laplace transform and consequently obtains ($a_{ix}(j\omega)$, $a_{iy}(j\omega)$, $a_{iz}(j\omega)$, $a_{i\alpha a}(j\omega)$).

It is not stipulated generally that the input acceleration falls on a vector space (sensitivity space) determined by the four sensitivity axes of the inertia sensor. When this stipulation is accepted, it does not result in supporting a conclusion that the input acceleration is regarded as a vector. The accelerometer 1 is a sensor which fulfills the function of projecting the input acceleration space on the output acceleration space. At this time, the matrix sensitivity is expressed by the matrix of 4×4 as shown below.

$$\begin{pmatrix} S_{x,x}, S_{x,y}, S_{x,z}, S_{x,a} \\ S_{y,x}, S_{y,y}, S_{y,z}, S_{y,a} \\ S_{z,x}, S_{z,y}, S_{z,z}, S_{z,a} \\ S_{a,x}, S_{a,y}, S_{a,z}, S_{a,a} \end{pmatrix}$$ (Mathematical 15)

Each of $S_{x,x}$, $S_{x,y}$, $S_{x,z}$ and $S_{x,\alpha}$ expresses the relation of the input signal to the X axis output of the accelerometer 1. $S_{x,x}$ denotes the normal sensitivity expressing the relation of the X axis output to the X axis input component, $S_{x,y}$ denotes the cross sensitivity expressing the relation of the X axis output signal to the Y axis input component of the acceleration, $S_{x,z}$ denotes the cross sensitivity expressing the relation of the X axis output signal to the Z axis input component of the acceleration, and $S_{x,\alpha}$ denotes the cross sensitivity expressing the relation of the X axis output signal to the $\alpha$ axis input component of the acceleration.

Each of $S_{y,x}$, $S_{y,y}$, $S_{y,z}$ and $S_{y,\alpha}$ expresses the relation of the input signal to the Y axis output of the accelerometer 1. $S_{y,x}$ denotes the cross sensitivity expressing the relation of the Y axis output signal to the X axis input component of the acceleration, $S_{y,y}$ denotes the normal sensitivity expressing the relation of the Y axis output signal to the Y axis input component of the acceleration, $S_{y,z}$ denotes the cross sensitivity expressing the relation of the Y axis output signal to the Z axis input component of the acceleration, and $S_{y,\alpha}$ denotes the cross sensitivity expressing the relation of the Y axis output signal to the $\alpha$ axis input component of the acceleration.

Each of $S_{z,x}$, $S_{z,y}$, $S_{z,z}$ and $S_{z,\alpha}$ expresses the relation of the input signal to the Z axis output of the accelerometer 1. $S_{z,x}$ denotes the cross sensitivity expressing the relation of the Z axis output signal to the X axis input component of the acceleration, $S_{z,y}$ denotes the cross sensitivity expressing the relation of the Z axis output signal to the Y axis input component of the acceleration, $S_{z,z}$ denotes the normal sensitivity expressing the relation of the Z axis output signal to the Z axis input component of the acceleration, and $S_{z,\alpha}$ denotes the cross sensitivity expressing the relation of the Z axis output signal to the $\alpha$ axis input component of the acceleration.

Each of $S_{\alpha,x}$, $S_{\alpha,y}$, $S_{\alpha,z}$ and $S_{\alpha,\alpha}$ expresses the relation of the input signal to the $\alpha$ axis output of the accelerometer 1. $S_{\alpha,x}$ denotes the cross sensitivity expressing the relation of the $\alpha$ axis output signal to the X axis input component of the acceleration, $S_{\alpha,y}$ denotes the cross sensitivity expressing the relation of the $\alpha$ axis output signal to the Y axis input component of the acceleration, $S_{\alpha,z}$ denotes the cross sensitivity expressing the relation of the $\alpha$ axis output signal to the Z axis input component of the acceleration, and $S_{\alpha,\alpha}$ denotes the normal sensitivity expressing the relation of the $\alpha$ axis output signal to the $\alpha$ axis input component of the acceleration. At this time, the relation between the input vector and the output vector is expressed by the following Mathematical 16.

$$\begin{pmatrix} a_{ox}(\omega)\exp(j\omega t) \\ a_{oy}(\omega)\exp(j\omega t) \\ a_{oz}(\omega)\exp(j\omega t) \\ a_{o\alpha}(\omega)\exp(j\omega t) \end{pmatrix} =$$ (Mathematical 16)

$$\begin{pmatrix} S_{x,x}(\omega), S_{x,y}(\omega), S_{x,z}(\omega), S_{x,\alpha}(\omega) \\ S_{y,x}(\omega), S_{y,y}(\omega), S_{y,z}(\omega), S_{y,\alpha}(\omega) \\ S_{z,x}(\omega), S_{z,y}(\omega), S_{z,z}(\omega), S_{z,\alpha}(\omega) \\ S_{\alpha,x}(\omega), S_{\alpha,y}(\omega), S_{\alpha,z}(\omega), S_{\alpha,\alpha}(\omega) \end{pmatrix} \begin{pmatrix} a_{ix}\exp(j\omega t) \\ a_{iy}\exp(j\omega t) \\ a_{iz}\exp(j\omega t) \\ a_{i\alpha}\exp(j\omega t) \end{pmatrix}$$

The four-dimensional motion generating machine is capable of forming four independent vector vibration accelerations in a four-dimensional space. These accelerations will be expressed as follows:

($a_{ix1}$, $a_{iy1}$, $a_{iz1}$, $a_{i\alpha1}$)exp(j$\omega$t), ($a_{ix2}$, $a_{iy2}$, $a_{iz2}$, $a_{i\alpha2}$)exp(j$\omega$t), ($a_{ix3}$, $a_{iy3}$, $a_{iz3}$, $a_{i\alpha3}$)exp(j$\omega$t) and ($a_{ix4}$, $a_{iy4}$, $a_{iz4}$, $a_{i\alpha4}$)exp(j$\omega$t).

By substituting these accelerations in Mathematical 16, the following four equations, Mathematical 17, Mathematical 18, Mathematical 19 and Mathematical 20 are established. The terms $a_{oxi}$, $a_{oyi}$, $a_{ozi}$ and $a_{o\alpha i}$ (i=1, 2, 3, 4) are complex numbers as the functions of $\omega$ which take into account the initial phase relative to exp(j$\omega$t) and the gain. When the four equations, i.e. Mathematical 17, Mathematical 18, Mathematical 19 and Mathematical 20, are unified as simultaneous linear equations concerning all the components of the sensitivity matrix, Mathematical 21 is derived.

$$\begin{pmatrix} a_{ox1}(\omega)\exp(j\omega t) \\ a_{oy1}(\omega)\exp(j\omega t) \\ a_{oz1}(\omega)\exp(j\omega t) \\ a_{o\alpha 1}(\omega)\exp(j\omega t) \end{pmatrix} = \begin{pmatrix} S_{x,x}(\omega), S_{x,y}(\omega), S_{x,z}(\omega), S_{x,\alpha}(\omega) \\ S_{y,x}(\omega), S_{y,y}(\omega), S_{y,z}(\omega), S_{y,\alpha}(\omega) \\ S_{z,x}(\omega), S_{z,y}(\omega), S_{z,z}(\omega), S_{z,\alpha}(\omega) \\ S_{\alpha,x}(\omega), S_{\alpha,y}(\omega), S_{\alpha,z}(\omega), S_{\alpha,\alpha}(\omega) \end{pmatrix} \begin{pmatrix} a_{ix1}\exp(j\omega t) \\ a_{iy1}\exp(j\omega t) \\ a_{iz1}\exp(j\omega t) \\ a_{i\alpha 1}\exp(j\omega t) \end{pmatrix}$$

(Mathematical 17)

$$\begin{pmatrix} a_{ox2}(\omega)\exp(j\omega t) \\ a_{oy2}(\omega)\exp(j\omega t) \\ a_{oz2}(\omega)\exp(j\omega t) \\ a_{o\alpha 2}(\omega)\exp(j\omega t) \end{pmatrix} = \begin{pmatrix} S_{x,x}(\omega), S_{x,y}(\omega), S_{x,z}(\omega), S_{x,\alpha}(\omega) \\ S_{y,x}(\omega), S_{y,y}(\omega), S_{y,z}(\omega), S_{y,\alpha}(\omega) \\ S_{z,x}(\omega), S_{z,y}(\omega), S_{z,z}(\omega), S_{z,\alpha}(\omega) \\ S_{\alpha,x}(\omega), S_{\alpha,y}(\omega), S_{\alpha,z}(\omega), S_{\alpha,\alpha}(\omega) \end{pmatrix} \begin{pmatrix} a_{ix2}\exp(j\omega t) \\ a_{iy2}\exp(j\omega t) \\ a_{iz2}\exp(j\omega t) \\ a_{i\alpha 2}\exp(j\omega t) \end{pmatrix}$$

(Mathematical 18)

$$\begin{pmatrix} a_{ox3}(\omega)\exp(j\omega t) \\ a_{oy3}(\omega)\exp(j\omega t) \\ a_{oz3}(\omega)\exp(j\omega t) \\ a_{o\alpha 3}(\omega)\exp(j\omega t) \end{pmatrix} = \begin{pmatrix} S_{x,x}(\omega), S_{x,y}(\omega), S_{x,z}(\omega), S_{x,\alpha}(\omega) \\ S_{y,x}(\omega), S_{y,y}(\omega), S_{y,z}(\omega), S_{y,\alpha}(\omega) \\ S_{z,x}(\omega), S_{z,y}(\omega), S_{z,z}(\omega), S_{z,\alpha}(\omega) \\ S_{\alpha,x}(\omega), S_{\alpha,y}(\omega), S_{\alpha,z}(\omega), S_{\alpha,\alpha}(\omega) \end{pmatrix} \begin{pmatrix} a_{ix3}\exp(j\omega t) \\ a_{iy3}\exp(j\omega t) \\ a_{iz3}\exp(j\omega t) \\ a_{i\alpha 3}\exp(j\omega t) \end{pmatrix}$$

(Mathematical 19)

$$\begin{pmatrix} a_{ox4}(\omega)\exp(j\omega t) \\ a_{oy4}(\omega)\exp(j\omega t) \\ a_{oz4}(\omega)\exp(j\omega t) \\ a_{o\alpha 4}(\omega)\exp(j\omega t) \end{pmatrix} = \begin{pmatrix} S_{x,x}(\omega), S_{x,y}(\omega), S_{x,z}(\omega), S_{x,\alpha}(\omega) \\ S_{y,x}(\omega), S_{y,y}(\omega), S_{y,z}(\omega), S_{y,\alpha}(\omega) \\ S_{z,x}(\omega), S_{z,y}(\omega), S_{z,z}(\omega), S_{z,\alpha}(\omega) \\ S_{\alpha,x}(\omega), S_{\alpha,y}(\omega), S_{\alpha,z}(\omega), S_{\alpha,\alpha}(\omega) \end{pmatrix} \begin{pmatrix} a_{ix4}\exp(j\omega t) \\ a_{iy4}\exp(j\omega t) \\ a_{iz4}\exp(j\omega t) \\ a_{i\alpha 4}\exp(j\omega t) \end{pmatrix}$$

(Mathematical 20)

$$\begin{pmatrix} a_{ix1} & a_{iy1} & a_{iz1} & a_{i\alpha 1} & 0 & 0 & 0 & 0 & 0 & 0 & 0 & 0 & 0 & 0 & 0 & 0 \\ 0 & 0 & 0 & 0 & a_{ix1} & a_{iy1} & a_{iz1} & a_{i\alpha 1} & 0 & 0 & 0 & 0 & 0 & 0 & 0 & 0 \\ 0 & 0 & 0 & 0 & 0 & 0 & 0 & 0 & a_{ix1} & a_{iy1} & a_{iz1} & a_{i\alpha 1} & 0 & 0 & 0 & 0 \\ 0 & 0 & 0 & 0 & 0 & 0 & 0 & 0 & 0 & 0 & 0 & 0 & a_{ix1} & a_{iy1} & a_{iz1} & a_{i\alpha 1} \\ a_{ix2} & a_{iy2} & a_{iz2} & a_{i\alpha 2} & 0 & 0 & 0 & 0 & 0 & 0 & 0 & 0 & 0 & 0 & 0 & 0 \\ 0 & 0 & 0 & 0 & a_{ix2} & a_{iy2} & a_{iz2} & a_{i\alpha 2} & 0 & 0 & 0 & 0 & 0 & 0 & 0 & 0 \\ 0 & 0 & 0 & 0 & 0 & 0 & 0 & 0 & a_{ix2} & a_{iy2} & a_{iz2} & a_{i\alpha 2} & 0 & 0 & 0 & 0 \\ 0 & 0 & 0 & 0 & 0 & 0 & 0 & 0 & 0 & 0 & 0 & 0 & a_{ix2} & a_{iy2} & a_{iz2} & a_{i\alpha 2} \\ a_{ix3} & a_{iy3} & a_{iz3} & a_{i\alpha 3} & 0 & 0 & 0 & 0 & 0 & 0 & 0 & 0 & 0 & 0 & 0 & 0 \\ 0 & 0 & 0 & 0 & a_{ix3} & a_{iy3} & a_{iz3} & a_{i\alpha 3} & 0 & 0 & 0 & 0 & 0 & 0 & 0 & 0 \\ 0 & 0 & 0 & 0 & 0 & 0 & 0 & 0 & a_{ix3} & a_{iy3} & a_{iz3} & a_{i\alpha 3} & 0 & 0 & 0 & 0 \\ 0 & 0 & 0 & 0 & 0 & 0 & 0 & 0 & 0 & 0 & 0 & 0 & a_{ix3} & a_{iy3} & a_{iz3} & a_{i\alpha 3} \\ a_{ix4} & a_{iy4} & a_{iz4} & a_{i\alpha 4} & 0 & 0 & 0 & 0 & 0 & 0 & 0 & 0 & 0 & 0 & 0 & 0 \\ 0 & 0 & 0 & 0 & a_{ix4} & a_{iy4} & a_{iz4} & a_{i\alpha 4} & 0 & 0 & 0 & 0 & 0 & 0 & 0 & 0 \\ 0 & 0 & 0 & 0 & 0 & 0 & 0 & 0 & a_{ix4} & a_{iy4} & a_{iz4} & a_{i\alpha 4} & 0 & 0 & 0 & 0 \\ 0 & 0 & 0 & 0 & 0 & 0 & 0 & 0 & 0 & 0 & 0 & 0 & a_{ix4} & a_{iy4} & a_{iz4} & a_{i\alpha 4} \end{pmatrix} \begin{pmatrix} S_{x,x} \\ S_{x,y} \\ S_{x,z} \\ S_{x,\alpha} \\ S_{y,x} \\ S_{y,y} \\ S_{y,z} \\ S_{y,\alpha} \\ S_{1,x} \\ S_{2,y} \\ S_{2,z} \\ S_{2,\alpha} \\ S_{\alpha,z} \\ S_{\alpha,y} \\ S_{\alpha,z} \\ S_{\alpha,\alpha} \end{pmatrix} = \begin{pmatrix} a_{ox1} \\ a_{oy1} \\ a_{oz1} \\ a_{o\alpha 1} \\ a_{ox2} \\ a_{oy2} \\ a_{oz2} \\ a_{o\alpha 2} \\ a_{ox3} \\ a_{oy3} \\ a_{oz3} \\ a_{o\alpha 3} \\ a_{ox4} \\ a_{oy4} \\ a_{oz4} \\ a_{o\alpha 4} \end{pmatrix}$$

(Mathematical 21)

Since the four vectors ($a_{ixk}$, $a_{iyk}$, $a_{izk}$, $a_{i\alpha k}$) (k=1, 2, 3, 4) in Mathematical 21 are linearly independent, it is only plain that the 16 vectors shown in the coefficient determinant ($a_{ixk}$, $a_{iyk}$, $a_{izk}$, $a_{i\alpha k}$, 0, 0, 0, 0, 0, 0, 0, 0, 0, 0, 0, 0) (k=1, 2, 3, 4), (0, 0, 0, 0, $a_{ixk}$, $a_{iyk}$, $a_{izk}$, $a_{i\alpha k}$ 0, 0, 0, 0, 0, 0, 0, 0) (k=1, 2, 3, 4), (0, 0, 0, 0, 0, 0, 0, 0, $a_{ixk}$, $a_{iyk}$, $a_{izk}$, $a_{i\alpha k}$, 0, 0, 0, 0) (k=1, 2, 3, 4) and (0, 0, 0, 0, 0, 0, 0, 0, 0, 0, 0, 0, $a_{ixk}$, $a_{iyk}$, $a_{izk}$, $a_{i\alpha k}$) (k=1, 2, 3, 4)

are linearly independent. Since the coefficient determinant of Mathematical 21 is not zero, it is only logical to conclude that they are capable of being solved without fail.

The sensitivity $S_{i,j}$ (i=x, y, z, $\alpha$, j=x, y, z, $\alpha$) is a normal sensitivity when the suffixes are equal or a cross sensitivity when the suffices are not equal. This means that the normal sensitivity S, and the cross sensitivities $S_{x,y}$, $S_{x,z}$ and $S_{x\alpha}$ are obtained. The processor 9 is enabled, by acquiring an experimental data with a varying angular frequencies and solving the simultaneous linear equations of Mathematical 21 obtained individually with the varying numbers of angular frequencies, to measure the normal sensitivities and the cross sensitivities as functions of the angular frequencies.

EXAMPLE 5

Figure 6:
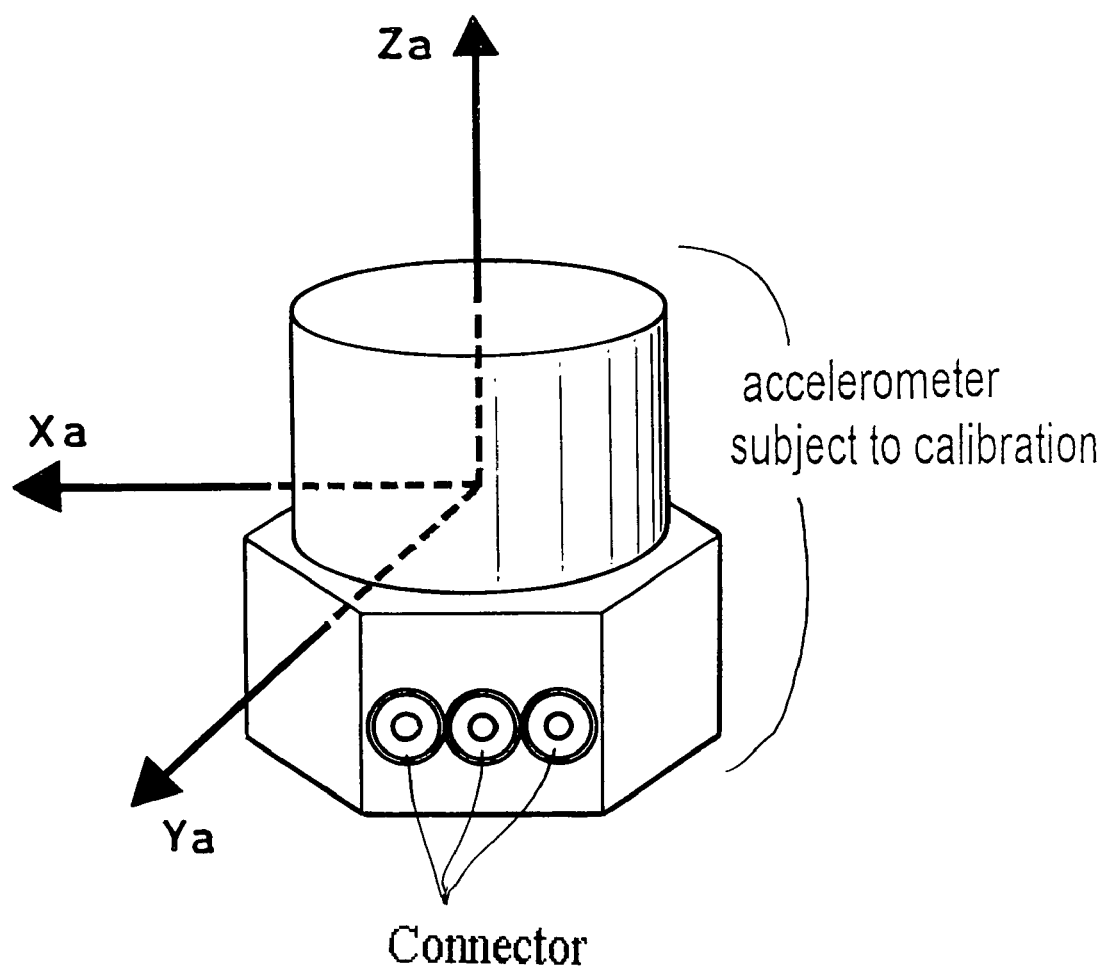
FIG. 6 is a perspective view showing the coordinate system fixed on an accelerometer subject to the calibration contemplated by this invention.
Figure 7:
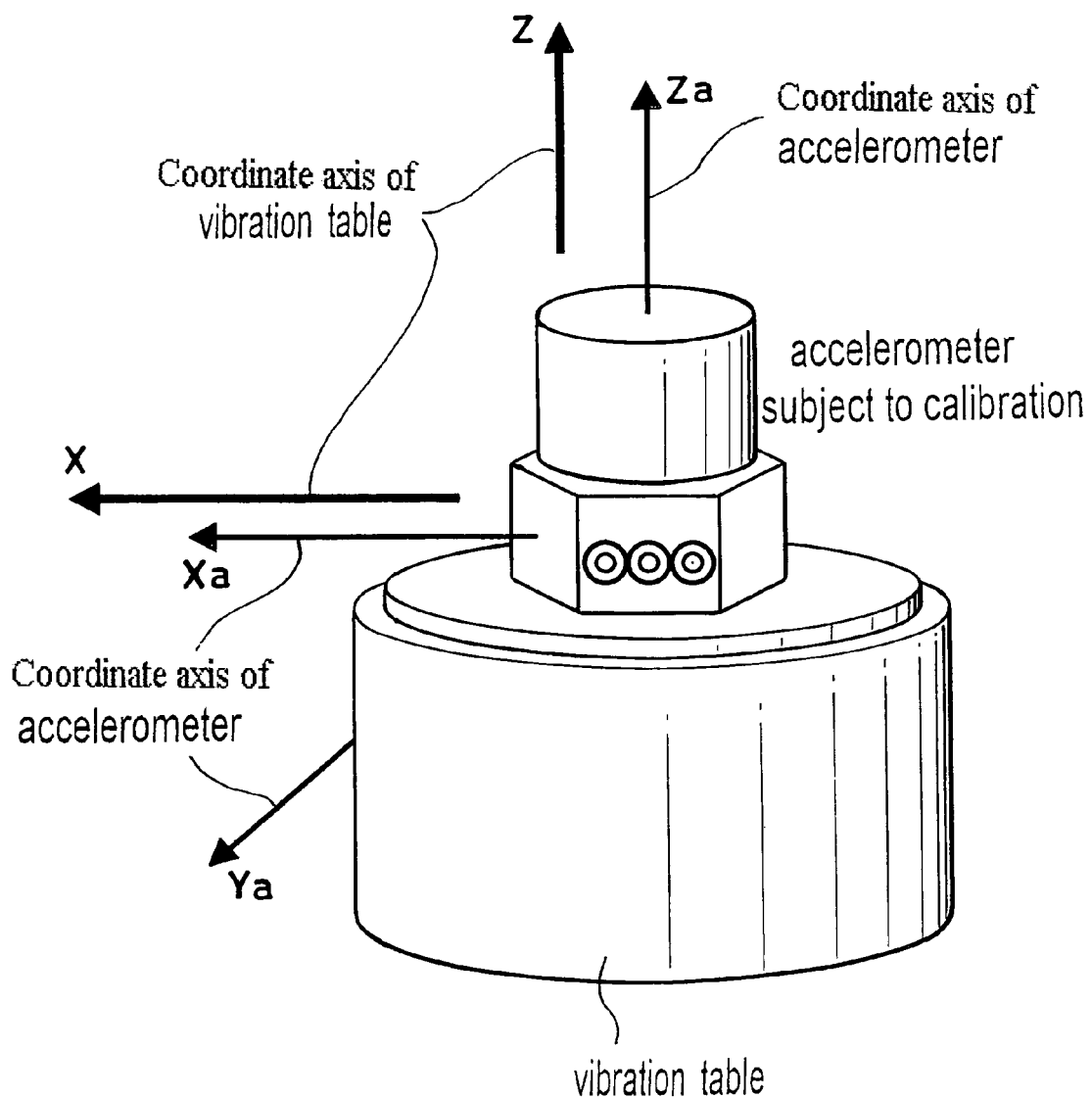
FIG. 7 is a perspective view illustrating the coincidence between the coordinate axis ZX of a motion generating machine and the ZaXa axis of an accelerometer according to this invention.
Figure 8:
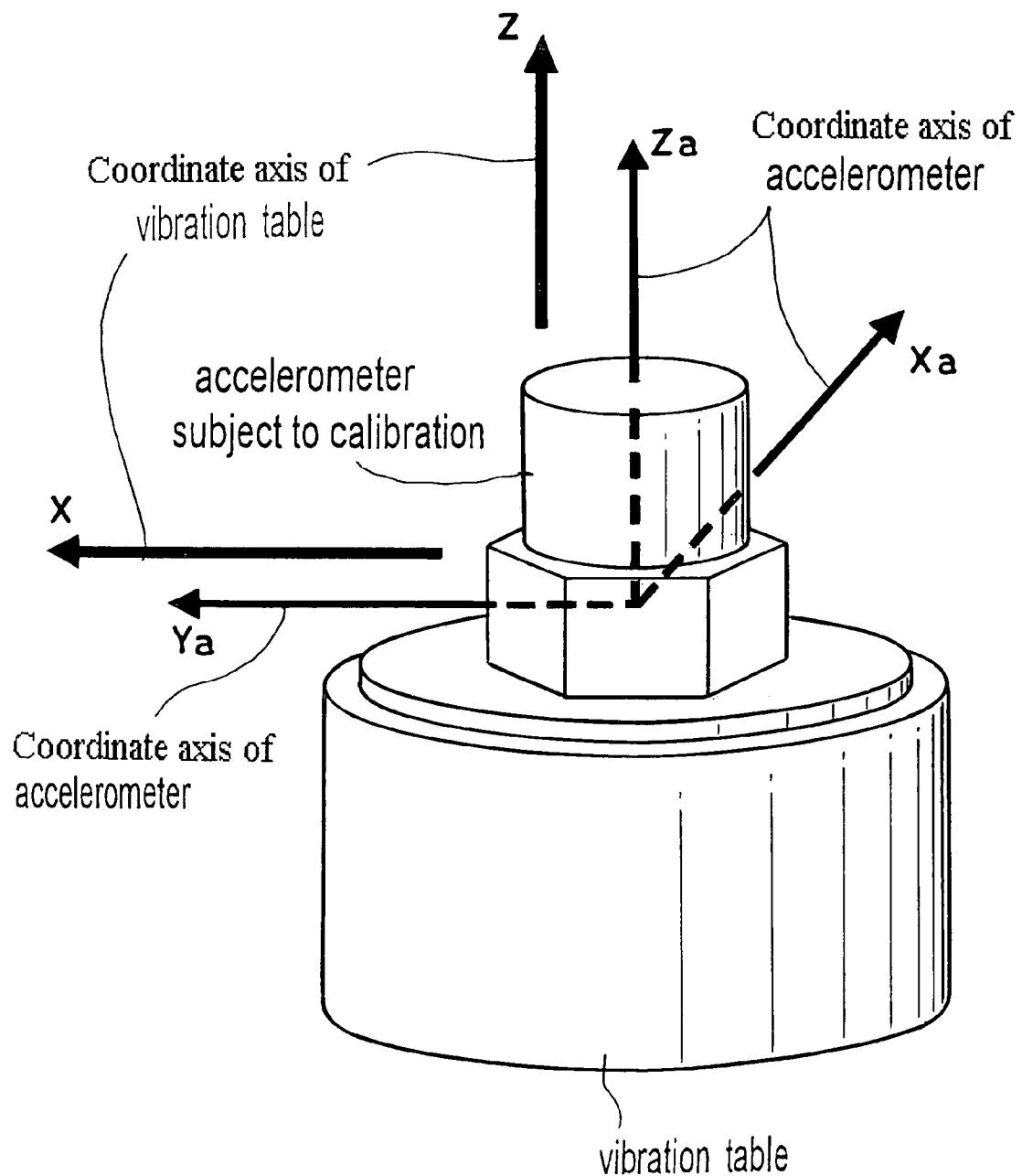
FIG. 8 is a perspective view illustrating the coincidence between the coordinate axis ZX of a motion generating machine and the ZaYa axis of an accelerometer according to this invention.

Finally, Example 5 adopts a three-axis accelerometer as an accelerometer 1 (inertia sensor) subject to calibration and uses a two-dimensional motion generating machine (translational motion of two degrees of freedom) as shown in examples of the layout shown in FIG. 6-FIG. 8. These diagrams illustrate the setups for embodying a method of calibration for the sensitivity of 3×3 matrix sought in the same manner as when an inertia sensor has three axes, and the motion vector space by the motion generating machine has three dimensions even by using a motion generating machine which can generate a motion vector space with two degrees of freedom.

FIG. 6 shows a coordinate system fixed on the inertia sensor and FIG. 7 shows a setup for establishing coincidence between the coordinate axis ZX of the motion generating machine and the ZaXa axis of the accelerometer. Then, FIG.

8 shows a setup for establishing coincidence between the coordinate axis ZX of the motion generating machine and the ZaYa axis of the accelerometer.

Three sensitivity axes of this accelerometer 1 are denoted as X axis, Y axis and Z axis and the Laplace-transformed output signals are denoted by ($a_{ox}(j\omega)$, $a_{oy}(j\omega)$, $a_{oz}(j\omega)$). The Laplace-transformed input accelerations are denoted by ($a_{ix}(j\omega)$, $a_{iy}(j\omega)$, $a_{iz}(j\omega)$). It is not stipulated generally that the input acceleration falls on the vector space (sensitivity space) determined by the three sensitivity axes of the accelerometer. When this stipulation is accepted, it does not result in supporting a conclusion that the input acceleration is regarded as a vector. The accelerometer 1 projects the input acceleration space on the sensitivity vector space.

At this time, the matrix sensitivity is expressed by the matrix of 3×3 shown below.

$$\begin{pmatrix} S_{x,x}, S_{x,y}, S_{x,z} \\ S_{y,x}, S_{y,y}, S_{y,z} \\ S_{z,x}, S_{z,y}, S_{z,z} \end{pmatrix} \quad \text{(Mathematical 22)}$$

Each of $S_{x,x}$, $S_{x,y}$ and $S_{x,z}$ expresses the relation of the input signal to the accelerometer 1 to the X axis output of the accelerometer 1. $S_{xx}$ denotes the normal sensitivity expressing the relation of the X axis output to the X axis input component, $S_{x,y}$ denotes the cross sensitivity expressing the relation of the X axis output signal to the Y axis input component, and $S_{x,z}$ denotes the cross sensitivity expressing the relation of the X axis output signal to the Z axis input component of the acceleration. Each of $S_{y,x}$, $S_{y,y}$ and $S_{y,z}$ expresses the relation of the input signal to the Y axis out of the accelerometer 1. $S_{yx}$ denotes the cross sensitivity expressing the relation of the Y axis signal to the X axis input component of the accelerometer 1, $S_{y,y}$ denotes the normal sensitivity expressing the relation of the Y axis output signal to the Y axis input component of the acceleration, and $S_{y,z}$ denotes the cross sensitivity expressing the relation of the Y axis output signal to the Z axis input component of the acceleration.

Each of $S_{z,x}$, $S_{z,y}$ and $S_{z,z}$ expresses the relation of the input signal to the Z axis output of the accelerometer 1. $S_{z,x}$ denotes the cross sensitivity expressing the relation of the Z axis output signal to the X axis input component of the accelerometer 1, $S_{z,y}$ denotes the cross sensitivity expressing the relation of the Z axis output signal to the Y axis input component of the accelerometer 1, and $S_{z,z}$ denotes the normal sensitivity expressing the relation of the Z axis output signal to the Z axis input component of the accelerometer 1. At this time, the relation between the input vector and the output vector is expressed by the following formula.

$$\begin{pmatrix} a_{ox}(\omega)\exp(j\omega t) \\ a_{oy}(\omega)\exp(j\omega t) \\ a_{oz}(\omega)\exp(j\omega t) \end{pmatrix} = \begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} a_{ix}\exp(j\omega t) \\ a_{iy}\exp(j\omega t) \\ a_{iz}\exp(j\omega t) \end{pmatrix} \quad \text{(Mathematical 23)}$$

The preceding description is the same as what has been stated in the portion dealing with the classification in the third aspect of the invention. Concrete examples of the method for defining the sensitivity matrix of a three-axis accelerometer 1 used as an inertia sensor for a two-dimensional motion generating machine as a matrix of 3×3, namely the method for setting up a scene of the calibration, are illustrated in FIG. 6-FIG. 8. FIG. 6 is a perspective view of a coordinate system X, Y, Z fixed on an accelerometer 1 subject to the calibration contemplated by this invention, FIG. 7 is a scene set up for establishing coincidence between the coordinate axis ZX of the motion generating machine and the ZaXa axis of the accelerometer 1 subject to the calibration of this invention, and FIG. 8 is a scene set up for establishing coincidence between the coordinate axis ZX of the motion generating machine and the ZaYa axis of the accelerometer 1 subject to the calibration of this invention.

A two-dimensional motion generating machine is only capable of generating two independent vector vibration accelerations in a two-dimensional space. So, the vibration vector acceleration which can be formed in the setup of FIG. 7 is represented by ($a_{ix1}, 0, a_{iz1}$)exp($j\omega t$), ($a_{ix2}, 0, a_{iz2}$)exp($j\omega t$) and the vibration vector acceleration which can be formed in the setup of FIG. 8 is represented by (0, $a_{iy3}$, $a_{iz3}$)exp($j\omega t$). Here, the three vectors ($a_{ix1}, 0, a_{iz1}$), ($a_{ix2}, 0, a_{iz2}$) and (0, $a_{iy3}$, $a_{iz3}$) must be independent vectors in a three-dimensional space. When these vibration vector accelerations are substituted in Mathematical 23, the following three equations, i.e. Mathematical 24, Mathematical 25 and Mathematical 26 are established. The terms $a_{ox}$, $a_{oy}$ and $a_{oz}$ are complex numbers as the functions of $\omega$ which takes into account the initial phase of exp($j\omega t$) and the gain. When the three equations, i.e. Mathematical 24, Mathematical 25 and Mathematical 26 are unified as simultaneous linear equations concerning all the components of the sensitivity matrix, Mathematical 26 is derived.

$$\begin{pmatrix} a_{ox1}(\omega)\exp(j\omega t) \\ a_{oy1}(\omega)\exp(j\omega t) \\ a_{oz1}(\omega)\exp(j\omega t) \end{pmatrix} = \begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} a_{ix1}\exp(j\omega t) \\ 0 \\ a_{iz1}\exp(j\omega t) \end{pmatrix} \quad \text{(Mathematical 24)}$$

$$\begin{pmatrix} a_{ox2}(\omega)\exp(j\omega t) \\ a_{oy2}(\omega)\exp(j\omega t) \\ a_{oz2}(\omega)\exp(j\omega t) \end{pmatrix} = \begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} a_{ix2}\exp(j\omega t) \\ 0 \\ a_{iz2}\exp(j\omega t) \end{pmatrix} \quad \text{(Mathematical 25)}$$

$$\begin{pmatrix} a_{ox3}(\omega)\exp(j\omega t) \\ a_{oy3}(\omega)\exp(j\omega t) \\ a_{oz3}(\omega)\exp(j\omega t) \end{pmatrix} = \begin{pmatrix} S_{x,x}(\omega), S_{x,y}(\omega), S_{x,z}(\omega) \\ S_{y,x}(\omega), S_{y,y}(\omega), S_{y,z}(\omega) \\ S_{z,x}(\omega), S_{z,y}(\omega), S_{z,z}(\omega) \end{pmatrix} \begin{pmatrix} 0 \\ a_{iy3}\exp(j\omega t) \\ a_{iz3}\exp(j\omega t) \end{pmatrix} \quad \text{(Mathematical 26)}$$

-continued $$\begin{pmatrix} a_{ix1} & 0 & a_{iz1} & 0 & 0 & 0 & 0 & 0 & 0 \\ 0 & 0 & 0 & a_{ix1} & 0 & a_{iz1} & 0 & 0 & 0 \\ 0 & 0 & 0 & 0 & 0 & 0 & a_{ix1} & 0 & a_{iz1} \\ a_{ix2} & 0 & a_{iz2} & 0 & 0 & 0 & 0 & 0 & 0 \\ 0 & 0 & 0 & a_{ix2} & 0 & a_{iz2} & 0 & 0 & 0 \\ 0 & 0 & 0 & 0 & 0 & 0 & a_{ix2} & 0 & a_{iz2} \\ 0 & a_{iy3} & a_{iz3} & 0 & 0 & 0 & 0 & 0 & 0 \\ 0 & 0 & 0 & 0 & a_{iy3} & a_{iz3} & 0 & 0 & 0 \\ 0 & 0 & 0 & 0 & 0 & 0 & 0 & a_{iy3} & a_{iz3} \end{pmatrix} \begin{pmatrix} S_{x,x} \\ S_{x,y} \\ S_{x,z} \\ S_{y,x} \\ S_{y,y} \\ S_{y,z} \\ S_{z,x} \\ S_{z,y} \\ S_{z,z} \end{pmatrix} = \begin{pmatrix} a_{ox1} \\ a_{oy1} \\ a_{oz1} \\ a_{ox2} \\ a_{oy2} \\ a_{oz2} \\ a_{ox3} \\ a_{oy3} \\ a_{oz3} \end{pmatrix}$$

Since the three vectors $(a_{ixk}, 0, a_{izk})$, (k=1, 2) and $(0, a_{iy3}, a_{iz3})$ in Mathematical 27 are linearly independent, it is only plain that the 9 vectors shown in the coefficient determinant $(a_{ixk}, 0, a_{izk}, 0, 0, 0, 0, 0, 0)$ (k=1, 2),
$(0, 0, 0, a_{ixk}, 0, a_{izk}, 0, 0, 0)$ (k=1, 2),
$(0, 0, 0, 0, 0, 0, 0, a_{ixk}, 0, a_{izk})$ (k=1, 2),
$(0, a_{iy3}, a_{iz3}, 0, 0, 0, 0, 0, 0)$,
$(0, 0, 0, 0, a_{iy3}, a_{iz3}, 0, 0, 0)$ and
$(0, 0, 0, 0, 0, 0, 0, a_{iy3}, a_{iz3})$ are linearly independent. Since the coefficient determinant of Mathematical 27 is not zero, it is only logical to conclude that they are capable of being solved without fail. The sensitivity $S_{i,j}$ (i=x, y, z, j=x, y, z) is a normal sensitivity when the suffixes are equal or a cross sensitivity when the suffices are not equal. By scanning the angular frequencies with the simultaneous linear equations of Mathematical 27, it is made possible to define the normal sensitivity and the cross sensitivity as the functions of angular frequency. In this example, two independent vibration vector accelerations are selected for the setup of FIG. 7 and one vibration vector acceleration is selected for the setup of FIG. 8. Alternatively, one-vibration vector acceleration may be selected for the setup of FIG. 7 and two independent vibration vector accelerations may be selected for the setup of FIG. 8.

Here, the fact that the simultaneous linear equations for deriving the matrix sensitivity can be solved will be verified.

The question whether or not the simultaneous linear equations represented by Mathematical 2, Mathematical 8, Mathematical 14, Mathematical 21 and Mathematical 27 are solvable is very important for the technique disclosed by this invention. Thus, the fact that the determinant of N×M-dimension coefficient matrix concerning the sensitivity of an inertia sensor having N degrees of freedom on which a motion generating machine having M degrees of freedom exerts M independent linear motion vectors is not zero is verified as follows. It is assumed that the linearly independent motion vectors imparted by the motion generating machine are given by the following formula.

$$\begin{pmatrix} a_1^1 \\ a_2^1 \\ \vdots \\ a_{M-1}^1 \\ a_M^1 \end{pmatrix} \begin{pmatrix} a_1^2 \\ a_2^2 \\ \vdots \\ a_{M-1}^2 \\ a_M^2 \end{pmatrix} \begin{pmatrix} a_1^3 \\ a_2^3 \\ \vdots \\ a_{M-1}^3 \\ a_M^3 \end{pmatrix} \cdots \begin{pmatrix} a_1^M \\ a_2^M \\ \vdots \\ a_{M-1}^M \\ a_M^M \end{pmatrix} \qquad \text{(Mathematical 28)}$$

Since the preceding vectors are linearly independent, the verification of Mathematical 29 requires all the coefficients $A_1, A_2, A_3, \ldots, A_M$ to be zero.

(Mathematical 27)

$$A_1 \begin{pmatrix} a_1^1 \\ a_2^1 \\ \vdots \\ a_{M-1}^1 \\ a_M^1 \end{pmatrix} + A_2 \begin{pmatrix} a_1^2 \\ a_2^2 \\ \vdots \\ a_{M-1}^2 \\ a_M^2 \end{pmatrix} + \qquad \text{(Mathematical 29)}$$

$$A_3 \begin{pmatrix} a_1^3 \\ a_2^3 \\ \vdots \\ a_{M-1}^3 \\ a_M^3 \end{pmatrix} \cdots + A_M \begin{pmatrix} a_1^M \\ a_2^M \\ \vdots \\ a_{M-1}^M \\ a_M^M \end{pmatrix} = 0$$

What matters resides in the question whether or not the following vector is linearly independent under the assumption of Mathematical 29. It is assumed that the linearly independent M motion vectors of Mathematical 28 are represented by $a_1, a_2, a_3, \ldots, a_M$ and the zero vector having M 0's in a row is represented by 0 having an arrow mark attached thereto. The N×M vectors for the investigation regarding the identity of linear independence are as follows:

$$\begin{pmatrix} \vec{a}_1 \\ \vec{0} \\ \vec{0} \\ \vdots \\ \vec{0} \end{pmatrix} \begin{pmatrix} \vec{0} \\ \vec{a}_1 \\ \vec{0} \\ \vdots \\ \vec{0} \end{pmatrix} \cdots \begin{pmatrix} \vec{0} \\ \vec{0} \\ \vec{0} \\ \vdots \\ \vec{a}_1 \end{pmatrix} \begin{pmatrix} \vec{a}_2 \\ \vec{0} \\ \vec{0} \\ \vdots \\ \vec{0} \end{pmatrix} \qquad \text{(Mathematical 30)}$$

$$\begin{pmatrix} \vec{0} \\ \vec{a}_2 \\ \vec{0} \\ \vdots \\ \vec{0} \end{pmatrix} \cdots \begin{pmatrix} \vec{0} \\ \vec{0} \\ \vec{0} \\ \vdots \\ \vec{a}_2 \end{pmatrix} \cdots \begin{pmatrix} \vec{a}_M \\ \vec{0} \\ \vec{0} \\ \vdots \\ \vec{0} \end{pmatrix} \begin{pmatrix} \vec{0} \\ \vec{a}_M \\ \vec{0} \\ \vdots \\ \vec{0} \end{pmatrix} \cdots \begin{pmatrix} \vec{0} \\ \vec{0} \\ \vec{0} \\ \vdots \\ \vec{a}_M \end{pmatrix}$$

The fact that all the coefficients are zeroed when the linear combination of the vectors shown in Mathematical 30 is set at zero verifies that the vectors are linearly independent. Since the renewal of the linear combination merely results in producing N formulas conforming with Mathematical 29 and since $a_1, a_2, a_3, \ldots, a_M$ are linearly independent, all the coefficients are proved to be zero and the determinant of coefficients matrix evidently is not zeroed.

EXAMPLE 6

Figure 9:
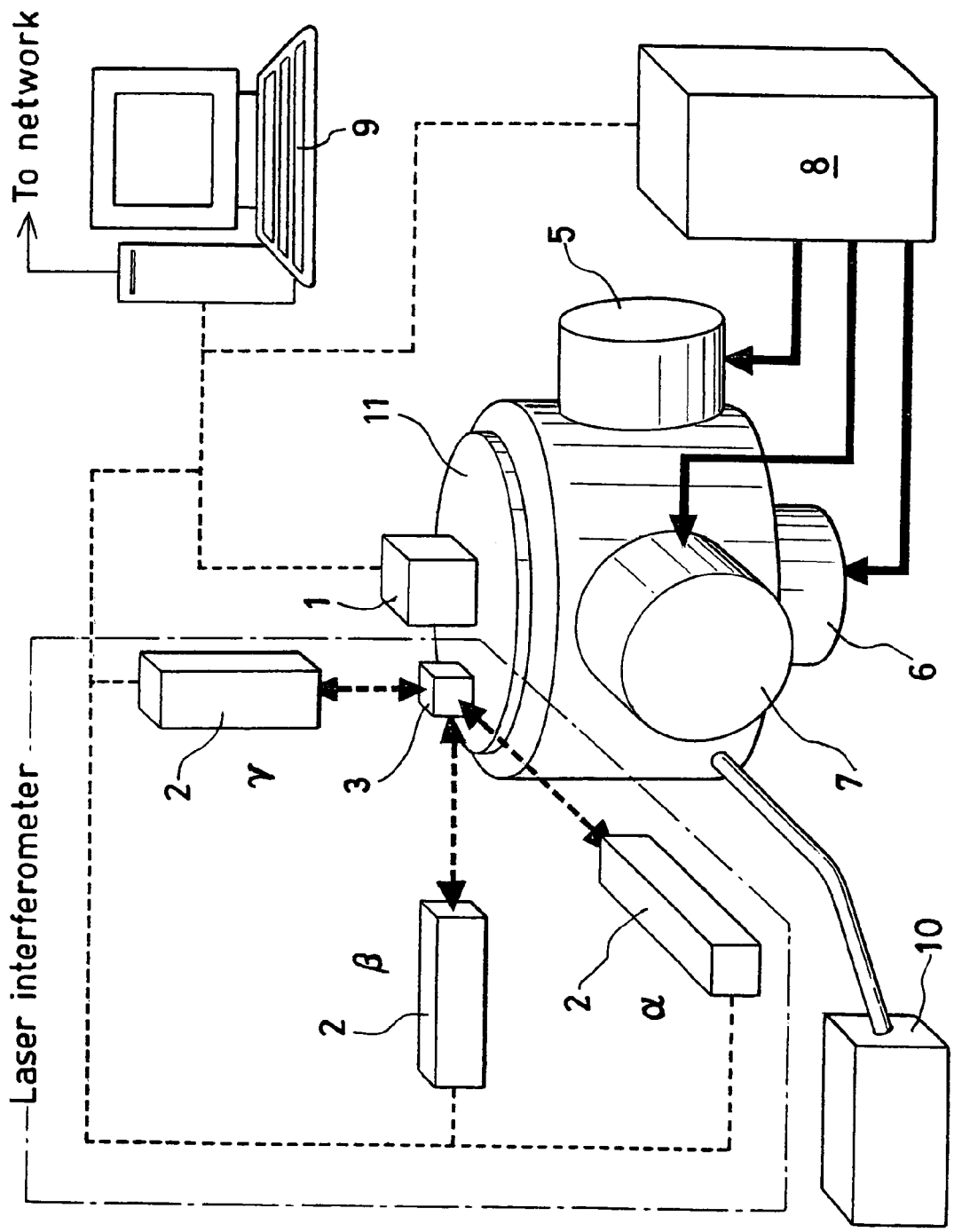
FIG. 9 is a type section illustrating the configuration for embodying this invention.

Example 6 constitutes itself an example of avoiding the installation of an inertia sensor 4 for the control of a motion generating machine as illustrated in FIG. 9. Similarly to the classification of the first aspect of the invention dealt with in Example 1, the case of adopting a one-axis accelerometer as the accelerometer 1 subject to calibration and using a three-dimensional motion generating machine will be explained here.

The operating part of a processor 9 is manipulated to transmit to actuators 5, 6 and 7 control signals adapted to induce prescribed vibration therein. By applying the prescribed signals individually to the actuators 5, 6 and 7 and using one sensitivity axis of an accelerometer 1 as X axis, the output signal from the accelerometer 1 is enabled to be input to the processor 9. The input which has undergone Laplace transform is represented by $(a_{ox}(j\omega), 0, 0)$. The letter $\omega$ denotes the angular frequencies. The Y axis component and the Z axis component are both zero of course.

In laser interferometers 2 and 3 for real-time control or measurement, which are means to measure the input to the accelerometer 1, the input acceleration to the accelerometer 1 is measured through a table 11. The measured input acceleration is input to the processor 9. The input which has undergone Laplace transform is represented by $(a_{ix}(j\omega), a_{iy}(j\omega), a_{iz}(j\omega))$. It is not stipulated that the input acceleration falls on the sensitivity axis of the accelerometer 1. When this stipulation is accepted, it does not result in supporting a conclusion that the input acceleration is regarded as a vector.

At this time, since an inertia sensor 4 for controlling a motion generating machine is not installed, no measurement can be made to judge whether or not the actuators 5, 6 and 7 are generating prescribed motions and consequently the processor 9 cannot emit control signals to the actuators 5, 6 and 7. The accelerometer 1 can be calibrated, however, because the means 2 and 3 for measuring the input to the accelerometer 1 and the processor 9 as a means for measuring the output from the accelerometer 1 and other pertinent components are provided.

Incidentally, the "Laplace transform" mentioned above is intended to ensure mathematical strictness of the description of the solution of an equation. It may be performed generally by integral transformation or particularly practically by high speed Fourier transformation (FFT). It is accomplished so long as the processor 9 is furnished with a signal processing function capable of converting the functions in the time domain to the functions in the frequency domain.

Now, the aforementioned processing of matrix sensitivity will be described more specifically below.

The degrees of freedom of a motion in a space total 6, i.e. 3 degrees of freedom of a translational motion and 3 degrees of freedom of a rotary motion. The largest value of the degrees of freedom of an inertia sensor which detects a motion, therefore, is 6 and the largest value of the degrees of freedom of a motion generating device is 6. Regarding the connection between the degrees of freedom of the inertia sensor subject to calibration and the degrees of freedom of the motion which can be generated by the motion generating machine, since various combinations can be set, the degrees of freedom will be explained as shown in the following table.

TABLE 1

| | | Degree of freedom of motion generation machine (N) | | | | | |
|---|---|---|---|---|---|---|---|
| | | 1 | 2 | 3 | 4 | 5 | 6 |
| Degree of freedom of detection inertia sensor (number of axis) (M) | 1 | This column covers conventional technique. | The transverse sensitivity, though assumable, defies perfect definition. | Explanation in (1-3) | Explanation in (1-4) | Explanation in (1-5) | Explanation in (1-6) |
| | 2 | Explained in the case of a biaxial acceleration sensor described herein below. | | | | | |
| | 3 | Explained in the case of a triaxial acceleration sensor described herein below. | | | | | |
| | 4 | Explained in the case of the general discussion made herein below. | | | | | |
| | 5 | Explained in the case of the general discussion made herein below. | | | | | |
| | 6 | Explained in the case of the general discussion made herein below. | | | | | |

It is important in any of the cases excepting the case of N=M=1 that an equation can be set in accordance with the following concept.

(1-3) The Case of a One-Axis Accelerometer (the Case of Calibrating a One-Axis Accelerometer with a Motion Generating Machine Having 3 Degrees of Freedom)

The case of handling a one-axis accelerometer as a one-dimensional accelerometer and deriving the sensitivity matrix as 1×3 matrix will be explained below.

1) The Case of Using Sinusoidal Wave for Input Acceleration

It is assumed that the dynamic sensitivity matrix of a one-axis accelerometer at a given frequency $f_1(\omega_1=2\pi f_1)$ is represented by $(S_{x,x}(\omega_1), S_{x,y}(\omega_1), S_{x,z}(\omega_1))$. The act of finding the values of all the components of this matrix constitutes itself the concept of calibration. Simultaneous linear equations having these three components as unknown quantities are set as shown below.

$$\begin{pmatrix} C_{1,1} & C_{1,2} & C_{1,3} \\ C_{2,1} & C_{2,2} & C_{2,3} \\ C_{3,1} & C_{3,2} & C_{3,3} \end{pmatrix} \begin{pmatrix} S_{x,x}(\omega_1) \\ S_{x,y}(\omega_1) \\ S_{x,z}(\omega_1) \end{pmatrix} = \begin{pmatrix} d_1 \\ d_2 \\ d_3 \end{pmatrix}$$ (Mathematical 31)

Procedure 1

A vibration is imparted with a given frequency $f_1(\omega_1=2\pi f_1)$ first in the direction of the vector $(a_{ix1}, a_{iy1}, a_{iz1})$. The input acceleration vector signal is represented by $(a_{ix1}, a_{iy1}, a_{iz1})\exp(j\omega t)$. The output signal of the accelerometer at this time is represented by $a_{ox1}(\omega)\exp(j\omega t)$. Since the actual vibration assumes the form of a burst signal and the signal of the vibration vector $(a_{ix1}, a_{iy1}, a_{iz1})\exp(j\omega t)$ consequently assumes the form of a burst signal, the three components ought to be considered as resulting from extracting the $f_1$ component through FFT.

In other words, when the actual vibration signal on the time base is expressed by the function of the vector $(a_{ix1}, a_{iy1}, a_{iz1})B_1(t)$, the part $B_1(t)$ means the burst signal. It is assumed that the result of extracting the $f_1$ component by subjecting this burst part to FFT is the complex number of $Z_{is1}$. By the same token, the $f_1$ component is extracted through FFT because the output signal of the accelerometer at this time is in the form of a burst signal. Since the $f_1$ component which is obtained at this time is a complex number, the division of this component by $\exp(\omega t)$ results in $a_{ox1}(\omega_1)$.

In other words, the $f_1$ component is derived through FFT because the output signal of the accelerometer is in the form of burst signal as well. Here, the coefficients mentioned above are decided as follows:

$$C_{1,1}=a_{ix1}\ C_{1,2}=a_{iy1}\ C_{1,3}=a_{iz1}\ d_1=a_{ox1}=Z_{os1}/Z_{is1} \quad \text{(Mathematical 32)}$$

Procedure 2

A vibration is imparted with a given frequency $f_1(\omega_1=2\pi f_1)$ first in the direction of the vector $(a_{ix2}, a_{iy2}, a_{iz2})$. The input acceleration vector signal is represented by $(a_{ix2}, a_{iy2}, a_{iz2})\exp(j\omega t)$. The output signal of the accelerometer at this time is represented by $a_{ox2}(\omega)\exp(j\omega t)$. Since the actual vibration assumes the form of a burst signal and the signal of the vibration vector $(a_{ix2}, a_{iy2}, a_{iz2})\exp(j\omega t)$ consequently assumes the form of a burst signal, the three components ought to be considered as resulting from extracting the $f_1$ component through FFT. By the same token, the $f_1$ component is extracted through FFT because the output signal of the accelerometer at this time is in the form of a burst signal. Since the $f_1$ component which is obtained at this time is a complex number, the division of this component by $\exp(\omega t)$ results in $a_{ox2}(\omega_1)$.

When the actual vibration signal on the time base is expressed by the functions of the vector $(a_{ix2}, a_{iy1}, a_{iz2})B_2(t)$, the part $B_2(t)$ means the burst signal. It is assumed that the result of extracting the $f_1$ component by subjecting this burst part to FFT is the complex number of $Z_{is2}$. By the same token, the $f_1$ component is extracted through FFT because the output signal of the accelerometer at this time is in the form of a burst signal. Since the $f_1$ component which is obtained at this time is a complex number, the division of this component by $\exp(j\omega t)$ results in $a_{ox2}(\omega_1)$. In other words, the $f_1$ component is derived through FFT because the output signal of the accelerometer is in the form of burst signal as well. It is assumed that this signal is a complex number of $Z_{os2}$. Here, the coefficients mentioned above are decided as follows:

$$C_{2,1}=a_{ix2}\ C_{2,2}=a_{iy2}\ C_{2,3}=a_{iz2}\ d_2=a_{ox2}=Z_{os2}/Z_{is2} \quad \text{(Mathematical 33)}$$

Procedure 3

A vibration is imparted with a given frequency $f_1(\omega_1=2\pi f_1)$ first in the direction of the vector $(a_{ix3}, a_{iy3}, a_{iz3})$. The input acceleration vector signal is represented by $(a_{ix3}, a_{iy3}, a_{iz3})\exp(j\omega t)$. The output signal of the accelerometer at this time is represented by $a_{ox3}(\omega)\exp(j\omega t)$. Since the actual vibration assumes the form of a burst signal and the signal of the vibration vector $(a_{ix3}, a_{iy3}, a_{iz3})\exp(j\omega t)$ consequently assumes the form of a burst signal, the three components ought to be considered as resulting from extracting the $f_1$ component through FFT. By the same token, the $f_1$ component is extracted through FFT because the output signal of the accelerometer at this time is in the form of a burst signal. Since the $f_1$ component which is obtained at this time is a complex number, the division of this component by $\exp(j\omega t)$ results in $a_{ox3}(\omega_1)$.

When the actual vibration signal on the time base is expressed by the function of the vector $(a_{ix3}, a_{iy3}, a_{iz3})B_3(t)$, the part $B_3(t)$ means the burst signal. It is assumed that the result of extracting the $f_1$ component by subjecting this burst part to FFT is the complex number of $Z_{is3}$. By the same token, the $f_1$ component is extracted through FFT because the output signal of the accelerometer at this time is in the form of a burst signal. Since the $f_1$ component which is obtained at this time is a complex number, the division of this component by $\exp(j\omega t)$ results in $a_{ox3}(\omega_1)$. In other words, the $f_1$ component is derived through FFT because the output signal of the accelerometer is in the form of burst signal as well. This signal is a complex number of $Z_{os3}$. Here, the coefficients mentioned above are decided as follows:

$$C_{3,1}=a_{ix3}\ C_{3,2}=a_{iy3}\ C_{3,3}=a_{iz3}\ d_3=a_{ox3}=Z_{os3}/Z_{is3} \quad \text{(Mathematical 34)}$$

Procedure 4

Consequently, the coefficient matrix of the aforementioned simultaneous linear equations has been decided and the vectors on the right part have been decided as well. The aforementioned simultaneous linear equations are solved without fail because the vectors in the three directions are selected in linear independence. Subsequently, the matrix sensitivity in a different frequency can be found by setting the frequency of vibration at another value and carrying out the same calculation.

2) The Case of Using a Random Waveform for Input Acceleration

The direction vector of random vibration is selected in the direction of linear independence. This direction is represented as shown below:

$(a_{ix1}, a_{iy1}, a_{iz1}), (a_{ix2}, a_{iy2}, a_{iz2})$ and $(a_{ix3}, a_{iy3}, a_{iz3})$.

The frequency band of the random vibration signal in these directions is represented as follows:

$[f_{mix}\ f_{max}]$.

It is assumed that the dynamic sensitivity matrix of the one-axis accelerometer at a given frequency $f_1(\omega_1=2\pi f_1)$ is represented by $(S_{x,x}(\omega_1), S_{x,y}(\omega_1), S_{x,z}(\omega_1))$. The act of finding the values of all the components of this matrix constitutes itself the concept of correction. Simultaneous linear equations having these three components as unknown quantities are set as shown below.

$$\begin{pmatrix} C_{1,1} & C_{1,2} & C_{1,3} \\ C_{2,1} & C_{2,2} & C_{2,3} \\ C_{3,1} & C_{3,2} & C_{3,3} \end{pmatrix} \begin{pmatrix} S_{x,x}(\omega_1) \\ S_{x,y}(\omega_1) \\ S_{x,z}(\omega_1) \end{pmatrix} = \begin{pmatrix} d_1 \\ d_2 \\ d_3 \end{pmatrix} \quad \text{(Mathematical 35)}$$

Procedure 1

A random vibration is imparted in the direction of $(a_{ix1}, a_{iy1}, a_{iz1})$. The output signal of the accelerometer which is obtained at this time is represented by the function of time $f_{o1}(t)$. The input signal vector is represented by $(a_{ix1}, a_{iy1}, a_{iz1})f_{i1}(t)$. The random function is $f_{i1}(t)$. Here, $f_{i1}(t)$ and $f_{o1}(t)$ are subject to FFT. As a result, the data shown in the following table is obtained.

TABLE 2

| Frequency | Result of FFT of random input signal | Result of FFT of output signal of acceleration sensor |
|---|---|---|
| $f_{min}(\omega_{min})$ | $Z_{i,min}$ | $Z_{o,min}$ |
| ⋮ | ⋮ | ⋮ |
| $\omega_1$ | $Z_{i,1}$ | $Z_{o,1}$ |
| ⋮ | ⋮ | ⋮ |
| $f_{max}(\omega_{max})$ | $Z_{i,max}$ | $Z_{o,max}$ |

Here, the aforementioned coefficients are decided as follows:

$$C_{1,1}=a_{ix1}\ C_{1,2}=a_{iy1}\ C_{1,3}=a_{iz1}\ d_1=a_{ox1}=Z_{o,1}/Z_{i,1} \quad \text{(Mathematical 36)}$$

Procedure 2

A random vibration is imparted in the direction of $(a_{ix2}, a_{iy2}, a_{iz2})$. The output signal of the accelerometer which is obtained at this time is represented by the function of time $f_{o2}(t)$. The input signal vector is represented by $(a_{ix2}, a_{iy2}, a_{iz2})f_{i2}(t)$. The random function is $f_{i2}(t)$. Here, $f_{i2}(t)$ and $f_{o2}(t)$ are subject to FFT. As a result, the data shown in the following table is obtained.

TABLE 3

| Frequency | Result of FFT of random input signal | Result of FFT of output signal of acceleration sensor |
|---|---|---|
| $f_{min}(\omega_{min})$ | $Z_{i,min}$ | $Z_{o,min}$ |
| ⋮ | ⋮ | ⋮ |
| $\omega_1$ | $Z_{i,2}$ | $Z_{o,2}$ |
| ⋮ | ⋮ | ⋮ |
| $f_{max}(\omega_{max})$ | $Z_{i,max}$ | $Z_{o,max}$ |

Here, the aforementioned coefficients are decided as follows:

$$C_{2,1}=a_{ix2}\ C_{2,2}=a_{iy2}\ C_{2,3}=a_{iz2}\ d_2=a_{ox2}=Z_{o,2}/Z_{i,2} \quad \text{(Mathematical 37)}$$

Procedure 3

A random vibration imparted in the direction of $(a_{ix3}, a_{iy3}, a_{iz3})$. The output signal of the accelerometer which is obtained at this time is represented by the function of time $f_{o3}(t)$. The input signal vector is represented by $(a_{ix3}, a_{iy3}, a_{iz3})f_{i3}(t)$. The random function is $f_{i3}(t)$. Here, $f_{i3}(t)$ and $f_{o3}(t)$ are subject to FFT. As a result, the data shown in the following table is obtained.

TABLE 4

| Frequency | Result of FFT of random input signal | Result of FFT of output signal of acceleration sensor |
|---|---|---|
| $f_{min}(\omega_{min})$ | $Z_{i,min}$ | $Z_{o,min}$ |
| ⋮ | ⋮ | ⋮ |
| $\omega_1$ | $Z_{i,3}$ | $Z_{o,3}$ |
| ⋮ | ⋮ | ⋮ |
| $f_{max}(\omega_{max})$ | $Z_{i,max}$ | $Z_{o,max}$ |

Here, the aforementioned coefficients are decided as follows:

$$C_{3,1}=a_{ix3}\ C_{3,2}=a_{iy3}\ C_{3,3}=a_{iz3}\ d_3=a_{ox3}=Z_{o,3}/Z_{i,3} \quad \text{(Mathematical 38)}$$

Procedure 4

Consequently, the coefficient matrix of the aforementioned simultaneous linear equations has been decided and the vectors on the right part have been decided as well. The aforementioned simultaneous linear equations are solved without fail because the vectors in the three directions are selected in linear independence.

Subsequently, the matrix sensitivity in a different frequency can be found by selecting another frequency in the table obtained by spectral analysis and performing the same calculation. By performing this calculation on all the frequencies obtained by spectral analysis, it is made possible to find the matrix sensitivity at $[f_{min}\ f_{max}]$ by the frequency resolving power which is decided by the setting of FFT to be used in that case.

3) The Case of Using Pulse for Input Acceleration

The direction vector of input acceleration with pulses is selected in the direction of linear independence. This direction is represented as shown below:

$(a_{ix1}, a_{iy1}, a_{iz1})$, $(a_{ix2}, a_{iy2}, a_{iz2})$ and $(a_{ix3}, a_{iy3}, a_{iz3})$.

The frequency band of the pulse input acceleration signal in these directions is represented as follows:

$[f_{min}\ f_{max}]$.

It is assumed that the dynamic sensitivity matrix of the one-axis accelerometer at a given frequency $f_1(\omega_1=2\pi f_1)$ is represented by $(S_{x,x}(\omega_1), S_{x,y}(\omega_1), S_{x,z}(\omega_1))$. The act of finding the values of all the components of this matrix constitutes itself the concept of calibration contemplated by this invention. Simultaneous linear equations having these three components as unknown quantities are set as shown below.

$$\begin{pmatrix} C_{1,1} & C_{1,2} & C_{1,3} \\ C_{2,1} & C_{2,2} & C_{2,3} \\ C_{3,1} & C_{3,2} & C_{3,3} \end{pmatrix} \begin{pmatrix} S_{x,x}(\omega_1) \\ S_{x,y}(\omega_1) \\ S_{x,z}(\omega_1) \end{pmatrix} = \begin{pmatrix} d_1 \\ d_2 \\ d_3 \end{pmatrix} \quad \text{(Mathematical 39)}$$

Procedure 1

A pulse input acceleration is imparted in the direction of $(a_{ix1}, a_{iy1}, a_{iz1})$. The output signal of the accelerometer which is obtained at this time is represented by the function of time $f_{o1}(t)$. The input signal vector is represented by $(a_{ix1}, a_{iy1}, a_{iz1})f_{i1}(t)$. The pulse function is $f_{i1}(t)$. Here, $f_{i1}(t)$ and $f_{o1}(t)$ are subject to FFT. As a result, the data shown in the following table is obtained.

TABLE 5

| Frequency | Result of FFT of pulse acceleration input signal | Result of FFT of output signal of acceleration sensor |
|---|---|---|
| $f_{min}(\omega_{min})$ | $Z_{i,min}$ | $Z_{o,min}$ |
| ⋮ | ⋮ | ⋮ |
| $\omega_1$ | $Z_{i,1}$ | $Z_{o,1}$ |
| ⋮ | ⋮ | ⋮ |
| $f_{max}(\omega_{max})$ | $Z_{i,max}$ | $Z_{o,max}$ |

Here, the aforementioned coefficients are decided as follows:

$$C_{1,1}=a_{ix1}\ C_{1,2}=a_{iy1}\ C_{1,3}=a_{iz1}\ d_1=a_{ox1}=Z_{o,1}/Z_{i,1} \quad \text{(Mathematical 40)}$$

Procedure 2

A random vibration is imparted in the direction of $(a_{ix2}, a_{iy2}, a_{iz2})$. The output signal of the accelerometer which is obtained at this time is represented by the function of time $f_{o2}(t)$. The input signal vector is represented by $(a_{ix2}, a_{iy2}, a_{iz2})f_{i2}(t)$. The random function is $f_{i2}(t)$. Here, $f_{i2}(t)$ and $f_{o2}(t)$ are subject to FFT. As a result, the data shown in the following table is obtained.

TABLE 6

| Frequency | Result of FFT of pulse acceleration input signal | Result of FFT of output signal of acceleration sensor |
|---|---|---|
| $f_{min}(\omega_{min})$ | $Z_{i,min}$ | $Z_{o,min}$ |
| ⋮ | ⋮ | ⋮ |
| $\omega_1$ | $Z_{i,2}$ | $Z_{o,2}$ |
| ⋮ | ⋮ | ⋮ |
| $f_{max}(\omega_{max})$ | $Z_{i,max}$ | $Z_{o,max}$ |

Here, the aforementioned coefficients are decided as follows:

$$C_{2,1}=a_{ix2}\ C_{2,2}=a_{iy2}\ C_{2,3}=a_{iz2}\ d_2=a_{ox2}=Z_{o,2}/Z_{i,2} \quad \text{(Mathematical 41)}$$

Procedure 3

A random vibration is imparted in the direction of $(a_{ix3}, a_{iy3}, a_{iz3})$. The output signal of the accelerometer which is obtained at this time is represented by the function of time $f_{o3}(t)$. The input signal vector is represented by $(a_{ix3}, a_{iy3}, a_{iz3})f_{i3}(t)$. The random function is $f_{i3}(t)$. Here, $f_{i3}(t)$ and $f_{o3}(t)$ are subject to FFT. As a result, the data shown in the following table is obtained.

TABLE 7

| Frequency | Result of FFT of pulse acceleration input signal | Result of FFT of output signal of acceleration sensor |
|---|---|---|
| $f_{min}(\omega_{min})$ | $Z_{i,min}$ | $Z_{o,min}$ |
| ⋮ | ⋮ | ⋮ |
| $\omega_1$ | $Z_{i,3}$ | $Z_{o,3}$ |
| ⋮ | ⋮ | ⋮ |
| $f_{max}(\omega_{max})$ | $Z_{i,max}$ | $Z_{o,max}$ |

Here, the aforementioned coefficients are decided as follows:

$$C_{3,1}=a_{ix3}\ C_{3,2}=a_{iy3}\ C_{3,3}=a_{iz3}\ d_3=a_{ox3}=Z_{o,3}/Z_{i,3} \quad \text{(Mathematical 42)}$$

Procedure 4

Consequently, the coefficient matrix of the aforementioned simultaneous linear equations has been decided and the vectors on the right part have been decided as well. The aforementioned simultaneous linear equations are solved without fail because the vectors in the three directions are selected in linear independence. Subsequently, the matrix sensitivity in a different frequency can be found by selecting another frequency in the table obtained by spectral analysis and performing the same calculation. By performing this calculation on all the frequencies obtained by spectral analysis, it is made possible to find the matrix sensitivity at $[f_{min}\ f_{max}]$ by the frequency resolving power which is decided by the setting of FFT to be used in that case.

The method for finding the matrix sensitivity of the one-axis accelerometer by using a three-axis motion generating machine has been described. Actually, the case of finding the matrix sensitivity of a one-axis accelerometer by using a four-axis motion generating machine, the case of finding the matrix sensitivity of a one-axis accelerometer by using a five-axis motion generating machine, and the case of finding the matrix sensitivity of a one-axis accelerometer by using a six-axis motion generating machine are conceivable. These cases may be severally coped with by using the following approaches.

(1-4) The Case of Finding Matrix Sensitivity of One-Axis Accelerometer by Using a Four-Axis Motion Generating Machine (Note: No particular need is found for designating which of the four axes are used for translational acceleration or for rotational acceleration.) The case of handing a one-axis accelerometer as a one-dimensional accelerometer deriving the sensitivity matrix as a matrix of 1×4 will be explained below.

1) The Case of Using Sinusoidal Wave for Input Acceleration

The output axis of an inertia sensor is taken as the X axis. The axes of motion generated by a motion generating machine are taken as X, Y, Z and α. The dynamic sensitivity matrix of a one-axis accelerometer at a given frequency $f_1(\omega_1=2\pi f_1)$ is represented by $(S_{x,x}(\omega_1), S_{x,y}(\omega_1), S_{x,z}(\omega_1), S_{x,\alpha}(\omega_1))$. The act of finding all the components of this matrix constitutes itself the concept of calibration. Simultaneous linear equations using these four variables as unknown quantities are set as follows.

$$\begin{pmatrix} C_{1,1} & C_{1,2} & C_{1,3} & C_{1,4} \\ C_{2,1} & C_{2,2} & C_{2,3} & C_{2,4} \\ C_{3,1} & C_{3,2} & C_{3,3} & C_{3,4} \\ C_{4,1} & C_{4,2} & C_{4,3} & C_{4,4} \end{pmatrix} \begin{pmatrix} S_{x,x}(\omega_1) \\ S_{x,y}(\omega_1) \\ S_{x,z}(\omega_1) \\ S_{x,\alpha}(\omega_1) \end{pmatrix} = \begin{pmatrix} d_1 \\ d_2 \\ d_3 \\ d_4 \end{pmatrix} \quad \text{(Mathematical 43)}$$

Since the motions which can be generated by a motion generating machine can form a four-dimensional space, it is important that four independent vectors be selected.

Procedure 1

Since the motions which can be generated by the motion generating machine are capable of forming a four-dimensional space and allowing selection of four independent vectors, Procedure 1 first selects the first vector and imparts a sinusoidal wave burst signal having a frequency $f_1(\omega_1=2\pi f_1)$ in that direction. The vector selected from among the independent vectors is represented by $(a_{ix1}, a_{iy1}, a_{iz1}, a_{i\alpha1})$. The input vector acceleration at this time is represented by $(a_{ix1}, a_{iy1}, a_{iz1}, a_{i\alpha1})B_1(t)$. At this time, the output signal of the inertia sensor assumes the form of a sinusoidal wave burst signal. It is assumed that the spectral analysis finds the component of the frequency $f_1(\omega_1=2\pi f_1)$ to be $Z_{o,sb1}$. By this procedure, the first row of the coefficient matrix of the simultaneous linear equations (Mathematical 43) and the first row of the constant vector are found as shown below.

$$C_{1,1}=a_{ix1}\ C_{1,2}=a_{iy1}\ C_{1,3}a_{is1}\ C_{1,4}=a_{ix1}$$

$$d_1=Z_{o,sb1}/Z_{i,sb1} \quad \text{(Mathematical 44)}$$

Procedure 2

Since the motions which can be generated by the motion generating machine are capable of forming a four-dimensional space and allowing selection of four independent vectors, Procedure 2 first selects the second vector and imparts a sinusoidal wave burst signal having a frequency $f_1(\omega_1=2\pi f_1)$ in that direction. The vector selected from among the independent vectors is represented by $(a_{ix2}, a_{iy2}, a_{iz2}, a_{i\alpha2})$. The input vector acceleration at this time is represented by $(a_{ix2}, a_{iy2}, a_{iz2}, a_{i\alpha2})B_2(t)$. At this time, the output signal of the inertia sensor assumes the form of a sinusoidal wave burst signal. It is assumed that the spectral analysis finds the component of the frequency $f_1(\omega_1=2\pi f_1)$ to be $Z_{i,sb2}$. By this procedure, the second row of the coefficient matrix of the simultaneous linear equations (Mathematical 43) and the second row of the constant vector are found as shown below.

$C_{2,1}=a_{ix2}\ C_{2,2}=a_{iy2}\ C_{2,3}=a_{iz2}\ C_{2,4}=a_{i\alpha 2}$ $$d_2=Z_{o,sb2}/Z_{i,sb2} \quad \text{(Mathematical 45)}$$

Procedure 3

Since the motions which can be generated by the motion generating machine are capable of forming a four-dimensional space and allowing selection of four independent vectors, Procedure 3 first selects the third vector and imparts a sinusoidal wave burst signal having a frequency $f_1(\omega_1=2\pi f_1)$ in that direction. The vector selected from among the independent vectors is represented by $(a_{ix3}, a_{iy3}, a_{iz3}, a_{i\alpha 3})$. The input vector acceleration at this time is represented by $(a_{ix3}, a_{iy3}, a_{iz3}, a_{i\alpha 3})B_3(t)$. At this time, the output signal of the inertia sensor assumes the form of a sinusoidal wave burst signal. It is assumed that the spectral analysis finds the component of the frequency $f_1(\omega_1=2\pi f_1)$ to be $Z_{i,sb3}$. By this procedure, the third row of the coefficient matrix of the simultaneous linear equations (Mathematical 43) and the third row of the constant vector are found as shown below.

$C_{3,1}=a_{ix3}\ C_{3,2}=a_{ix3}\ C_{3,3}=a_{iz3}\ C_{3,4}=a_{i\alpha 3}$ $$d_3=Z_{o,sb3}/Z_{i,sb3} \quad \text{(Mathematical 46)}$$

Procedure 4

Since the motions which can be generated by the motion generating machine are capable of forming a four-dimensional space and allowing selection of four independent vectors, Procedure 4 first selects the fourth vector and imparts a sinusoidal wave burst signal having a frequency $f_1(\omega_{1=2}\pi f_1)$ in that direction. The vector selected from among the independent vectors is represented by $(a_{ix4}, a_{iy4}, a_{iz4}, a_{i\alpha 4})$. The input vector acceleration at this time is represented by $(a_{ix4}, a_{iy4}, a_{iz4}, a_{i\alpha 4})B_4(t)$. At this time, the output signal of the inertia sensor assumes the form of a sinusoidal wave burst signal. It is assumed that the spectral analysis finds the component of the frequency $f_1(\omega_1=2\pi f_1)$ to be $Z_{o,sb4}$. By this procedure, the fourth row of the coefficient matrix of the simultaneous linear equations (Mathematical 43) and the fourth row of the constant vector are found as shown below.

$C_{4,1}=a_{ix4}\ C_{4,2=aiy4}\ C_{4,3}=a_{iz4}\ C_{4,4}=a_{i\alpha 4}$ $$d_4=Z_{o,sb4}/Z_{i,sb4} \quad \text{(Mathematical 47)}$$

(1-5) The Case of Finding the Matrix Sensitivity of One-Axis Accelerometer by Using Five-Axis Motion Generating Machine (Note: No particular need is found for designating which of the five axes are used for translational acceleration or for rotational acceleration.) The case of handing a one-axis accelerometer as a one-dimensional accelerometer deriving the sensitivity matrix as a matrix of 1×5 will be explained below.

1) The Case of Using a Sinusoidal Wave for Input Acceleration

The output axis of an inertia sensor is taken as the X axis. The axes of motion generated by a motion generating machine are taken as X, Y, Z, $\alpha$, $\beta$. The dynamic sensitivity matrix of a one-axis accelerometer at a given frequency $f_1(\omega_1=2\pi f_1)$ is represented by $(S_{x,x}(\omega_1), S_{x,y}(\omega_1), S_{x,z}(\omega_1), S_{x,\alpha}(\omega_1), S_{x,\beta}(\omega_1))$. The act of finding all the components of this matrix constitutes itself the concept of calibration. Simultaneous linear equations using these five variables as unknown quantities are set as follows:

$$\begin{pmatrix} C_{1,1} & C_{1,2} & C_{1,3} & C_{1,4} & C_{1,5} \\ C_{2,1} & C_{2,2} & C_{2,3} & C_{2,4} & C_{2,5} \\ C_{3,1} & C_{3,2} & C_{3,3} & C_{3,4} & C_{3,5} \\ C_{4,1} & C_{4,2} & C_{4,3} & C_{4,4} & C_{4,5} \\ C_{5,1} & C_{5,2} & C_{5,3} & C_{5,4} & C_{5,5} \end{pmatrix} \begin{pmatrix} S_{x,x}(\omega_1) \\ S_{x,y}(\omega_1) \\ S_{x,z}(\omega_1) \\ S_{x,\alpha}(\omega_1) \\ S_{x,\beta}(\omega_1) \end{pmatrix} = \begin{pmatrix} d_1 \\ d_2 \\ d_3 \\ d_4 \\ d_5 \end{pmatrix} \quad \text{(Mathematical 48)}$$

(1-6) The Case of Finding Matrix Sensitivity of One-Axis Accelerometer by Using Six-Axis Motion Generating Machine (Note: No Particular Need is Found for Designating Which of the Five Axes are Used for Translational Acceleration or for Rotational Acceleration.)

The case of handing a one-axis accelerometer as a one-dimensional accelerometer deriving the sensitivity matrix as a matrix of 1×6 will be explained below.

1) The Case of Using a Sinusoidal Wave for Input Acceleration

The output axis of an inertia sensor is taken as the X axis. The axes of motion generated by a motion generating machine are taken as X, Y, Z, $\alpha$, $\beta$, $\gamma$. The dynamic sensitivity matrix of a one-axis accelerometer at a given frequency $f_1(\omega_1=2\pi f_1)$ is represented by $(S_{x,x}(\omega_1), S_{x,y}(\omega_1), S_{x,z}(\omega_1), S_{x,\alpha}(\omega_1), S_{x,\beta}(\omega_1), S_{x,\gamma}(\omega_1))$. The act of finding all the components of this matrix constitutes itself the concept of calibration. Simultaneous linear equations using these six variables as unknown quantities are set as follows.

$$\begin{pmatrix} C_{1,1} & C_{1,2} & C_{1,3} & C_{1,4} & C_{1,5} & C_{1,6} \\ C_{2,1} & C_{2,2} & C_{2,3} & C_{2,4} & C_{2,5} & C_{2,6} \\ C_{3,1} & C_{3,2} & C_{3,3} & C_{3,4} & C_{3,5} & C_{3,6} \\ C_{4,1} & C_{4,2} & C_{4,3} & C_{4,4} & C_{4,5} & C_{4,6} \\ C_{5,1} & C_{5,2} & C_{5,3} & C_{5,4} & C_{5,5} & C_{5,6} \\ C_{6,1} & C_{6,2} & C_{6,3} & C_{6,4} & C_{6,5} & C_{6,6} \end{pmatrix} \begin{pmatrix} S_{x,x}(\omega_1) \\ S_{x,y}(\omega_1) \\ S_{x,z}(\omega_1) \\ S_{x,\alpha}(\omega_1) \\ S_{x,\beta}(\omega_1) \\ S_{x,\gamma}(\omega_1) \end{pmatrix} = \begin{pmatrix} d_1 \\ d_2 \\ d_3 \\ d_4 \\ d_5 \\ d_6 \end{pmatrix} \quad \text{(Mathematical 49)}$$

The Case of Two-Axis Accelerometer

The sensitive axes of a two-axis accelerometer are taken as X axis and Y axis. The Laplace-transformed output signal is taken as $(a_{ox}(\omega), a_{oxy}(\omega), 0)$. The letter $\omega$ denotes the angular frequencies. The Z component is zero because the accelerometer is a two-axis sensor. The Laplace-transformed input acceleration is represented by $(a_{ix}(\omega), a_{iy}(\omega), a_{iz}(\omega))$. It is not stipulated that the input acceleration falls on the plane (sensitivity plane) which is decided by two sensitivity axes of the accelerometer. When this stipulation is accepted, it does not result in supporting a conclusion that the input acceleration is regarded as a vector. At this time, the matrix sensitivity is expressed by a matrix of 2×3 shown below.

$$\begin{pmatrix} S_{x,x} & S_{x,y} & S_{x,z} \\ S_{y,x} & S_{y,y} & S_{y,z} \end{pmatrix} \quad \text{(Mathematical 50)}$$

Incidentally, the act of finding all the components of this sensitivity matrix constitutes itself the concept of calibration contemplated by this invention. $S_{x,x}$, $S_{x,y}$, $S_{x,z}$, $S_{y,x}$, $S_{y,y}$ and $S_{y,z}$ are found from the following simultaneous linear equations. It is provided, however, that the coefficient matrix of the simultaneous linear equations and the vector on the right part are more or less varied when the vibration is made with a sinusoidal wave, when the vibration is made with a random waveform, and when the vibration is made with a pulse waveform.

$$\begin{pmatrix} C_{1,1} & C_{1,2} & C_{1,3} & C_{1,4} & C_{1,5} & C_{1,6} \\ C_{2,1} & C_{2,2} & C_{2,3} & C_{2,4} & C_{2,5} & C_{2,6} \\ C_{3,1} & C_{3,2} & C_{3,3} & C_{3,4} & C_{3,5} & C_{3,6} \\ C_{4,1} & C_{4,2} & C_{4,3} & C_{4,4} & C_{4,5} & C_{4,6} \\ C_{5,1} & C_{5,2} & C_{5,3} & C_{5,4} & C_{5,5} & C_{5,6} \\ C_{6,1} & C_{6,2} & C_{6,3} & C_{6,4} & C_{6,5} & C_{6,6} \end{pmatrix} \begin{pmatrix} S_{x,x}(\omega_1) \\ S_{x,y}(\omega_1) \\ S_{x,z}(\omega_1) \\ S_{y,x}(\omega_1) \\ S_{y,y}(\omega_1) \\ S_{y,z}(\omega_1) \end{pmatrix} =$$ (Mathematical 51)

$$\begin{pmatrix} d_1 \\ d_2 \\ d_3 \\ d_4 \\ d_5 \\ d_6 \end{pmatrix}$$

The procedures for deriving the coefficient $C_{ij}$ (i, j=1, ..., 6), $d_i$ (i=1, ..., 6) from the preceding formula will be shown below.

1) The Case of Using a Sinusoidal Wave for Vibration

When the vibration is made with a sinusoidal wave, theoretically the relation between the input acceleration vector $(a_{ix}, a_{iy}, a_{iz})\exp(j\omega t)$ and the output acceleration vector $(a_{ox}, a_{oy})\exp(j\omega t)$ is as shown below.

$$\begin{pmatrix} a_{ox}\exp(j\omega t) \\ a_{oy}\exp(j\omega t) \end{pmatrix} = \begin{pmatrix} S_{x,x} & S_{x,y} & S_{x,z} \\ S_{y,x} & S_{y,y} & S_{y,z} \end{pmatrix} \begin{pmatrix} a_{ix}\exp(j\omega t) \\ a_{iy}\exp(j\omega t) \\ a_{iz}\exp(j\omega t) \end{pmatrix}$$ (Mathematical 52)

Procedure 1

Theoretically, a vibration is imparted first in the direction $(a_{ix1}, a_{iy1}, a_{iz1})$ of the vector at a given frequency $f_1(\omega_1=2\pi f_1)$. The input acceleration vector signal is expressed by $(a_{ix1}, a_{iy1}, a_{iz1})\exp(j\omega_1 t)$. The X axis output signal and the Y axis output signal of the accelerometer are respectively represented by $a_{ox1}(\omega_1)\exp(j\omega_1 t)$ and $a_{oy1}(\omega_1)\exp(j\omega_1 t)$. Since the actual vibration is made with a burst signal and consequently the signal $(a_{ix1}, a_{iy1}, a_{iz1})\exp(j\omega t)$ of the vibration vector is also a burst signal, the three components ought to be considered as resulting from the extraction of the $f_1$ component through FFT. In other words, when the actual vibration signal is expressed on the time base by the function of the vector $(a_{ix1}, a_{iy1}, a_{iz1})B_1(t)$, the part $B_1(t)$ means the burst signal. It is assumed that the complex number $Z_{is1}$ results from extracting the $f_1$ component from the burst part through FFT.

Since the output signals $(B_{ox1}(t), B_{oy1}(t))$ of the accelerometer in this case are also burst signals, the $f_1$ component is extracted likewise through FFT. The $f_1$ component which is obtained at this time is a complex number, the division of this component by $Z_{is1}$ results in $(a_{ox1}(\omega_1), a_{oy1}(\omega_1))$. As a result, the following formula is established for the frequency component 1.

$$\begin{pmatrix} S_{x,x} & S_{x,y} & S_{x,z} \\ S_{y,x} & S_{y,y} & S_{y,z} \end{pmatrix} \begin{pmatrix} a_{ix1} \\ a_{iy1} \\ a_{iz1} \end{pmatrix} = \begin{pmatrix} a_{ox1}(\omega_1) \\ a_{oy1}(\omega_1) \end{pmatrix}$$ (Mathematical 53)

When the coefficient of Mathematical 51 is derived by unifying this formula into equations concerning $(S_{x,x}, S_{x,y}, S_{x,z}, S_{y,y}, S_{y,z})$ the following formula is established.

$C_{1,1}=a_{ix1}$ $C_{1,2}=a_{iy1}$ $C_{1,3}=a_{iz1}$ $C_{1,4}=0$ $C_{1,5}=0$ $C_{1,6}=0$ $C_{2,1}=0$ $C_{2,2}=0$ $C_{2,3}=0$ $C_{2,4}=a_{ix1}$ $C_{2,5}=a_{iy1}$ $C_{2,6}=a_{iz1}$ $d_1=a_{ox1}(\omega_1)$ $d_2=a_{oy1}(\omega_1)$ (Mathematical 54)

Procedure 2

Theoretically, a vibration is imparted first in the direction $((a_{ix2}, a_{iy2}, a_{iz2})$ of the vector at a given frequency $f_1(\omega_1=2\pi f_1)$. The input acceleration vector signal is expressed by $(a_{ix2}, a_{iy2}, a_{iz2})\exp(j\omega t)$. The X axis output signal and the Y axis output signal of the accelerometer are respectively represented by $a_{ox2}(\bullet_1)\exp(j\omega_1 t)$ and $a_{oy2}(\omega_1)\exp(j\omega_1 t)$.

Since the actual vibration is made with a burst signal and consequently the signal $(a_{ix2}, a_{iy2}, a_{iz2})\exp(j\omega t)$ of the theoretical vibration vector is also a burst signal, the three components ought to be considered as resulting from the extraction of the $f_1$ component through FFT. In other words, when the actual vibration signal is expressed on the time base by the function of the vector $(a_{ix2}, a_{iy2}, a_{iz2})B_1(t)$, the part $B_2(t)$ means the burst signal. It is assumed that the complex number $Z_{is2}$ results from extracting the $f_1$ component from the burst part through FFT.

Since the output signals $(B_{ox2}(t), B_{oy2}(t))$ of the accelerometer in this case are also burst signals, the $f_1$ component is extracted likewise through FFT. The $f_1$ component which is obtained at this time is a complex number, the division of this component by $Z_{is2}$ results in $(a_{ox2}(\omega_1), a_{oy2}(\omega_1))$. As a result, the following formula is established in Procedure 2 for the frequency component 1.

$$\begin{pmatrix} S_{x,x} & S_{x,y} & S_{x,z} \\ S_{y,x} & S_{y,y} & S_{y,z} \end{pmatrix} \begin{pmatrix} a_{ix2} \\ a_{iy2} \\ a_{iz2} \end{pmatrix} = \begin{pmatrix} a_{ox2}(\omega_1) \\ a_{oy2}(\omega_1) \end{pmatrix}$$ (Mathematical 55)

When the coefficient of Mathematical 51 is derived by unifying this formula into equations concerning $(S_{x,x}, S_{x,y}, S_{x,z}, S_{y,x}, S_{y,y}, S_{y,z})$ the following formula is established.

$C_{3,1}=a_{ix2}$ $C_{3,2}=a_{iy2}$ $C_{3,3}=a_{iz2}$ $C_{3,4}=0$ $C_{3,5}=0$ $C_{3,6}=0$ $C_{4,1}=0$ $C_{4,2}=0$ $C_{4,3}=0$ $C_{3,4}=a_{ix2}$ $C_{3,5}=a_{iy2}$ $C_{3,6}=a_{iz2}$ $d_3=a_{ox2}(\omega_1)$ $d_4=a_{oy2}(\Omega_1)$ (Mathematical 56)

Procedure 3

Theoretically, a vibration is imparted first in the direction $(a_{ix3}, a_{iy3}, a_{iz3})$ of the vector at a given frequency $f_1(\omega_1=2\pi f_1)$. The input acceleration vector signal is expressed by $(a_{ix3}, a_{iy3}, a_{iz3})\exp(j\omega_1 t)$. The X axis output signal and the Y axis output signal of the accelerometer are respectively represented by $a_{ox3}(\omega_1)\exp(j\omega_1 t)$ and $a_{oy3}(\omega_1)\exp(j\omega_1 t)$. Since the actual vibration is made with a burst signal and consequently the signal $(a_{ix3}, a_{iy3}, a_{ic3})\exp(j\omega_1 t)$ of the theoretical vibration vector is also a burst signal, the three components ought to be considered as resulting from the extraction of the $f_1$ component through FFT. In other words, when the actual vibration signal is expressed on the time base by the function of the vector $(a_{ix3}, a_{iy3}, a_{iz3})B_3(t)$, the part $B_3(t)$ means the burst signal. It is assumed that the complex number $Z_{is3}$ results from extracting the $f_1$ component from the burst part through FFT.

Since the output signals $(B_{ox3}(t), B_{oy3}(t))$ of the accelerometer in this case are also burst signals, the $f_1$ component is extracted likewise through FFT. The $f_1$ component which is obtained at this time is a complex number, the division of this component by $Z_{is3}$ results in $(a_{ox3}(\omega_1)\ a_{oy3}(\omega_1))$. As a result, the following formula is established in Procedure 3 for the frequency component 1.

$$C_{5,1}=a_{ix3}\ C_{5,2}=a_{iy3}\ C_{5,3}=a_{iz3}\ C_{5,4}=0\ C_{5,5}=0\ C_{5,6}=0$$

$$C_{6,1}=0\ C_{6,2}=0\ C_{6,3}=0\ C_{6,4}=a_{ix3}\ C_{6,5}=a_{iy3}\ C_{6,6}=a_{ix3}$$

$$d_5=a_{ox3}(\omega_1)\ d_6=a_{oy3}(\omega_1) \quad \text{(Mathematical 57)}$$

When the coefficient of Mathematical 51 is derived by unifying this formula into equations concerning $(S_{x,x}, S_{x,y}, S_{x,z}, S_{y,x}, S_{y,y}, S_{y,z})$, the following formula is established.

$$\begin{pmatrix} a_{ix1} & a_{iy1} & a_{iz1} & 0 & 0 & 0 \\ 0 & 0 & 0 & a_{ix1} & a_{iy1} & a_{iz1} \\ a_{ix2} & a_{iy2} & a_{iz2} & 0 & 0 & 0 \\ 0 & 0 & 0 & a_{ix2} & a_{iy2} & a_{iz2} \\ a_{ix3} & a_{iy3} & a_{iz3} & 0 & 0 & 0 \\ 0 & 0 & 0 & a_{ix3} & a_{iy3} & a_{iz3} \end{pmatrix} \quad \text{(Mathematical 58)}$$

The coefficient matrix of Mathematical 51 and the coefficient of the right part have been decided till Procedure 3. The following formula results from rewriting the coefficient matrix.

$$\begin{pmatrix} a_{ix1} & a_{iy1} & a_{iz1} & 0 & 0 & 0 \\ 0 & 0 & 0 & a_{ix1} & a_{iy1} & a_{iz1} \\ a_{ix2} & a_{iy2} & a_{iz2} & 0 & 0 & 0 \\ 0 & 0 & 0 & a_{ix2} & a_{iy2} & a_{iz2} \\ a_{ix3} & a_{iy3} & a_{iz3} & 0 & 0 & 0 \\ 0 & 0 & 0 & a_{ix3} & a_{iy3} & a_{iz3} \end{pmatrix} \quad \text{(Mathematical 59)}$$

When the input vectors $(a_{ix1}, a_{iy1}, a_{iz1})$, $(a_{ix2}, a_{iy2}, a_{iz2})$, $(a_{ix3}, a_{iy3}, a_{iz3})$ in Mathematical 59 are selected in linear independence, the coefficient determinant is not zero. Thus, the simultaneous linear equations are solved without fail. The reason can be explained by the following transformation.

$$\begin{vmatrix} a_{ix1} & a_{iy1} & a_{iz1} & 0 & 0 & 0 \\ 0 & 0 & 0 & a_{ix1} & a_{iy1} & a_{iz1} \\ a_{ix2} & a_{iy2} & a_{iz2} & 0 & 0 & 0 \\ 0 & 0 & 0 & a_{ix2} & a_{iy2} & a_{iz2} \\ a_{ix3} & a_{iy3} & a_{iz3} & 0 & 0 & 0 \\ 0 & 0 & 0 & a_{ix3} & a_{iy3} & a_{iz3} \end{vmatrix} \quad \text{(Mathematical 60)}$$

The exchange of the second row and the third row in this formula, results in the following formula.

$$= -\begin{vmatrix} a_{ix1} & a_{iy1} & a_{iz1} & 0 & 0 & 0 \\ a_{ix2} & a_{iy2} & a_{iz2} & 0 & 0 & 0 \\ 0 & 0 & 0 & a_{ix1} & a_{iy1} & a_{iz1} \\ 0 & 0 & 0 & a_{ix2} & a_{iy2} & a_{iz2} \\ a_{ix3} & a_{iy3} & a_{iz3} & 0 & 0 & 0 \\ 0 & 0 & 0 & a_{ix3} & a_{iy3} & a_{iz3} \end{vmatrix} \quad \text{(Mathematical 61)}$$

Here, the exchange of the third row and the fifth row in this formula, results in the following formula.

$$= \begin{vmatrix} a_{ix1} & a_{iy1} & a_{iz1} & 0 & 0 & 0 \\ 0 & 0 & 0 & a_{ix1} & a_{iy1} & a_{iz1} \\ a_{ix2} & a_{iy2} & a_{iz2} & 0 & 0 & 0 \\ 0 & 0 & 0 & a_{ix2} & a_{iy2} & a_{iz2} \\ a_{ix3} & a_{iy3} & a_{iz3} & 0 & 0 & 0 \\ 0 & 0 & 0 & a_{ix3} & a_{iy3} & a_{iz3} \end{vmatrix} \quad \text{(Mathematical 62)}$$

Further, the exchange of the fourth row and the fifth row in this formula, results in the following formula.

$$= -\begin{vmatrix} a_{ix1} & a_{iy1} & a_{iz1} \\ a_{ix2} & a_{iy2} & a_{iz2} \\ a_{ix3} & a_{iy3} & a_{iz3} \end{vmatrix}^2 \quad \text{(Mathematical 63)}$$

Procedure 4

Consequently, the coefficient matrix of the aforementioned simultaneous linear equations has been decided and the vectors on the right part have been decided as well. The aforementioned simultaneous linear equations are solved without fail because the vectors in the three directions are selected in linear independence. Subsequently, the matrix sensitivity in a different frequency can be found by selecting another frequency in the table obtained by spectral analysis and performing the same calculation. Specifically, the frequency is scanned in a necessary frequency band.

2) The Case of Using a Random Waveform for Input Acceleration

The direction of random vibration is selected in a direction of linear independence. This direction is represented by $(a_{ix1}, a_{iy1}, a_{iz1})$, $(a_{ix2}, a_{iy2}, a_{iz2})$; and $(a_{ix3}, a_{iy3}, a_{iz3})$. It is assumed that the frequency band of random vibration signals in these directions is expressed by $[f_{min}, f_{max}]$. The sensitivity axes of a two-axis accelerometer are denoted by X axis and Y axis. The Laplace-transformed output signals are represented by $(a_{ox}(\omega), a_{oy}(\omega), 0)$. The Z component is zero because the accelerometer is a two-axis sensor. The Laplace-transformed input acceleration is represented by $(a_{ix}(\omega), a_{iy}(\omega), a_{iz}(\omega))$.

It is not stipulated that the input acceleration falls on the plane (sensitivity plane) which is decided by two sensitivity axes of the accelerometer. When this stipulation is accepted, it does not result in supporting a conclusion that the input acceleration is regarded as a vector. At this time, the matrix sensitivity is expressed by a matrix of 2×3 shown below.

It is assumed that the dynamic sensitivity matrix of the two-axis accelerometer in a given frequency $f_1(\omega_1=2\pi f_1)$ is expressed by the following matrix.

$$\begin{pmatrix} S_{x,x}, & S_{x,y}, & S_{x,z} \\ S_{y,x}, & S_{y,y}, & S_{y,z} \end{pmatrix} \quad \text{(Mathematical 64)}$$

The act of finding all the components of this matrix constitutes itself the concept of calibration. The simultaneous linear equations concerning these six unknown quantities are set as follows:

$$\begin{pmatrix} C_{1,1} & C_{1,2} & C_{1,3} & C_{1,4} & C_{1,5} & C_{1,6} \\ C_{2,1} & C_{2,2} & C_{2,3} & C_{2,4} & C_{2,5} & C_{2,6} \\ C_{3,1} & C_{3,2} & C_{3,3} & C_{3,4} & C_{3,5} & C_{3,6} \\ C_{4,1} & C_{4,2} & C_{4,3} & C_{4,4} & C_{4,5} & C_{4,6} \\ C_{5,1} & C_{5,2} & C_{5,3} & C_{5,4} & C_{5,5} & C_{5,6} \\ C_{6,1} & C_{6,2} & C_{6,3} & C_{6,4} & C_{6,5} & C_{6,6} \end{pmatrix} \begin{pmatrix} S_{x,x} \\ S_{x,y} \\ S_{x,z} \\ S_{y,x} \\ S_{y,y} \\ S_{y,z} \end{pmatrix} = \begin{pmatrix} d_1 \\ d_2 \\ d_3 \\ d_4 \\ d_5 \\ d_6 \end{pmatrix} \quad \text{(Mathematical 65)}$$

The coefficient matrix and the constant term of the right part in Mathematical 65 in the case of random vibration are found by the following procedure.

Procedure 1

A random vibration is imparted in the $(a_{ix1}, a_{iy1}, a_{iz1})$ direction. The X axis output signal and the Y axis output signal of the accelerometer obtained at this time are represented by the functions of time, $(a_{o1x}(t), a_{o1y}(t))$. The input signal vectors are represented by $(a_{ix1}, a_{iy1}, a_{iz1})f_{i1}(t)$. The random function is $f_{i1}(t)$. Here, $f_{i1}(t)$, $f_{o1x}(t)$, and $f_{o1y}(t)$ are subject to FFT. As a result, the data shown in the following table is obtained regarding the individual frequency components.

From this table, part of the coefficient of Mathematical 65 is found as follows:

$C_{1,1}=a_{ix1}$ $C_{1,2}=a_{iy1}$ $C_{1,3}=a_{iz1}$ $C_{1,4}=0$ $C_{1,5}=0$ $C_{1,6}=0$ $C_{2,1}=0$ $C_{2,2}=0$ $C_{2,3}=0$ $C_{2,4}=a_{ix1}$ $C_{2,5}=a_{iy1}$ $C_{2,6}=a_{iz1}$ $d_1=Z_{o,1,1,x}/Z_{i,1,1}$ $d_2=Z_{o,1,1,y}/Z_{i,1,1}$ \quad (Mathematical 66)

Procedure 2

A random vibration is imparted in the $(a_{ix2}, a_{iy2}, a_{iz2})$ direction. The X axis output signal and the Y axis output signal of the accelerometer obtained at this time are represented by the functions of time, $(a_{o2x}(t), a_{o2y}(t))$. The input signal vectors are represented by $(a_{ix2}, a_{iy2}, a_{iz2})f_{i2}(t)$. The random function is $f_{i2}(t)$. Here, $f_{i2}(t)$, $f_{o2x}(t)$, $f_{o2y}(t)$ are subject to FFT. As a result, the data shown in the following table is obtained regarding the individual frequency components.

TABLE 8

| Frequency | Result of FFT of random acceleration input signal $f_{i1}(t)$ | Result of FFT of output signal $f_{o1x}(t)$ of acceleration sensor | Result of FFT of output signal $f_{o1y}(t)$ of acceleration sensor |
|---|---|---|---|
| $f_{min}(\omega_{min})$ | $Z_{i,min}$ | $Z_{o,min,x}$ | $Z_{o,min,y}$ |
| ⋮ | ⋮ | ⋮ | ⋮ |
| $\omega_1$ | $Z_{i,1,1}$ | $Z_{o,1,1,x}$ | $Z_{o,1,1,y}$ |
| ⋮ | ⋮ | ⋮ | ⋮ |
| $f_{max}(\omega_{max})$ | $Z_{i,max}$ | $Z_{o,max,x}$ | $Z_{o,max,y}$ |

TABLE 9

| Frequency | Result of FFT of random acceleration input signal $f_{i2}(t)$ | Result of FFT of output signal $f_{o2x}(t)$ of acceleration sensor | Result of FFT of output signal $f_{o2y}(t)$ of acceleration sensor |
|---|---|---|---|
| $f_{min}(\omega_{min})$ | $Z_{i,min}$ | $Z_{o,min,x}$ | $Z_{o,min,y}$ |
| ⋮ | ⋮ | ⋮ | ⋮ |
| $\omega_1$ | $Z_{i,1,1}$ | $Z_{o,1,2,x}$ | $Z_{o,1,2,y}$ |
| ⋮ | ⋮ | ⋮ | ⋮ |
| $f_{max}(\omega_{max})$ | $Z_{i,max}$ | $Z_{o,max,x}$ | $Z_{o,max,y}$ |

From this table, part of the coefficient of Mathematical 65 is found as follows:

$C_{3,1}=a_{ix2}\ C_{3,2}=a_{iy2}\ C_{3,3}=a_{iz2}\ C_{3,4}=0\ C_{3,5}=0\ C_{3,6}=0$ $C_{4,1}=0\ C_{4,2}=0\ C_{4,1}=0\ C_{4,4}=a_{ix2}\ C_{4,5}=a_{iy2}\ C_{4,6}=a_{iz2}$ $d_3=Z_{o,1,2,x}/Z_{i,1,2}\ d_4=Z_{o,1,2,y}/Z_{i,1,2}$  (Mathematical 67)

Procedure 3

A random vibration is imparted in the $(a_{ix3}, a_{iy3}, a_{iz3})$ direction. The X axis output signal and the Y axis output signal of the accelerometer obtained at this time are represented by the functions of time, $(a_{o3x}(t), a_{o3y}(t))$. The input signal vectors are represented by $(a_{ix3}, a_{iy3}, a_{iz3})f_{i3}(t)$. The random function is $f_{i3}(t)$. Here, $f_{i3}(t)$, $f_{o3x}(t)$, $f_{o3y}(t)$ are subject to FFT. As a result, the data shown in the following table is obtained regarding the individual frequency components.

TABLE 10

| Frequency | Result of FFT of random acceleration input signal $f_{i3}(t)$ | Result of FFT of output signal $f_{o3x}(t)$ of acceleration sensor | Result of FFT of output signal $f_{o3y}(t)$ of acceleration sensor |
|---|---|---|---|
| $f_{min}(\omega_{min})$ | $Z_{i,min}$ | $Z_{o,min,x}$ | $Z_{o,min,y}$ |
| ⋮ | ⋮ | ⋮ | ⋮ |
| $\omega_1$ | $Z_{i,1,3}$ | $Z_{o,1,3,x}$ | $Z_{o,1,3,y}$ |
| ⋮ | ⋮ | ⋮ | ⋮ |
| $f_{max}(\omega_{max})$ | $Z_{i,max}$ | $Z_{o,max,x}$ | $Z_{o,max,y}$ |

From this table, part of the coefficient of Mathematical 65 is found as follows:

$C_{5,1}=a_{ix3}\ C_{5,2}=a_{iy3}\ C_{5,3}=a_{iz3}\ C_{5,4}=0\ C_{5,5}=0\ C_{5,6}=0$ $C_{6,1}=0\ C_{6,2}=0\ C_{6,3}=0\ C_{6,4}=a_{ix3}\ C_{6,5}=a_{iy3}\ C_{6,6}=a_{iz3}$ $d_5=Z_{o,1,3,x}/Z_{i,1,3}\ d_6=Z_{o,1,3,y}/Z_{i,1,3}$  (Mathematical 68)

Procedure 4

Consequently, the coefficient matrix of the aforementioned simultaneous linear equations (Mathematical 65) has been decided and the vectors on the right part have been decided as well. The aforementioned simultaneous linear equations are solved without fail because the vectors in the three directions are selected in linear independence. Subsequently, the matrix sensitivity in a different frequency can be found by setting the vibration frequency at a different value and performing the same calculation. Specifically, by scanning the frequency in a necessary frequency band $[f_{min}\ f_{max}]$ and forming equations with the individual frequency, it is made possible to find the matrix sensitivity with the individual frequency.

3) The Case of Using a Pulse Waveform for Input Acceleration

The direction vector of pulse input acceleration is selected in the direction of linear independence. This direction is represented as follows:

$(a_{ix1}, a_{iy1}, a_{iz1})$, $(a_{ix2}, a_{iy2}, a_{iz2})$ and $(a_{ix3}, a_{iy3}, a_{iz3})$.

It is assumed that the frequency band of the pulse input acceleration in these directions is expressed as follows:

$[f_{min}\ f_{max}]$

Then, the dynamic sensitivity matrix of the one-axis accelerometer in a given frequency $f_1(\omega_1=2\pi f_1)$ is expressed as follows:

$$\begin{pmatrix} S_{x,x} & S_{x,y} & S_{x,z} \\ S_{y,x} & S_{y,y} & S_{y,z} \end{pmatrix}$$  (Mathematical 69)

The act of finding all the components of this matrix constitutes itself the concept of calibration contemplated by this invention. The simultaneous linear equations having these six unknown quantities are set as follows:

$$\begin{pmatrix} C_{1,1} & C_{1,2} & C_{1,3} & C_{1,4} & C_{1,5} & C_{1,6} \\ C_{2,1} & C_{2,2} & C_{2,3} & C_{2,4} & C_{2,5} & C_{2,6} \\ C_{3,1} & C_{3,2} & C_{3,3} & C_{3,4} & C_{3,5} & C_{3,6} \\ C_{4,1} & C_{4,2} & C_{4,3} & C_{4,4} & C_{4,5} & C_{4,6} \\ C_{5,1} & C_{5,2} & C_{5,3} & C_{5,4} & C_{5,5} & C_{5,6} \\ C_{6,1} & C_{6,2} & C_{6,3} & C_{6,4} & C_{6,5} & C_{6,6} \end{pmatrix} \begin{pmatrix} S_{x,x} \\ S_{x,y} \\ S_{x,z} \\ S_{y,x} \\ S_{y,y} \\ S_{y,z} \end{pmatrix} = \begin{pmatrix} d_1 \\ d_2 \\ d_3 \\ d_4 \\ d_5 \\ d_6 \end{pmatrix}$$  (Mathematical 70)

When the input acceleration is made with a pulse waveform, the coefficients $C_{ij}$ (i=1 ... 6, j=1 ... 6), $d_i$ (i=1 ... 6) of the aforementioned simultaneous linear equations are decided by the following procedures.

Procedure 1

A pulse acceleration is imparted in the $(a_{ix1}, a_{iy1}, a_{iz1})$ direction. The X axis output signal and the Y axis output signal of the accelerometer obtained at this time are represented by the functions of time, $f_{o1x}(t)$ and $f_{o1y}(t)$. The input signal vectors are represented by $(a_{ix1}, a_{iy1}, a_{iz1})f_{i1}(t)$. The pulse function is $f_{i1}(t)$. Here, $f_{i1}(t)$, $f_{o1x}(t)$, $f_{o1y}(t)$ are subject to FFT. As a result, the data shown in the following table is obtained.

TABLE 11

| Frequency | Result of FFT of pulse acceleration input signal $f_{i1}(t)$ | Result of FFT of output signal $f_{o1x}(t)$ of acceleration sensor | Result of FFT of output signal $f_{o1y}(t)$ of acceleration sensor |
|---|---|---|---|
| $f_{min}(\omega_{min})$ | $Z_{i,min}$ | $Z_{o,min,x}$ | $Z_{o,min,y}$ |
| ⋮ | ⋮ | ⋮ | ⋮ |
| $\omega_1$ | $Z_{i,1,1}$ | $Z_{o,1,1,x}$ | $Z_{o,1,1,y}$ |
| ⋮ | ⋮ | ⋮ | ⋮ |
| $f_{max}(\omega_{max})$ | $Z_{i,max}$ | $Z_{o,max,x}$ | $Z_{o,max,y}$ |

By using the results of this table, it is made possible to find part of the coefficients of the simultaneous linear equations as follows:

$$C_{1,1}=a_{ix1} \; C_{1,2}=a_{iy1} \; C_{1,3}=a_{iz1} \; C_{1,4}=0 \; C_{1,5}=0 \; C_{1,6}=0$$

$$C_{2,1}=0 \; C_{2,2}=0 \; C_{2,3}=0 \; C_{2,4}=a_{ix1} \; C_{2,5}=a_{iy1} \; C_{2,6}=a_{iz1}$$

$$d_1=Z_{o,1,1,x}/Z_{i,1,1} \; d_2=Z_{o,1,1,y}/Z_{i,1,1} \qquad \text{(Mathematical 71)}$$

Procedure 2

A pulse acceleration is imparted in the $(a_{ix2}, a_{iy2}, a_{iz2})$ direction. The X axis output signal and the Y axis output signal of the accelerometer obtained at this time are represented by the functions of time, $f_{o2x}(t)$ and $f_{o2y}(t)$. The input signal vectors are represented by $(a_{ix2}, a_{iy2}, a_{iz2})f_{i2}(t)$. The pulse function is $f_{i2}(t)$. Here, $f_{i2}(t)$, $f_{o2x}(t)$, $f_{o2y}(t)$ are subject to FFT. As a result, the data shown in the following table is obtained.

TABLE 12

| Frequency | Result of FFT of pulse acceleration input signal $f_{i2}(t)$ | Result of FFT of output signal $f_{o2x}(t)$ of acceleration sensor | Result of FFT of output signal $f_{o2y}(t)$ of acceleration sensor |
|---|---|---|---|
| $f_{min}(\omega_{min})$ | $Z_{i,min}$ | $Z_{o,min,x}$ | $Z_{o,min,y}$ |
| • | • | • | • |
| $\omega_1$ | $Z_{i,1,2}$ | $Z_{o,1,2,x}$ | $Z_{o,1,2,y}$ |
| • | • | • | • |
| $f_{max}(\omega_{max})$ | $Z_{i,max}$ | $Z_{o,max,x}$ | $Z_{o,max,y}$ |

By using the results of this table, it is made possible to find part of the coefficients of the simultaneous linear equations as follows:

$$C_{3,1}=a_{ix2} \; C_{3,2}=a_{iy2} \; C_{3,3}=a_{iz2} \; C_{3,4}=0 \; C_{3,5}=0 \; C_{3,6}=0$$

$$C_{4,1}=0 \; C_{4,2}=0 \; C_{4,3}=0 \; C_{4,4}=a_{ix2} \; C_{4,5}=a_{iy2} \; C_{4,6}=a_{iz2}$$

$$d_3=Z_{o,1,2,x}/Z_{i,1,2} \; d_4=Z_{o,1,2,y}/Z_{i,1,2} \qquad \text{(Mathematical 72)}$$

Procedure 3

A pulse acceleration is imparted in the $(a_{ix3}, a_{iy3}, a_{iz3})$ direction. The X axis output signal and the Y axis output signal of the accelerometer obtained at this time are represented by the functions of time, $f_{o3x}(t)$ and $f_{o3y}(t)$. The input signal vectors are represented by $(a_{ix3}, a_{iy3}, a_{iz3})f_{i3}(t)$. The pulse function is $f_{i3}(t)$. Here, $f_{i3}(t)$, $f_{o3x}(t)$, $f_{o3y}(t)$ are subject to FFT. As a result, the data shown in the following table is obtained.

TABLE 13

| Frequency | Result of FFT of pulse acceleration input signal $f_{i3}(t)$ | Result of FFT of output signal $f_{o3x}(t)$ of acceleration sensor | Result of FFT of output signal $f_{o3y}(t)$ of acceleration sensor |
|---|---|---|---|
| $f_{min}(\omega_{min})$ | $Z_{i,min}$ | $Z_{o,min,x}$ | $Z_{o,min,y}$ |
| • | • | • | • |
| $\omega_1$ | $Z_{i,1,3}$ | $Z_{o,1,3,x}$ | $Z_{o,1,3,y}$ |
| • | • | • | • |
| $f_{max}(\omega_{max})$ | $Z_{i,max}$ | $Z_{o,max,x}$ | $Z_{o,max,y}$ |

By using the results of this table, it is made possible to find part of the coefficients of the simultaneous linear equations (Mathematical 70) as follows:

$$C_{5,1}=a_{ix3} \; C_{5,2}=a_{iy3} \; C_{5,3}=a_{iz3} \; C_{5,4}=0 \; C_{5,5}=0 \; C_{5,6}=0$$

$$C_{6,1}=0 \; C_{6,2}=0 \; C_{6,3}=0 \; C_{6,4}=a_{ix3} \; C_{6,5}=a_{iy3} \; C_{6,6}=a_{iz3}$$

$$d_5=Z_{o,1,3,x}/Z_{i,1,3} \; d_6=Z_{o,1,3,y}/Z_{i,1,3} \qquad \text{(Mathematical 73)}$$

Procedure 4

Consequently, the coefficient matrix of the aforementioned simultaneous linear equations (Mathematical 70) has been decided and the vectors on the right part have been decided as well. The aforementioned simultaneous linear equations are solved without fail because the vectors in the three directions are selected in linear independence. Subsequently, the matrix sensitivity in a different frequency can be found by setting the vibration frequency at a different value and performing the same calculation. Specifically, by scanning the frequency in a necessary frequency band $[f_{min} \; f_{max}]$ and forming equations with the individual frequencies, it is made possible to find the matrix sensitivity with the individual frequencies.

The case of three-axis accelerometers

The sensitivity axes of a three-axis accelerometer are represented respectively by X axis, Y axis and Z axis. The Laplace-transformed output signals are represented by $(a_{ox}(\omega), a_{oy}(\omega), a_{oz}(\omega))$. The letter $\omega$ denotes the angular frequency. The Laplace-transformed input acceleration is represented by $(a_{ix}(\omega), a_{iy}(\omega), a_{iz}(\omega))$. At this time, the matrix sensitivity is expressed by a matrix of 3×3 shown below. The relation between the output signal vector and the input vector signal is expressed by Mathematical 74.

$$\begin{pmatrix} a_{ox}(\omega) \\ a_{oy}(\omega) \\ a_{oz}(\omega) \end{pmatrix} = \begin{pmatrix} S_{x,x} & S_{x,y} & S_{x,z} \\ S_{y,x} & S_{y,y} & S_{y,z} \\ S_{z,x} & S_{z,y} & S_{z,z} \end{pmatrix} \begin{pmatrix} a_{ix}(\omega) \\ a_{iy}(\omega) \\ a_{iz}(\omega) \end{pmatrix} \qquad \text{(Mathematical 74)}$$

Incidentally, the act of finding all the components of this sensitivity matrix constitutes itself the concept of calibration contemplated by this invention. $S_{x,x}$, $S_{x,y}$, $S_{x,z}$, $S_{y,x}$, $S_{y,y}$, $S_{y,z}$, $S_{z,x}$, $S_{z,y}$ and $S_{z,z}$ are found from the following simultaneous linear equations. It is provided, however, that the coefficient matrix of the simultaneous linear equations and the vector on the right part are more or less varied when the vibration is made with a sinusoidal wave, when the vibration is made with a random waveform, and when the input acceleration is made with a pulse waveform. The procedures will be shown below.

$$\begin{pmatrix} C_{1,1} & C_{1,2} & C_{1,3} & C_{1,4} & C_{1,5} & C_{1,6} & C_{1,7} & C_{1,8} & C_{1,9} \\ C_{2,1} & C_{2,2} & C_{2,3} & C_{2,4} & C_{2,5} & C_{2,6} & C_{2,7} & C_{2,8} & C_{2,9} \\ C_{3,1} & C_{3,2} & C_{3,3} & C_{3,4} & C_{3,5} & C_{3,6} & C_{3,7} & C_{3,8} & C_{3,9} \\ C_{4,1} & C_{4,2} & C_{4,3} & C_{4,4} & C_{4,5} & C_{4,6} & C_{4,7} & C_{4,8} & C_{4,9} \\ C_{5,1} & C_{5,2} & C_{5,3} & C_{5,4} & C_{5,5} & C_{5,6} & C_{5,7} & C_{5,8} & C_{5,9} \\ C_{6,1} & C_{6,2} & C_{6,3} & C_{6,4} & C_{6,5} & C_{6,6} & C_{6,7} & C_{6,8} & C_{6,9} \\ C_{7,1} & C_{7,2} & C_{7,3} & C_{7,4} & C_{7,5} & C_{7,6} & C_{7,7} & C_{7,8} & C_{7,9} \\ C_{8,1} & C_{8,2} & C_{8,3} & C_{8,4} & C_{8,5} & C_{8,6} & C_{8,7} & C_{8,8} & C_{8,9} \\ C_{9,1} & C_{9,2} & C_{9,3} & C_{9,4} & C_{9,5} & C_{9,6} & C_{9,7} & C_{9,8} & C_{9,9} \end{pmatrix} \begin{pmatrix} S_{x,x} \\ S_{x,y} \\ S_{x,z} \\ S_{y,x} \\ S_{y,y} \\ S_{y,z} \\ S_{z,x} \\ S_{z,y} \\ S_{z,z} \end{pmatrix} = \begin{pmatrix} d_1 \\ d_2 \\ d_3 \\ d_4 \\ d_5 \\ d_6 \\ d_7 \\ d_8 \\ d_9 \end{pmatrix}$$

(Mathematical 75)

When the vibration is made with a sinusoidal waveform, a random waveform, or a pulse waveform, the coefficient $C_{ij}$ (I=1 ... 9, j=1 ... 9), $d_i$ (i=1 ... 9) of the aforementioned simultaneous linear equations is decided by the following procedures.

1) The Case of Using Sinusoidal Waveform for Input Acceleration

When the input acceleration is made with a sinusoidal waveform, theoretically the relation between the input acceleration vector $(a_{ix}, a_{iy}, a_{iz})\exp(j\omega t)$ and the output acceleration vector $(a_{ox}, a_{oy}, a_{oz})\exp(j\omega t)$ is as shown below.

$$\begin{pmatrix} a_{ox}\exp(j\omega t) \\ a_{oy}\exp(j\omega t) \\ a_{oz}\exp(j\omega t) \end{pmatrix} = \begin{pmatrix} S_{x,x} & S_{x,y} & S_{x,z} \\ S_{y,x} & S_{y,y} & S_{y,z} \\ S_{z,x} & S_{z,y} & S_{z,z} \end{pmatrix} \begin{pmatrix} a_{ix}\exp(j\omega t) \\ a_{iy}\exp(j\omega t) \\ a_{iz}\exp(j\omega t) \end{pmatrix}$$

(Mathematical 76)

Procedure 1

Theoretically, an input acceleration is imparted first in the direction of vector $(a_{ix1}, a_{iy1}, a_{iz1})$ at a given frequency $f_1(\omega_1=2\pi f_1)$. The input acceleration vector signal is represented by $(a_{ix1}, a_{iy1}, a_{iz1})\exp(j\omega t)$. The X axis output signal, the Y axis output signal, and Z axis output signal of the accelerometer at this time are respectively represented by $a_{ox1}(\omega_1)\exp(j\omega_1 t)$, $a_{oy1}(\omega_1)\exp(j\omega_1 t)$ and $a_{oz1}(\omega_1)\exp(j\omega_1 t)$.

Since the actual vibration is made with a burst signal and consequently the signal $(a_{ix1}, a_{iy1}, a_{iz1})\exp(j\omega t)$ is also a burst signal, the three components ought to be considered as resulting from the extraction of the $f_1$ component through FFT. In other words, when the actual vibration signal is expressed on the time base by the function of the vector $(a_{ix1}, a_{iy1}, a_{iz1})B_1(t)$, the part $B_1(t)$ means the burst signal. It is assumed that the complex number $Z_{is1}$ results from extracting the $f_1$ component from the burst part through FFT.

Since the output signals $(B_{ox1}(t), B_{oy1}(t), B_{oz1}(t))$ of the accelerometer in this case are also burst signals, the $f_1$ component is extracted likewise through FFT. The $f_1$ component which is obtained at this time is a complex number, the division of this component by $Z_{is1}$ results in $(a_{ox1}(\omega_1), a_{oy1}(\omega_1), a_{oz1}(\omega_1))$. As a result, the following formula is established for the frequency component 1.

$$\begin{pmatrix} S_{x,x} & S_{x,y} & S_{x,z} \\ S_{y,x} & S_{y,y} & S_{y,z} \\ S_{z,x} & S_{z,y} & S_{z,z} \end{pmatrix} \begin{pmatrix} a_{ix1} \\ a_{iy1} \\ a_{iz1} \end{pmatrix} = \begin{pmatrix} a_{ox1}(\omega_1) \\ a_{oy1}(\omega_1) \\ a_{oz1}(\omega_1) \end{pmatrix}$$

(Mathematical 77)

When this formula is unified as equations concerning ($S_{x,x}$, $S_{x,y}$, $S_{x,z}$, $S_{y,x}$, $S_{y,y}$, $S_{y,z}$, $S_{z,x}$, $S_{z,y}$, $S_{z,z}$), the following formula is established.

$C_{1,1}a_{ix1}$ $C_{1,2}=a_{iy1}$ $C_{1,3}=a_{iz1}$ $C_{1,4}=0$ $C_{1,5}=0$ $C_{1,6}=0$
$C_{1,7}=0$ $C_{1,8}=0$ $C_{1,9}=0$ $C_{2,1}=0$ $C_{2,2}=0$ $C_{2,3}=0$ $C_{2,4}=a_{ix1}$ $C_{2,5}=a_{iy1}$ $C_{2,6}=a_{iz1}$
$C_{2,7}=0$ $C_{2,8}=0$ $C_{2,9}=0$ $C_{2,1}=0$ $C_{2,2}=0$ $C_{2,3}=0$ $C_{2,4}=0$ $C_{2,5}=0$ $C_{2,6}=0$ $C_{2,7}=a_{ix1}$
$C_{2,8}=a_{iy1}$ $C_{2,9}a_{ix1}$ $d_1=a_{ox1}(\omega_1)$ $d_2=a_{oy1}(\omega_1)$ $d_3=a_{oz1}(\omega_1)$ (Mathematical 78)

Procedure 2

Theoretically, a vibration is imparted first in the direction of vector $(a_{ix2}, a_{iy2}, a_{iz2})$ at a given frequency $f_1(\omega_1=2\pi f_1)$. The input acceleration vector signal is represented by $(a_{ix2}, a_{iy2}, a_{iz2})\exp(j\omega_1 t)$. The X axis output signal, the Y axis output signal, and Z axis output signal of the accelerometer at this time are respectively represented by $a_{ox2}(\omega_1)\exp(j\omega_1 t)$, $a_{oy1}(\omega_1)\exp(j\omega_1 t)$ and $a_{oz2}(\omega_1)\exp(j\omega_1 t)$.

Since the actual vibration is made with a burst signal and consequently the signal $(a_{ix2}, a_{iy2}, a_{iz2})\exp(j\omega t)$ is also a burst signal, the three components ought to be considered as resulting from the extraction of the $f_1$ component through FFT. In other words, when the actual vibration signal is expressed on the time base by the function of the vector $(a_{ix2}, a_{iy2}, a_{iz2})B_2(t)$, the part $B_2(t)$ means the burst signal. It is assumed that the complex number $Z_{is2}$ results from extracting the $f_1$ component from the burst part through FFT.

Since the output signals $(B_{ox2}(t), B_{oy2}(t), B_{oz2}(t))$ of the accelerometer in this case are also burst signals, the $f_1$ component is extracted likewise through FFT. The $f_1$ component which is obtained at this time is a complex number, the division of this component by $Z_{is2}$ results in $(a_{ox2}(\omega_1), a_{oy2}(\omega_1), a_{oz2}(\omega_1))$. As a result, the following formula is established for the frequency component 1.

$$\begin{pmatrix} S_{x,x} & S_{x,y} & S_{x,z} \\ S_{y,x} & S_{y,y} & S_{y,z} \\ S_{z,x} & S_{z,y} & S_{z,z} \end{pmatrix} \begin{pmatrix} a_{ix2} \\ a_{iy2} \\ a_{iz2} \end{pmatrix} = \begin{pmatrix} a_{ox2}(\omega_1) \\ a_{oy2}(\omega_1) \\ a_{oz2}(\omega_1) \end{pmatrix}$$

(Mathematical 79)

When this formula is unified as equations concerning ($S_{x,x}$, $S_{x,y}$, $S_{x,z}$, $S_{y,x}$, $S_{y,y}$, $S_{y,z}$, $S_{z,x}$, $S_{z,y}$, $S_{z,z}$) to derive the coefficients of Mathematical 75, the following formula is established.

$C_{4,1}=a_{ix2}$ $C_{4,2}=a_{iy2}$ $C_{4,3}=a_{iz2}$ $C_{4,4}=0$ $C_{4,5}=0$ $C_{4,6}=0$
$C_{4,7}=0$ $C_{4,8}=0$ $C_{4,9}=0$ $C_{5,1}=0$ $C_{5,2}=0$ $C_{5,3}=0$ $C_{5,4}=a_{ix2}$ $C_{5,5}=a_{iy2}$ $C_{5,6}=a_{iz2}$
$C_{5,7}=0$ $C_{5,8}=0$ $C_{5,9}=0$ $C_{6,1}=0$ $C_{6,2}=0$ $C_{6,3}=0$ $C_{6,4}=0$ $C_{6,5}=0$ $C_{6,6}=0$ $C_{6,7}=a_{ix2}$
$C_{6,8}=a_{iy2}$ $C_{6,9}=a_{iz2}$ $d_4=a_{ox2}(\omega_1)$ $d_5=a_{oy2}(\omega_1)$ $d_6=a_{oz2}(\omega_1)$ (Mathematical 80)

Procedure 3

Theoretically, a vibration is imparted first in the direction of vector $(a_{ix3}, a_{iy3}, a_{iz3})$ at a given frequency $f_1(\omega_1=2\pi f_1)$. The input acceleration vector signal is represented by $(a_{ix3}, a_{iy3}, a_{iz3})\exp(j\omega_1 t)$. The X axis output signal, the Y axis output signal, and Z axis output signal of the accelerometer at this time are respectively represented by $a_{ox3}(\omega_1)\exp(j\omega_1 t)$, $a_{oy3}(\omega_1)\exp(j\omega_1 t)$, $a_{oz3}(\omega_1)\exp(\omega_1 t)$.

Since the actual vibration is made with a burst signal and consequently the signals of vibration vectors $(a_{ix3}, a_{iy3}, a_{iz3})\exp(j\omega t)$ are also burst signals, the three components ought to be considered as resulting from the extraction of the $f_1$ component through FFT. In other words, when the actual vibration signal is expressed on the time base by the function of the vector $(a_{ix3}, a_{iy3}, a_{iz3})B_3(t)$, the part $B_3(t)$ means the burst signal. It is assumed that the complex number $Z_{is3}$ results from extracting the $f_1$ component from the burst part through FFT.

Since the output signals $(B_{ox3}(t), B_{oy3}(t), B_{oz3}(t))$ of the accelerometer in this case are also burst signals, the $f_1$ component is extracted likewise through FFT. The $f_1$ component which is obtained at this time is a complex number, the division of this component by $Z_{is1}$ results in $(a_{ox3}(\omega_1), a_{oy3}(\omega_1), a_{oz3}(\omega_1))$. As a result, the following formula is established for the frequency component 1.

$$\begin{pmatrix} S_{x,x} & S_{x,y} & S_{x,z} \\ S_{y,x} & S_{y,y} & S_{y,z} \\ S_{z,x} & S_{z,y} & S_{z,z} \end{pmatrix} \begin{pmatrix} a_{ix3} \\ a_{iy3} \\ a_{iz3} \end{pmatrix} = \begin{pmatrix} a_{ox3}(\omega_1) \\ a_{oy3}(\omega_1) \\ a_{oz3}(\omega_1) \end{pmatrix} \quad \text{(Mathematical 81)}$$

When this formula is unified as equations concerning $(S_{x,x}, S_{x,y}, S_{x,z}, S_{y,x}, S_{y,y}, S_{y,z}, S_{z,x}, S_{z,y}, S_{z,z})$, the following formula is established.

$C_{7,1}=a_{ix3}$ $C_{7,2}=a_{iy3}$ $C_{7,3}=a_{iz3}$ $C_{7,4}=0$ $C_{7,5}=0$ $C_{7,6}=0$
$C_{7,7}=0$ $C_{7,8}=0$ $C_{7,9}=0$ $C_{8,1}=0$ $C_{8,2}=0$ $C_{8,3}=0$ $C_{8,4}=t_{ix3}$ $C_{8,5}=a_{iy3}$ $C_{8,6}=a_{iz3}$
$C_{8,7}=0$ $C_{8,8}=0$ $C_{8,9}=0$ $C_{9,1}=0$ $C_{9,2}=0$ $C_{9,3}=0$ $C_{9,4}=0$ $C_{9,5}=0$ $C_{9,6}=0$ $C_{9,7}=a_{ix3}$
$C_{9,8}=a_{iy3}$ $C_{9,9}=a_{iz3}$ $$d_7=a_{ox3}(\omega_1) \; d_8=a_{oy3}(\omega_1) \; d_9=a_{oz3}(\omega_1) \quad \text{(Mathematical 82)}$$

Procedure 4

Consequently, the coefficient matrix of the aforementioned simultaneous linear equations has been decided and the vectors on the right part have been decided as well. The aforementioned simultaneous linear equations are solved without fail because the vectors in the three directions are selected in linear independence. Subsequently, the matrix sensitivity in a different frequency can be found by setting the vibration frequency at a different value and performing the same calculation. Specifically, the frequency is scanned in a necessary frequency band.

The cases of using four-axis through six-axis accelerometer will be described by the following generalization for the sake of brevity of explanation.

[Generalization]

The degree of freedom of a vibration source as a motion generating machine is denoted by N and the number of axes of an inertia sensor by M. At this time, the following condition must be satisfied.

$N \leq 6$, $M \leq 6$ (Both do not become 1 simultaneously)

The coordinate axes are denoted by $X_1, X_2, X_3, X_4, X_5, X_6$ and will be always enumerated in the order mentioned. The parameter of the N degree of freedom of a motion generating machine is denoted by j. Then, the number of axes of an inertia sensor is denoted by M and the parameter thereof by i. In this case, the following formulas are satisfied.

$1 \leq j \leq N$, $1 \leq i \leq M$

At this time, the dynamic sensitivity matrix of an inertia sensor at a given frequency $(\omega)=2\pi f$ is expressed by a matrix of M×N (M rows and N columns). Let N stand for the degree of freedom of a motion generating machine and M for the number of axes of an inertia sensor, and it will become possible to decide the matrix of the order of M×N as the sensitivity.

$$\begin{pmatrix} S_{1,1}(\omega) & \cdots & \cdots & \cdots & \cdots & S_{1,N}(\omega) \\ \vdots & & & & & \vdots \\ \vdots & & & & & \vdots \\ S_{M-1,1}(\omega) & \cdots & \cdots & \cdots & \cdots & S_{M-1,N-1}(\omega) \\ S_{M,1}(\omega) & \cdots & \cdots & \cdots & \cdots & S_{M,N}(\omega) \end{pmatrix} \quad \text{(Mathematical 83)}$$

The simultaneous linear equations for deciding all the components of the sensitivity matrix are given by any simultaneous linear equations other than those which have MN lines and MN columns of matrix as a coefficient matrix and constant vectors having MN components as a constant term.

$$\begin{pmatrix} C_{1,1} & C_{1,2} & \cdots & \cdots & C_{1,MN-1} & C_{1,MN} \\ C_{2,1} & C_{2,2} & \cdots & \cdots & C_{2,MN-1} & C_{2,MN-1} \\ \vdots & \vdots & \ddots & & \vdots & \vdots \\ \vdots & \vdots & & \ddots & \vdots & \vdots \\ \vdots & \vdots & & & \vdots & \vdots \\ \vdots & \vdots & & & \vdots & \vdots \\ \vdots & \vdots & & & \vdots & \vdots \\ \vdots & \vdots & & & \vdots & \vdots \\ C_{MN-1,1} & C_{MN-1,2} & \cdots & \cdots & C_{MN-1,MN-1} & C_{MN-1,MN} \\ C_{MN,1} & C_{MN,2} & \cdots & \cdots & C_{MN,MN-1} & C_{MN,MN} \end{pmatrix} \begin{pmatrix} S_{1,1} \\ \vdots \\ S_{1,N} \\ S_{2,1} \\ \vdots \\ S_{2,N} \\ S_{3,1} \\ \vdots \\ S_{M-1,N} \\ S_{M,1} \\ \vdots \\ S_{M,N} \end{pmatrix} = \begin{pmatrix} d_1 \\ \vdots \\ d_M \\ d_{M+1} \\ \vdots \\ d_{2M} \\ d_{2M+1} \\ \vdots \\ d_{(N-1)M} \\ d_{(N-1)M+1} \\ \vdots \\ d_{NM} \end{pmatrix} \quad \text{(Mathematical 84)}$$

The procedure for deciding the coefficient matrix and the constant term of the simultaneous liner equations (Mathematical 84) more or less varies when the input acceleration is made with a sinusoidal wave burst waveform, when the input acceleration is made by a random vibration, or when the input acceleration is made with a pulse waveform. The procedures which are contemplated here will be described below in the order of steps.

[The Case of Using a Sinusoidal Wave Burst Signal for the Input Acceleration]

Since the vector space which can be formed by a vector space generating machine has N dimensions, N linearly independent vectors can be selected. So, the vibration vector, the burst signal pertinent then, and the output signal are applicable as shown in the following table.

TABLE 14

| N oscillation vectors | Oscillation vector | $\omega_1$ component resulting from spectral analysis of burst signal | Output signal of inertia sensor | Number of angular frequency resulting from spectral analysis of output signal: $\omega_1$ component |
|---|---|---|---|---|
| First vector | $(a_{i,x1,1}, a_{i,x2,1}, \ldots a_{i,xN,1}) B_1(t)$ | $Z_{i,bs,1}$ | $(a_{o,x1,1}(t), a_{o,x2,1}(t), \ldots a_{o,xM,1}(t))$ | $Z_{o,bs,x1,1,1}, \ldots, Z_{o,bs,xM,1,1}$ |
| Second vector | $(a_{i,x1,2}, a_{i,x2,2}, \ldots a_{i,xN,2}) B_2(t)$ | $Z_{i,bs,2}$ | $(a_{o,x1,2}(t), a_{o,x2,2}(t), \ldots a_{o,xM,2}(t))$ | $Z_{o,bs,x1,2,1}, \ldots, Z_{o,bs,xM,2,1}$ |
| Third vector | $(a_{i,x1,3}, a_{i,x2,3}, \ldots a_{i,xN,3}) B_3(t)$ | $Z_{i,bs,3}$ | $(a_{o,x1,3}(t), a_{o,x2,3}(t), \ldots a_{o,xM,3}(t))$ | $Z_{o,bs,x1,3,1}, \ldots, Z_{o,bs,xM,3,1}$ |
| . | . | . | . | . |
| . | . | . | . | . |
| N'th vector | $(a_{i,x1,N}, a_{1,x2,N}, \ldots a_{i,xN,N}) B_N(t)$ | $Z_{i,bs,N}$ | $(a_{o,x1,N}(t), a_{o,x2N}(t), \ldots a_{o,xM,N}(t))$ | $Z_{o,bs,x1,N,1}, \ldots, Z_{o,bs,xM,N,1}$ |

The coefficients of the simultaneous linear equations of (Mathematical 84) are selected from this table as follows.

Procedure 1 (which Corresponds to the First Vibration Vector)

$$C_{1,1} = a_{i,x1,1} \quad C_{1,2} = a_{i,x2,1} \quad \ldots \quad C_{1,N} = a_{i,xN,1} \quad \text{(Mathematical 85)}$$

$$C_{1,N+1} = 0 \ldots C_{1,NM} = 0$$

$$C_{2,1} = C_{2,2} = \ldots = C_{2,N} = 0 \quad C_{2,N+1} = a_{i,x1,1}$$

$$C_{2,N+2} = a_{i,x2,1} \ldots C_{2,2N} = a_{i,xN,1}$$

$$C_{2,2N+1} = \ldots = C_{2,MN} = 0$$

$$\vdots$$

$$C_{M,1} = \ldots = C_{M,(M-1)N} = 0 \quad C_{M,(M-1)N+1} = a_{i,x1,1}$$

$$C_{M,(M-1)N+2} = a_{i,x2,1} \ldots C_{M,MN} = a_{i,xN,1}$$

$$d_1 = Z_{o,bs,x1,1,1} / Z_{i,bs,1}$$

$$d_2 = Z_{o,bs,x2,1,1} / Z_{i,bs,1} \ldots d_M = Z_{o,bs,xM,1,1} / Z_{i,bs,1}$$

Procedure 2 (which Corresponds to the Second Vibration Vector)

$$C_{M+1,1} = a_{i,x1,2} \quad C_{M+1,2} = a_{i,x2,2} \ldots C_{M+1,N} = a_{i,xN,2} \quad \text{(Mathematical 86)}$$

$$C_{M+1,N+1} = 0 \ldots C_{M+1,NM} = 0$$

$$C_{M+2,1} = C_{M+2,2} = \ldots = C_{M+2,N} = 0$$

$$C_{M+2,N+1} = a_{i,x1,2}$$

$$C_{M+2,N+2} = a_{i,x2,2} \ldots C_{M+2,2N} = a_{i,xN,2}$$

$$C_{M+2,2N+1} = \ldots = C_{M+2,N}$$

$$\vdots$$

$$C_{2M,1} = \ldots = C_{2M,(M-1)N} = 0 \quad C_{2M,(M-1)N+1} = a_{i,x1,2}$$

$$C_{2M,(M-1)N+2} = a_{i,x2,2} \ldots C_{2M,MN} = a_{i,xN,2}$$

$$d_{M+1} = Z_{o,bs,x1,2,1} / Z_{i,bs,2}$$

$$d_{M+2} = Z_{o,bs,x2,2,1} / Z_{i,bs,2} \ldots d_{2M} = Z_{o,bs,xM,2,1} / Z_{i,bs,2}$$

Procedure 3 (which Corresponds to the Third Vibration Vector)

$$C_{2M+1,1} = a_{i,x1,3} \quad C_{2M+1,2} = a_{i,x2,3} \ldots C_{2M+1,N} = a_{i,xN,3} \quad \text{(Mathematical 87)}$$

$$C_{2M+1,N+1} = 0 \ldots C_{2M+1,NM} = 0$$

$$C_{2M+2,1} = C_{2M+2,2} = \ldots = C_{2M+2,N} = 0$$

$$C_{2M+2,N+1} = a_{i,x1,3}$$

$$C_{2M+2,N+2} = a_{i,x2,3} \ldots C_{2M+2,2N} = a_{i,xN,3}$$

$$C_{2M+2,2N+1} = \ldots = C_{2M+2,MN} = 0$$

$$\vdots$$

$$C_{3M,1} = \ldots = C_{3M,(M-1)N} = 0 \quad C_{3M,(M-1)N+1} = a_{i,x1,3}$$

$$C_{3M,(M-1)N+2} = a_{i,x2,3} \ldots C_{3M,MN} = a_{i,xN,3}$$

$$d_{2M+1} = Z_{o,bs,x1,3,1} / Z_{i,bs,3}$$

$$d_{2M+2} = Z_{o,bs,x2,3,1} / Z_{i,bs,3} \ldots d_{3M} = Z_{o,bs,xM,3,1} / Z_{i,bs,3}$$

$$\vdots$$

Procedure N (which Corresponds to the Nth Vibration Vector)

$C_{(N-1)M+1,1} = a_{1,x1,N} C_{(N-1)M+1,2} =$ (Mathematical 88)

$a_{1,x2,N} \cdots C_{(N-1)M+1,N} = a_{i,xN,N}$ $C_{(N-1)M+1,N+1} = 0 \cdots C_{(N-1)M+1,NM} = 0$ $C_{(N-1)M+2,1} = C_{(N-1)M+2,2} = \cdots = C_{(N-1)M+2,N} = 0$ $C_{(N-1)M+2,N+1} = a_{i,x1,N} C_{(N-1)M+2,N+2} =$ $a_{i,x2,N} \cdots C_{(N-1)M+2,2N} = a_{i,xN,N}$ $C_{(N-1)M+2,2N+1} = \cdots = C_{(N-1)M+2,MN} = 0$ $\vdots$ $C_{NM,1} = \cdots = C_{NM(M-1)N} = 0$ $C_{NM,(M-1)N+1} =$ $a_{i,x1,N} C_{NM,(M-1)N+2} = a_{1,x2,N} \cdots C_{NM,MN} = a_{i,xN,N}$ $d_{(N-1)M+1} = Z_{o,bs,x1N,1} / Z_{i,bs,N}$  $d_2 =$ $Z_{a,bx,x2,N,1} / Z_{1,bs,N} \cdots d_{NM} = Z_{o,bs,xM,N,1} / Z_{i,bs,N}$ Procedure N+1

By the preceding procedures, all the components of the coefficient matrix and the constant terms of the equations (Mathematical 84) have been decided and the fact that the determinant of the coefficient matrix is not zeroed when the vibration vector is linearly independent can be proved. The solution aimed at, therefore, is attained without fail. Thus, all the coefficients of the matrix sensitivity are uniquely found. What is to be done resides in having the frequency of vibration scanned as occasion demands.

[The Case of Using Random Signal for the Input Acceleration]

Since the vector space which a motion vector generating machine can generate has N dimensions, N linearly independent vectors can be selected. So, the vibration vector, the results of the spectral analysis of the random signal pertinent thereto, and the output signal are applicable as shown in the following table. In short, due attention should be paid to the fact that the expression "random vibration" does not necessarily imply that the vibration is random also in direction. It requires attention that the frequency component is random and the N linearly independent directions are fixed. At this time, the following table is obtained.

TABLE 15

| N oscillation vectors | Oscillation vector | $\omega_1$ component resulting from spectral analysis of random oscillation signal | Output signal of inertia sensor | Number of angular frequency resulting from spectral analysis of output signal: $\omega_1$ component |
|---|---|---|---|---|
| First vector | $(a_{i,x1,1}, a_{i,x2,1}, \ldots a_{i,xN,1}) B_1(t)$ | $Z_{i,bs,1}$ | $(a_{o,x1,1}(t), a_{o,x2,1}(t), \ldots a_{o,xM,1}(t))$ | $Z_{o,bs,x1,1,1}, \ldots, Z_{o,bs,xM,1,1}$ |
| Second vector | $(a_{i,x1,2}, a_{i,x2,2}, \ldots a_{i,xN,2}) B_2(t)$ | $Z_{i,bs,2}$ | $(a_{o,x1,2}(t), a_{o,x2,2}(t), \ldots a_{o,xM,2}(t))$ | $Z_{o,bs,x1,2,1}, \ldots, Z_{o,bs,xM,2,1}$ |
| Third vector | $(a_{i,x1,3}, a_{i,x2,3}, \ldots a_{i,xN,3}) B_3(t)$ | $Z_{i,bs,3}$ | $(a_{o,x1,3}(t), a_{o,x2,3}(t), \ldots a_{o,xM,3}(t))$ | $Z_{o,bs,x1,3,1}, \ldots, Z_{o,bs,xM,3,1}$ |
| . | . | . | . | . |
| . | . | . | . | . |
| . | . | . | . | . |
| N'th vector | $(a_{i,x1,N}, a_{i,x2,N}, \ldots a_{i,xN,N}) B_N(t)$ | $Z_{i,bs,N}$ | $(a_{o,x1,N}(t), a_{o,x2,N}(t), \ldots a_{o,xM,N}(t))$ | $Z_{o,bs,x1,N,1}, \ldots, Z_{o,bs,xM,N,1}$ |

Since the coefficient matrix and the constant term vector of the simultaneous liner equations (Mathematical 84) are decided by carrying out a procedure similar to that adopted in the case of a sinusoidal wave, all the components of the matrix sensitivity regarding the $\omega_1$ component can be decided. When the resolution found by the spectral analysis of a random signal is $\Delta\omega$, all the components of the matrix sensitivity at necessary angular frequencies can be found by selecting the angular frequency of the formula of $(\omega_1 \pm \Delta\omega \times \text{an integer})$ and following the same procedure. This is because the vibration vector is linearly independent and the coefficient determinant of the simultaneous linear equations (Mathematical 84) is not zero at any angular frequencies.

[The Case of Using a Pulse Waveform Signal for the Input Acceleration]

Since the vector space which can be formed by a motion generating machine has N dimensions, the N linearly independent vectors can be selected. Thus, the spectral analysis of a pulse signal which exists at the vibration spectrum has shown that the output signal, for example, can be written as shown in the following table. At this time, the following table is derived.

TABLE 16

| N oscillation vectors | Oscillation vector | $\omega_1$ component resulting from spectral analysis of pulse oscillation signal | Output signal of inertia sensor | Number of angular frequency resulting from spectral analysis of output signal: $\omega_1$ component |
| --- | --- | --- | --- | --- |
| First vector | $(a_{i,x1,1}, a_{i,x2,1}, \ldots a_{i,xN,1}) B_1(t)$ | $Z_{i,bs,1}$ | $(a_{o,x1,1}(t), a_{o,x2,1}(t), \ldots a_{o,xM,1}(t))$ | $Z_{o,bs,x1,1,1}, \ldots, Z_{o,bs,xM,1,1}$ |
| Second vector | $(a_{i,x1,2}, a_{i,x2,2}, \ldots a_{i,xN,2}) B_2(t)$ | $Z_{i,bs,2}$ | $(a_{o,x1,2}(t), a_{o,x2,2}(t), \ldots a_{o,xM,2}(t))$ | $Z_{o,bs,x1,2,1}, \ldots, Z_{o,bs,xM,2,1}$ |
| Third vector | $(a_{i,x1,3}, a_{i,x2,3}, \ldots a_{i,xN,3}) B_3(t)$ | $Z_{i,bs,3}$ | $(a_{o,x1,3}(t), a_{o,x2,3}(t), \ldots a_{o,xM,3}(t))$ | $Z_{o,bs,x1,3,1}, \ldots, Z_{o,bs,xM,3,1}$ |
| . | . | . | . | . |
| . | . | . | . | . |
| . | . | . | . | . |
| N'th vector | $(a_{i,x1,N}, a_{i,x2,N}, \ldots a_{i,xN,N}) B_N(t)$ | $Z_{i,bs,N}$ | $(a_{o,x1,N}(t), a_{o,x2,N}(t), \ldots a_{o,xM,N}(t))$ | $Z_{o,bs,x1,N,1}, \ldots, Z_{o,bs,xM,N,1}$ |

Subsequently, by following the same procedure as in the case of a sinusoidal wave, it is made possible to decide the coefficient matrix of the simultaneous linear equations (Mathematical 84) and the constant term vector and consequently decide all the components of the matrix sensitivity regarding the angular frequency $\omega_1$. When the resolution found by the spectral analysis of a pulse signal is $\Delta\omega$, all the components of the matrix sensitivity at necessary angular frequencies can be found by selecting the angular frequency of the formula of ($\omega_1 \pm \Delta\omega \times$an integer) and following the same procedure. This is because the vibration vector is linearly independent and the coefficient matrix of the simultaneous linear equations (Mathematical 84) is not zero at any angular frequencies.

According to the first aspect of this invention, by causing a plurality of laser interferometers disposed along as many directions to seize multidimensional motions entering an inertia sensor as input signals and comparing these input signals with output signals from the inertia sensor, the sensitivity of the inertia sensor can be defined in the matrix form. The result is that this inertia sensor has been calibrated. While the conventional calibration technique has enabled the accelerometer to be calibrated solely with the amplitude of the acceleration, the technique of this invention enables the accelerometer to be calibrated by the acceleration as a vector and enables the accelerometer to measure the acceleration.

Then, according to the second aspect of this invention, the sensitivity is measured in the matrix form under an epochal input acceleration waveform and the calibration can be carried out in this framework.

According to the third aspect of this invention, the sensitivity is measured in the matrix form under an input acceleration waveform of the nature of the pulse function and the calibration can be carried out in this framework.

According to the fourth aspect of this invention, the sensitivity relying on the frequency is measured in the matrix form under the conditions of the input acceleration of the nature of the pulse function and the calibration is carried out in this framework.

According to the fifth aspect of this invention, the sensitivity is measured in the matrix form under the random input acceleration waveform and the calibration can be carried out in this framework.

According to the sixth aspect of this invention, the sensitivity relying on frequency is measured in the matrix form under the random input acceleration condition and the calibration can be carried out in this framework.

According to the seventh aspect of this invention, the measurement can be fulfilled by the use of a laser interferometer while the motion generating machine is continuously monitored.

According to the eighth aspect of this invention, the aforementioned monitoring can be carried out with high accuracy.

According to the ninth aspect of this invention, the error can be evaluated.

According to the 10$^{th}$ aspect of this invention, when the laser interferometer is not easily used and some other alternative device of high precision is adopted, the regression as to the precision of measurement can be retained to a slight extent.

According to the 11$^{th}$ aspect of this invention, the influence of the gravitational acceleration can be excluded from the measured value.

According to the 12$^{th}$ aspect of this invention, it is made possible to define and observe the cross or transverse sensitivity easily. While the piezoelectric type one-axis accelerometer heretofore widely used as the standard accelerometer has failed to afford cross or transverse sensitivity as complex numbers, this invention affords the cross or transverse sensitivity as complex numbers.

According to the 13$^{th}$ aspect of this invention, the reliability of the measurement with the accelerometer which is used in an applied field in which the inability to make three-dimensional measurement as in the seismometer used for measuring an earthquake comprising pitching and rolling proves meaningless can be exalted.

According to the 14$^{th}$ aspect of this invention, the disturbance to the vibro-isolating common bed is detected more accurately and the effect of vibration insulation is enhanced. The application of the invention to the vibro-isolating device, for example, results in contributing to the promotion of miniaturization of the semiconductor. The realization of the evaluation of performance of the multi-degree freedom inertia sensor (particularly made of semiconductor) simultaneously possessing translational motion acceleration detecting function, angular velocity detecting function, and angular acceleration detecting function results in improving the precision of manufacture of a semiconductor device and exalting the performance of the product.

According to the 15th aspect of this invention, the technique of utilizing the multi-axis accelerometer which is used for controlling the suspension of an automobile or controlling the automobile passenger protecting airbag can be exalted.

According to the 16th aspect of this invention, the precision of the control of the movement of a robot is exalted. In the mechanism such as a man-like robot which generates an unrestricted motion in conformity with the situation inside a three-dimensional space while it is continuously subject to a feedback and control, the use of the inertia sensor calibrated with the vector acceleration results in enabling the motion to be generated in greater fineness than ever.

According to the 17th aspect of this invention, the application such as the accelerometer installed in the interior of an automobile for ensuring safety of the passenger in the case of a car collision in which the inability to measure the acceleration as the vector proves meaningless enjoys an increased utilization and ensures a heightened safety of an automobile.

According to the 18th aspect of this invention, even an acceleration measuring device, an angular velocity measuring device, or an angular acceleration measuring device which is furnished with an output only in one axis is enabled to discern the sensitivity in other axis.

According to the 19th aspect of this invention, the inertia sensor is enabled to effect the measurement of dynamic matrix sensitivity even when the calibration is required to be effected with a greater degree of freedom than the degree of freedom of the motion possessed by the motion generating machine or when the number of axes which can be handled is smaller than the number of axes required to be used in the calibration.

According to other aspects of this invention, the sculling error, i.e. an error due to the rotation of an accelerometer, which has been heretofore measured with difficulty, can be measured. The term "sculling error" as used herein means an error ascribable to an apparent acceleration (rectifying acceleration) which arises when the linear vibration acceleration generated along a given axis and the angular acceleration having the same frequency as the linear vibration acceleration and generated around an axis perpendicularly intersecting the given axis occur simultaneously. This acceleration has a magnitude which depends on the amplitude and the phase of the relevant inputs and appears in an axis perpendicular to the two axes.

INDUSTRIAL APPLICABILITY

This invention is configured as described above. By using the device of this invention for measuring the dynamic matrix sensitivity of an inertia sensor and the method of this invention for operating the device, therefore, it is made possible to acquire exactly the multidimensional sensitivity property of an inertia sensor, judge whether or not a given inertia sensor fits the purpose of use, and provide an accurate data for designing an inertia sensor which fits the purpose of use. It is further made possible to design and construct a still more complicated complex inertia sensor by making use of the inertia sensor which has secured the sensitivity property accurately.

The invention claimed is:

1. A device for measuring dynamic matrix sensitivity of an inertia sensor, comprising:
a motion generating machine for inducing a motion including at least one of a translational motion and a rotational motion, wherein a degree of freedom of the motion is N ($1 \leq N \leq 6$, and N is an integer);
a unit subject to calibration provisionally fixed on a table of the motion generating machine, constituted by at least one of an acceleration measuring unit, an angular velocity measuring unit and an angular acceleration measuring unit, wherein a degree of freedom of detection is M ($1 \leq M \leq 6$, and M is an integer);
output means for fetching an output from the unit subject to calibration;
one or more light reflectors;
a displacement measuring unit enabled to grasp a multidimensional motion by using a laser interferometer formed by irradiating the one or more light reflectors with laser beams from as many directions;
a processing unit for calculating an M×N dynamic sensitivity matrix $S_{p,q}(\omega)$ of the unit subject to calibration based on an output from the unit subject to calibration when the motion generating machine is vibrated by a vibration vector $(a_{i,x1}(j\omega t), a_{i,x2}(j\omega t), \ldots, a_{i,xN}(j\omega t))$ ($1 \leq i \leq N$, j is an imaginary unit, $\omega=2\pi f$, and f is a frequency of vibration) and a data indicating a state of the multidimensional motion obtained from the displacement measuring unit; and
displaying means to display or a transmitting means to transmit an output of the processing unit and output of the unit subject to calibration.

2. A device according to claim 1, wherein the motion generating machine generates a periodical motion.

3. A device according to claim 1, wherein the motion generating machine generates a motion of pulse function nature.

4. A device according to claim 3, further comprising:
first converting means for finding a Fourier component on a frequency axis of the motion of the nature of pulse function;
second converting means for finding a Fourier component on a frequency axis of an output of the acceleration measuring unit, angular velocity measuring unit or angular acceleration measuring unit that is the unit subject to calibration; and
means for finding from respective outputs of the first and the second converting means a frequency characteristic of correction of the acceleration measuring unit, angular velocity measuring unit or angular acceleration measuring unit that is the unit subject to calibration and displaying or transmitting the frequency characteristics.

5. A device according to claim 3, further comprising:
first converting means for finding a Fourier component on a frequency axis of the random motion;
second converting means for finding a Fourier component on a frequency axis of an output of the acceleration measuring unit, angular velocity measuring unit or angular acceleration measuring unit that is the unit subject to calibration; and
means for finding from respective outputs of the first and the second converting means a frequency characteristics of calibration of the acceleration measuring unit, angular velocity measuring unit or angular acceleration measuring unit that is the unit subject to calibration and displaying or transmitting the frequency characteristics.

6. A device according to claim 5, wherein the motion generating machine is capable of producing a random motion.

7. A device according to claim 6, wherein the accelerometer is provided with dynamic matrix sensitivity, and feedback control thereof estimates an input vector from an output vector of the accelerometer by using the dynamic matrix sensitivity.

8. A device according to claim 7, further comprising:
means for finding an error from respective outputs of the data processing unit and the acceleration measuring unit, angular velocity measuring unit or angular acceleration measuring unit that is the unit subject to calibration and displaying the error or means; or
means for finding the error and transferring a value of the error.

9. A device according to claim 1, wherein the motion generating machine is provided with an accelerometer for controlling vibration motion and a feedback circuit for controlling a drive unit for enabling a signal from the sensor thereof to assume a value determined in advance.

10. A device according to claim 1, further comprising:
direction means for rendering an angle of disposition of the acceleration measuring unit, angular velocity measuring unit or angular acceleration measuring unit that is the unit subject to calibration variable relative to a gravitational direction; and
means for obtaining an output from the unit subject to calibration and temporarily fixed in a plurality of directions relative to the gravitational direction, finding dynamic matrix sensitivities with respect to the plurality of directions and estimating dynamic matrix sensitivity deprived of an influence of gravitational force from the plurality of dynamic matrix sensitivities.

11. A device according to claim 1, wherein the unit subject to calibration is an acceleration measuring unit, angular velocity measuring unit or angular acceleration measuring unit possessing an output only in a one-axis direction, and the motion generating machine for inducing a translational motion or rotational motion is a motion generating machine enabled to move with a plurality of degrees of freedom.

12. A device according to claim 1, wherein the device for measuring the dynamic matrix sensitivity of an inertia sensor is wholly installed in a room capable of intercepting sound or vibration from outside the room, the acceleration measuring unit that is the unit subject to calibration is a seismometer, and the motion generating machine generates a motion of pulse or cyclic function nature and imparts fine vibration in an vibration frequency band and a seismic zone detectable by the seismometer.

13. A device according to claim 1, wherein the motion generating machine is a motion generating machine generating a random motion and imparts vibration in a vibration frequency band detectable by an inertia sensor used for constantly detecting fine vibration of a vibro-isolating common table, and the motion generating machine or the table is provided with cooling means or a thermostatic unit.

14. A device according to claim 1, wherein the motion generating machine is a motion generating machine which imparts vibration in a vibration frequency band detectable by an accelerometer used for controlling an automobile suspension or an accelerometer used for controlling an automobile passenger protecting airbag, the acceleration measuring unit that is the unit subject to calibration is an accelerometer used for controlling an automobile suspension or an accelerometer used for controlling an automobile passenger protecting airbag, and the acceleration measuring unit that is the unit subject to calibration is provided with a temperature controlling unit for controlling an temperature environment of the acceleration measuring unit.

15. A device according to claim 1, wherein the motion generating machine is a motion generating machine which simultaneously generates a motion of pulse or cyclic function nature and a motion comprising a translational motion and a rotational motion and emits vibration in a vibration frequency band detectable by an inertia sensor used for controlling a motion of a robot, the acceleration detecting unit that is the unit subject to calibration is an inertia sensor used for controlling a motion of a robot, and the acceleration measuring unit that is the unit subject to calibration is provided with a temperature controlling unit for controlling a temperature environment of the acceleration measuring unit.

16. A device according to claim 1, wherein the motion generating machine is a motion generating machine which imparts vibration in a vibration frequency band detectable by an inertia sensor used for measuring a motion of a human body, vibration imparted to a human body or an animal behavior monitor, and the acceleration measuring unit that is the unit subject to calibration is a distributed accelerometer serving as an inertia sensor used for measuring a motion of a human body, a vibration imparted to a human body or an animal behavior monitor and is provided with multi-channel signal output terminals for emitting a signal of the distributed accelerometers.

17. A method for measuring dynamic matrix sensitivity of an inertia sensor, comprising the steps of:
forming in the device set forth in claim 1 a setup wherein an output vector having an output value of N axes as a component is expressed by a product of the dynamic matrix sensitivity multiplied by an input vector having states of motion of the motion generating machine as components on the assumption that the displacement measuring means produces outputs in different N axes, and that the numbers M and N do not satisfy M×N=1; and
dividing the M degrees of freedom into a plurality of groups allowing duplication,
1) finding by measurement the output vector for the input vector with respect to each of the groups,
2) converting and unifying the output vectors enabled to correspond to the input vectors having M degrees of freedom, and subsequently
3) finding dynamic matrix sensitivity from the correspondence of the output vectors to the unified input vectors.

18. A device according to claim 1, further comprising means for multiplying a filter matrix corresponding to a inverse matrix of the matrix sensitivity by a vector comprising an output from the accelerometer to enable measurement precision of the accelerometer to be enhanced.

* * * * *